United States Patent [19]

Tegethoff

[11] Patent Number: 5,539,652

[45] Date of Patent: Jul. 23, 1996

[54] METHOD FOR MANUFACTURING TEST SIMULATION IN ELECTRONIC CIRCUIT DESIGN

[75] Inventor: Mauro V. Tegethoff, Fort Collins, Colo.

[73] Assignee: Hewlett-Packard Company, Palo Alto, Calif.

[21] Appl. No.: 384,909

[22] Filed: Feb. 7, 1995

[51] Int. Cl.$^6$ ............................. G06F 9/455; H01L 21/70
[52] U.S. Cl. .......................... 364/490; 364/488; 364/578; 364/468.03; 364/468.15; 364/491
[58] Field of Search ................................... 364/488, 489, 364/490, 491, 578, 468

[56] References Cited

U.S. PATENT DOCUMENTS

| | | | |
|---|---|---|---|
| 4,342,090 | 7/1982 | Caccoma et al. | 364/491 |
| 4,949,275 | 8/1990 | Nonaka | 364/490 |
| 5,313,398 | 5/1994 | Rohrer et al. | 364/468 |
| 5,355,320 | 10/1994 | Erjavic et al. | 364/488 |
| 5,379,237 | 1/1995 | Morgan et al. | 364/578 |

OTHER PUBLICATIONS

Tegethoff, M., "IEEE 1149.1: How to Justify Implementation", Proceedings of the 1993 International Test Conference, Oct. 1993, p. 265.

"Manufacturing–A Preview of the 21st Century", IEEE Spectrum, Sep. 1993, pp. 82–84.

Williams T. W. and Parker K. P., "Design for testability–A survey", Proceedings of the IEEE, vol. 71, pp. 98–112, Jan. 1983.

Williams, T. W. and Brown N. C., "Defect level as a function of fault coverage," IEEE Transactions on Computers, vol. c–30, No. 12, pp. 987–988, Dec. 1981.

Tegethoff M. V., Figal, T. E., Hird, S. W., "Board Test DFT Model for Computer Products", Proceedings of the 1992 International Test Conference, pp. 367–371.

Hume J., Komm, R., Garrison T., "Design Report Card: A Method for Measuring Design for Manufacturability", Proceedings of the 1992 Surface Mount International Conference, pp. 986–991.

Dislis C., Dick J. H., Dear I. D., Azu I. N., Ambler A. P., "Economics Modelling for the Determination of Test Strategies for Complex VLSI Boards", Proceedings of the 1993 International Test Conference, pp. 210–217.

Dick J. Trischler E., Ambler A. P., "DOM: A Defect Occurrence Model for Evaluating the Life Cycle Costs of Test Strategies", Economics of Design and Test for Electronic Circuits and Systems, Ellis Horwood Limited, ISBN 0-13-224-767-4, 1992, pp. 92–98.

(List continued on next page.)

Primary Examiner—Kevin J. Teska
Assistant Examiner—Russell W. Frejd

[57] ABSTRACT

A manufacturing and test simulation method for electronic circuit design integrated with computer aided design tools to provide concurrent engineering of manufacturing and testability aspects of a product concurrent with the functional design of a product. The manufacturing and test simulator (MTSIM) simulates manufacturing test and repair aspects of boards and multichip modules (MCMs) from design concept through manufacturing release to aid the designer in selecting appropriate trade-offs in the design for manufacturability and the design for testability. All simulation by the methods of the present invention applies manufacturing and test models down to the component level. The methods of the simulator include a new yield model for boards and MCMs which accounts for the clustering of solder defects. MTSIM models solder faults, manufacturing workmanship faults, component performance faults, and reliability faults. Fault probabilities for the circuit design are estimated based on the component type, the component functionality, and the assembly process used. Up to seven manufacturing test steps can be simulated by MTSIM. Test coverage models will support all commonly used manufacturing test methodologies, including visual inspection, in-circuit test, IEEE 1149.1 boundary scan, selftest, diagnostics, and burn-in. Pareto and iterative "what-if" analysis may be used to locate particular enhancements which most benefit the manufacturability and testability of the product.

56 Claims, 14 Drawing Sheets

OTHER PUBLICATIONS

Dear I. D., Dislis C. and Ambler A. P., "Economic effects in design and test," IEEE Design & Test of Computers, pp. 64–77, Dec. 1991.

Abadir M., Parikh A., Bal L., Sandborn P., Murphy C., "High Level Test Economics Advisor (Hi–TEA)", Proceedings of the 2nd Interational Workshop on the Economics of Design and Test for Electronic Circuits and Systems, Austin 1993.

Alexander M., Srihari K., Emerson C. R., "Cost Based Surance Mount PCB Design Evaluation", Proceedings of the 2nd International Workshop on the Economics of Design and Test for Electronic Circuits and Systems, Austin 1993.

Penn, M., "Economics of Semiconductor Production", Microelectronics Journal, vol. 23, No. 4, pp. 255–266.

Maly W., "Prospects for WSI: A Manufacturing Perspective", IEEE Computer Magazine, Apr. 1992, pp. 57–65.

Cunningham J. A., "The use and Evaluation of Yield Models in Integrated Circuits Manufacturing", IEEE Transactions on Semiconductor Manufacturing, vol. 3, No. 2, May 1990, pp. 60–71.

Myers, M. A., "An Analysis of the Cost and Quality Impact of LSI/VLSI Technology on PCB Test Strategies", Proceedings of the 1983 International Test Conference, pp. 382–395.

Scheiber S. F., "Evaluating Test–Strategy Alternatives", Test & Measurement World, Apr. 1992, pp. 57–60.

McEntire K. R., "SMT Benchmark & Yield Modeling", Proceedings of the 1989 Surface Mount International Conference pp. 238–250.

Barber J. S., Gehner K. R., "The Economics of an Enhanced Reliability Improvement Process", Economics of Design and Test for Electronic Circuits and Systems, Ellis Horwood Limited, ISBN 0–13–224–767–4, 1992, pp. 83–91.

Smoot D. L., Pulat B. M., "Don't Eliminate Incoming Test–Move it", Proceedings of the 1991 International Test Conference, pp. 454–462.

Nobel G. and Gleason, J., "Tolerance Issues in SMT Assembly", Proceedings of the 1991 Surface Mount International, pp. 266–273.

Maxwell P. C., Aitken R. C., Johansen V., Chiang I., "The Effectiveness of IDDQ, Functional and Scan Tests: How many Fault Coverages do we Need?", Proceedings of the 1992 International Test Conference, pp. 168–177.

Dervisoglu B. I., "Application of Scan Hardware and Software for Debug and Diagnostics in a Workstation Environment", IEEE Transactions on Computer–aided Design, vol. 6, Jun. 1990, pp. 612–620.

Ferreira, J. M., Gericota, M. G., Ramalho, J. L., Alves, G. R., "BIST for 1149.1–Compatible Boards: A Low–cost and Maximum–Flexibility Solution", Proc 1993 International Test Conference, pp. 536–543.

Chan J. C., "An Improved Technique for Circuit Board Interconnect Test", IEEE Transactions on Instrumentation and Measurement, vol. 41, No. 5, Oct. 1992, pp. 692–698.

Punches K., "Burn–in and Strife Testing", Qualify Progress, pp. 93–94, Mar. 1986.

Parker, K. P., J. E. McDermid, S. Oresjo, "Structure and Metrology for and Analog Testability Bus", Proc 1993 ITC, Baltimore MD, Oct. 1993, pp. 309–322.

Henderson C. L., Williams R. H., Hawkins C. F., "Econimic impact of type I Test Errors at system and Board Levels", Proceedings of the 1992 International Test Conference, pp. 444–451.

Kececioglu D., "Reliability Engineering Handbook", vol. 1, Prentice Hall, ISBN 0–13–772294–x, 1991.

Dhillon B. S., "Network Reliability Evaluation–Application of Bathtub Failure Rate Curve", IEEE Transactions on Reliability R–21, pp. 103–111, 1981.

Johnson L. G., "The Median Ranks of Sample Values in their Population with an Application to Certain Fatigue Studies", Industrial Mathematics, vol. 2, pp. 1–9, 1951.

Rogers A., "Statistical Analysis of Spatial Dispersion", Pion Limited, ISBN 0–85086–0458, 1974.

Ferris–Prabhu A. V., "A Cluster Modified Poisson Model for Estimating Defect Density and Yield", IEEE Transaction on Semiconductor Manufacturing, vol. 3, No. 2, May 1990, pp. 54–59.

Stapper C. H., "Defect Density Distributions for LSI Yield Calculations", IEEE Transactions on Electron Devices, Jul. 1973, pp. 655–658.

Seeds R. B., "Yield and Cost Analysis of Biploar LSI", Proceedings of the 1967 IEEE International Electron Device Meeting, Washington, DC, Oct. 1967.

Murphy B. T., "Cost Size Optima of monolithic Integrated Circuits", Proceedings of IEEE, vol. 52, pp. 1537–1545, Dec. 1964.

Stapper C. H., Armstrong F. M., Saji K., "Integrated Circuit Yield Statistics", Proceedings of the IEEE, vol. 71, No. 4, Apr. 1983, pp. 453–470.

Stapper C. H., "Yield Model for Falut Clusters and within Integrated Circuits", IBM Journal of Research and Development, vol. 28, No. 5, Sep. 1984, pp. 637–639.

Stapper, C. H., "Fault Simulation Programs for Integrated Circuit Yield Estimations", IBM Journal of Research and Development, vol. 33, No. 6, Nov. 1989, pp. 647–649.

Schlotzhauer E. O. and Balzer R. J., "Real–World board test effectiveness: What does it mean when the board passes?." Proceedings of the 1987 International Test Conference, pp. 792–797.

McCluskey E. J., "IC Quality and Test Transparency", Proceedings of the 1988 International Test Conference, pp. 295–301.

Maxwell P. C., Aitken R. C., "All Fault Coverages Are Not Created Equal", IEEE Design & Test of Computers, pp. 45–51, Mar. 1993.

Josephson D. D., Dixon D. J. and Arnold B. J., "Test Features of the HP PA7100LC Processor", Proceedings of the 1993 International Test Conference, pp. 764–772.

Caldwell B., Lamgford, T., "Is 1149.1 Boundary Scan Cost Effective: A Simple Case Study", Proceedings of the 1992 International Test Conference, pp. 106–109.

Gheewala T., Pierce K., "Economics of ASIC Test Development", Economics of Design and Test for Electronic Circuits and Systems, Ellis Horwood limited, ISBN 0–13–224–767–4, 1992, pp. 39–51.

Koren I., Koren Z., Stapper C. H., "A Unified Negative–Binomial Distribution for Yield Analysis of Defect Tolerant Circuits", IEEE Transactions on Computers, vol. 42, No. 6, Jun. 1993, pp. 724–733.

METHOD FOR MANUFACTURING TEST SIMULATION IN ELECTRONIC CIRCUIT DESIGN

BACKGROUND OF THE INVENTION

1. Field of the Invention

The invention relates in general to the field of computer aided electronic circuit design tools and in particular to a computer based method for providing manufacturing test simulation in the circuit design process to enable improved design for test and design for manufacturability earlier in the circuit design process.

2. Description of related art

Electronic products of today are designed under tremendous internal and external pressures. Competitive market pressure relating to time to market dictates new product announcements every one to two years and a particular product may be viable for only six months to one year. Rapidly increasing performance capability of circuits adds to the pressures on circuit designers to complete a design before new technology obsoletes a product design.

Modern circuit designs are rapidly increasing in complexity. In addition, several factors contribute to a demand for smaller electronic product size. In addition to market concerns for reducing product size, the performance of modern electronic circuits is frequently impacted by the size of the circuit. Signal propagation delays can render modern high speed circuits non-functional. The technology of circuit board assembly is evolving to support density demands of many modern circuit designs. Multi-chip modules (MCMs) and twelve-mil pitch surface mount technology (SMT) are frequently used to improve circuit density. SMT chip packages with lead counts of over 1000 are not uncommon. New fabrication processes which are used to enable higher circuit densities usually have higher defect rates than older low density fabrication technologies. Faster circuits are less tolerant of delay faults, resulting in the increase in the component functional defect rate. Higher defect rates imply lower yields and higher costs in manufacturing.

Another trend in the electronics industry is the focus on quality control and quality improvement at all stages of a product's life cycle. To achieve such quality control and defect reduction, there is an emphasis on design for test (DFT), design for quality (DFQ), and design for manufacturing (DFM) in the early design of electronic circuits. However, time and cost factors tend to make such design efforts difficult to justify in a short term, profit oriented, perspective. In order to maximize short term profits, a company needs to justify a return on investment of all features implemented in a product. Testability features, such as the IEEE 1149.1 boundary scan standard, are no exception since they require significant hardware investment which needs to be justified (See "IEEE 1149.1: How to Justify Implementation," Proceedings of the 1993 International Test Conference, 265, October 1993).

Often, such DFT/DFQ/DFM features are ignored during the early design phases of a circuit to minimize the time in design. Such features are sometimes added later in the design as a designer begins to consider manufacturing issues relating to the product. An example of this practice is DFM violations in board layout. For example, designers would like to minimize the area of surface mount pads to increase board density and minimize interconnect parasitic. However, SMT design rules require minimum pad geometries, and violation of these rules will result in increased solder defects in manufacturing. Another example is the placement of test pads on a board for in-circuit test access. Designers will usually wait until the board is completely routed before placing test pads. At that late stage in the design, the board is often too dense to allow the addition of desirable test points. The result is the reduction of test coverage for in-circuit board test. The solder defects not covered by in-circuit test will typically be detected later at the functional test step, with an increased cost for defect isolation and repair.

Many electronic products (especially computing products) are designed to meet high performance specifications dictated by the marketplace. The design engineer's first priority is to get a product to market within the narrow time-to-market window, and to meet the product price/performance specifications. DFM and DFT aspects of the product frequently are relegated to secondary concerns. DFM and DFT activity is usually performed by consulting with the manufacturing expert at selected times in the design cycle. This consultation is usually in the form of design reviews or enforcement of guidelines. There is a limited understanding of the trade-offs available in board manufacturing because, designers and manufacturing experts have different goals for the product. In this environment, the added manufacturing costs caused by poor quality and inefficient test process are not visible to the designer due to the lack of reliable design specific data. The result is that the DFT and DFM of the product suffers, and the product is not optimized for manufacturability and testability.

A fundamental problem exists in that design tools used by circuit designers are focused on functionality and tend to neglect manufacturing and testability issues. Designers are not accustomed to addressing manufacturability issues in their design processes. To effectively address manufacturability issues during design is frequently called Concurrent Engineering. Concurrent Engineering is defined as the product development paradigm where, the manufacturing aspects of the product are developed concurrently with the functional design of the product. However, in order to practice concurrent engineering successfully, designers need tools to help them understand manufacturing issues and trade-offs.

Typical prior approaches to measuring and testing for manufacturing include the stuck-at fault coverage metric and its failure rate estimations, automatic test pattern generation, scan methodologies, and built-in self test (BIST) methodologies (see T. W. Williams & K. P. Parker, "Design For Testability—A Survey," Proceedings of the IEEE, Vol. 71, 98–112, January 1983). Several DFT and test development techniques have evolved, and have been bench-marked against the stuck-at coverage metric. The major concern in board manufacturing has been the integrated circuit (IC) defect level, that is, what is the probability of a defect in an IC after it undergoes all of its IC level testing (See T. W. Williams & N. C. Brown, "Defect level as a function of fault coverage," IEEE Transactions on Computers, Vol. C-30, No. 12, 987–988, December 1981). IC defect level is important to board manufacturing but does not fully evaluate design quality from the overall perspective of manufacturing. In addition, ICs and systems are merging, requiring quality assurance methods more robust than what stuck-at model based fault simulation can provide. In computer products faults arise in a system, involving delay faults, chip to chip interactions, an ever changing fault spectrum (not characterized by defect density), and faults that need to be efficiently isolated to the defect and be repaired.

Work at Hewlett-Packard's Colorado Computer Manufacturing Operation (see M. V. Tegethoff et al., "Board Test DFT Model for Computer Products," Proceedings of the 1992 International Test Conference, 367–71), demonstrated that modeling aspects of the test process is quite effective in fostering DFT techniques. However, the HP work only covered the cost and quality aspects of the product assuming that critical manufacturing attributes, such as defect rates and test coverage, were otherwise known. In addition, all calculations were performed based on categories, making some of the statistical assumptions questionable, since the defect levels can become large on a parts per million basis. The yield modeling of the HP work was based on binomial statistics which is clearly insufficient in dealing with complex SMT. Finally, the spreadsheet model used in the HP work did not allow for more than two test steps and it was targeted to be used by expert manufacturing test engineers rather than circuit designers.

The prior approaches in board manufacturing can be broken into five categories (discussed below), board level report card tools, board level economic models, DFM tools, semiconductor tools, and test equipment analysis.

Report Card Tools

Report card tools have as objective grading the manufacturability of a board based on the manufacturing attributes of the parts used on that board. To set up a report card tool, a manufacturing expert has to grade each part available to designers on the manufacturing attributes of interest. Examples of manufacturing attributes include assembly process yield, reliability, component defect rate, in-circuit test coverage, diagnosibility, placement (manual vs. machine), etc. The report card tool takes as input the component list for the board and gives an overall score for the board based on the score of the individual parts. There is also the ability to weigh certain manufacturing attributes heavier than others. Once the result is available, the user can rerun the tool with different components and optimize the report card grade.

Mentor Graphics and Texas Instruments have a product called Manufacturing Advisor PCB (sold by Mentor Graphics, ibid.). This manufacturing advisor is based on a report card technique and it focuses solely on the mechanical aspects of design for manufacturing, not addressing any of the test issues. The manufacturing attributes scored in the Manufacturing Advisor are board density, board height, part auto inserted and part quality problems.

Another example of a report card tool is IBM's Design Report Card (see J. Hume et al., "Design Report Card: A method for Measuring Design for Manufacturability." Proceedings of the 1993 International Test Conference, 986–91). Designs are graded from A to D in the following areas: assembly process yield, reliability, component defect rate, in-circuit test coverage, diagnosibility, placement (manual vs. machine), connector type, handling problems, and repairability. The areas graded are selected based on manufacturing and field failure data. Weighted numerical values are assigned to each design alternative depending upon the significance of each manufacturing attribute as far as ease of manufacture and quality level is concerned. This allows the grading of each board design early in the design process.

Report card tools will give an indication of the manufacturability of a board based on the manufacturing attributes scored. However, the output is qualitative in nature, providing users only an indication that the design is improved.

Economic Models

The motivation of economic modeling is to reduce the cost of test in manufacturing by selecting the optimal test strategy for a product, and by selecting the appropriate DFT features to support the selected test strategy. An example of economic models is the research by Dislis et al. (see C. Dislis, et al., "Economic Modelling for the Determination of Test Strategies for Complex VLSI Boards," Proceedings of the 1993 International Test Conference, 210–17), which employs economic modeling to determine the optimum board test strategy. The Dislis work models a large number of manufacturing faults, requiring manufacturing defect data on open faults in edge connector area, open faults in component area, open faults in the interconnect area, shorts in edge connector area, shorts in component area, shorts in the interconnect area, static component faults, dynamic component faults, functional dynamic board faults, calibration faults, resistor defects, capacitor defects, memory faults, and parametric faults. The model also requires financial information such as pay raises of employees, and depreciation of equipment. Obtaining and maintaining accurate data for all these fault models, if possible, would require an unjustifiable effort in a manufacturing operation, thus making the practical use of the model unrealistic. In addition, defect clustering and its effect on yield is not modeled, details of the test coverage model are not described, and validation of model results with real manufacturing data are not provided.

Another example of economic models is the High Level Test Economics Advisor by Abadir et al. (see M. Abadir et al., "High Level Test Economics Advisor," Proceedings of the 2nd International Workshop on the Economics of Design and Test for Electronic Circuits and Systems, Austin (1993)). This is a tool developed by the Microelectronics and Computer Technology Corporation (MCC of Austin Texas) to analyze the economics of different test strategies for multichip module designs. MCC is a consortium of various industrial companies, and has a very broad effort to model the MCM manufacturing line, from bare die testing to module testing. From the published results, much of the inputs to the model are reasonable estimates provided by a test and a manufacturing expert. When using the MCC model for test strategy selection the user instantiates this template as needed to model the desired test strategy. Next, the user assigns values for the yields and test coverages based on his or her experience or data from previous products. The resulting prediction is a direct result of the subjective user inputs. The MCC economic model provides an environment where a test expert can perform trade-off analysis and arrive at an optimum test strategy, provided that the estimates used for yield and test coverage are accurate. However, its broad use as a concurrent engineering tool is not feasible because the typical board designer lacks the necessary expertise to run the tool. Also the accuracy of the MCC model is directly proportional to the accuracy of the expert estimates provided by users.

Economic models have been used to determine the optimum test strategy for a product. Although this is an important issue, a more pressing problem in DFM and DFT is the optimization of quality, testability and manufacturing costs for each new design, even when the test process is already established. The economic models described above were not developed for this purpose as evidenced by the fact that clustering of defects is not considered, a significant number of inputs is necessary, and the model inputs are subjective and need to be estimated by manufacturing experts, rather than design engineers.

SMT assembly yield modeling in particular, is an important part of Design for Manufacturing (DFM) and of Design for Test (DFT) of electronic products. If the yield can be estimated accurately, the manufacturing cost, the capacity of a manufacturing line, the procurement of material, and the on-time-delivery of the product can be properly managed. On the other hand, if yield predictions are inaccurate, the effects will be felt in the manufacturing process and also in the profit margin of the product. An accurate yield model is particularly needed when the product is in the design stage, when trade-offs in DFM and testability can still be made.

DFM Tools

Alexander et al. developed a cost advisor for a DFM environment (see M. Alexander et al., "Cost Based Surface Mount PCB Design Evaluation," Proceedings of the 2nd International Workshop on the Economics of Design and Test for Electronic Circuits and Systems, Austin (1993)). It evaluates the design based on the cost of assembling the board. SMT machines are selected based on the size and type of components, size and type of board, and solder paste used. The input is CAD data and the outputs are the assembly sequence, assembly cost and throughput rate. This tool does not address test at all but rather focuses exclusively on manufacturing cost issues.

Semiconductor Tools

In the semiconductor industry, economic manufacturing models have been focused on wafer yield. ICs cannot be repaired so the focus is to increase yield to minimize cost. Testing also adds a significant cost due to the high price of semiconductor test equipment. Currently used IC yield models account for clustering of defects (see J. A. Cunningham, "The Use and Evaluation of Yield Models in Integrated Circuits Manufacturing," IEEE Transactions on Semiconductor Manufacturing, Vol. 3, No. 2, 60–71, May 1990).

Test Equipment Analysis Tools

In addition, others have analyzed optimum board test strategy selection which shows a user how to write simple models to justify a given test strategy or how to justify the purchase of certain test equipment. These analysis have value in exposing contributors to total costs of manufacturing, but could not be used as a concurrent engineering tool due to the post manufacturing nature of the measurements and metrics used by board test equipment.

It is clear from the above discussion that a need exists for circuit design tools and methodologies which integrate manufacturing test issues at all stages of the circuit design process.

SUMMARY OF THE INVENTION

The present invention solves the above problems by providing computer operable methods to enable effective Concurrent Engineering of an electronic product to thereby improve manufacturability of the product in a cost effective manner. The methods of the present invention estimate costs and quality of a circuit design by applying various models in conjunction with information regarding the circuit design. Exemplary of such estimates are yield, defects, cost, testability and other manufacturing issues. The methods of the present invention are integrated with standard computer aided electronic design tools to permit the circuit designer to effectively estimate the impact of various design decisions on issues of manufacturability. Integration with the design tools permits these trade-offs between functional design and manufacturability to be considered at all stages of the product design cycle.

The present invention comprises a circuit board and Multi-Chip Module (MCM) manufacturing test simulator (hereinafter referred to as MTSIM). MTSIM is a concurrent engineering tool used to simulate the manufacturing test and repair aspects of boards and MCMs from design concept through manufacturing release. MTSIM helps designers during the design phases to select assembly process, specify Design For Test (DFT) features, select board test coverage, specify Application Specific Integrated Circuit (ASIC) defect level goals, establish product feasibility, and predict manufacturing quality and cost goals.

MTSIM models solder faults, manufacturing workmanship faults, component performance faults and reliability faults. Fault probabilities for the board are estimated based on the component type, component functionality and the assembly process used. Up to seven manufacturing test steps can be simulated. Test coverage models will support all currently used manufacturing test methodologies, including visual inspection, in-circuit test, IEEE 1149.1 boundary scan, self-test, diagnostics and burn-in.

The present invention further comprises a new yield model for boards and MCMs which accounts for the clustering of solder defects. The new yield model is used to predict the yield at each test step. In addition, MTSIM estimates the average number of defects per board detected at each test step, and estimates costs incurred in test execution, fault isolation and repair.

MTSIM was developed to be used by designers in the optimization of the design for test and the design for manufacturability of their products. Therefore, MTSIM was implemented in the Mentor Falcon Framework (made and sold by Mentor Graphics Corporation, Wilsonville, Oreg.). This integration with standard design tools provides MTSIM with the same look and feel of other Mentor design tools to thereby encourage designers to test their designs at various design stages for testability and manufacturability.

MTSIM provides more precise estimates of manufacturability and test parameters of a circuit design to permit the designer to effectively design for manufacture and design for test. MTSIM provides quantitative estimates of fault probability, test coverage, test costs, and repair costs to thereby improve the design process over the use of prior report card tools.

MTSIM, in contrast with economic models, is a concurrent engineering tool, that is, a tool to predict manufacturing behavior while a product is still in the design phase. MTSIM provides "what-if" and pareto analysis capability, requiring minimum amount of user inputs and manufacturing data, and accurately simulating all aspects of manufacturing test early in the design phase. MTSIM has provides a better balance than do economic modeling tools between the needed user inputs and simulation accuracy. Fault clustering phenomena are accurately modeled in MTSIM. MTSIM is also suitable for test strategy optimization and assembly process defect simulation.

MTSIM requires minimum amount of inputs from designers and it is used to simulate the manufacturing test process of every new design. All simulations are performed at the component level, that is data is generated and simulated for each component instantiated in a board. A default library included in MTSIM models all manufacturing attributes necessary to predict quality, reliability, test coverage, fault isolation costs, repair costs and yields. In addition to simulation results, MTSIM provides pareto analysis to aid in maximizing benefit to manufacturability by selected design changes. This pareto analysis is provided at three different levels. The category pareto provides detailed simulation results grouped by component category. Each component is assigned a category based on its type. Pareto data is also available at the part number level, which groups results for multiple instances of the same part, and pareto data is also available on a per component basis.

The Manufacturing Test Simulator (MTSIM) of the present invention is a concurrent engineering simulation tool for manufacturing test, that is, a tool to predict manufacturing test behavior while a product is still being designed. Early prediction of manufacturing behavior drives design changes which optimize the product's manufacturability and testability, thus improving product quality and reducing cost.

Specifically, the present invention provides a method, operable on a computer, for estimating manufacturing test and quality attributes of an electronic assembly (including SMT circuit boards and MCM circuits) concurrent with the design of said electronic assembly. The method receives a description of the electronic assembly design from the user and pre-determined test and quality information relating to each component in said electronic assembly. The method also receives a description of a manufacturing test process.

The method then applies the pre-determined test and quality information to the supplied description of the electronic circuit design to simulate said manufacturing test process and thereby estimate said manufacturing test and quality attributes.

To simulate the operation of a manufacturing test, the predetermined test and quality information is applied to the electronic circuit design description to estimate an incoming fault probability value for each component in said electronic assembly. Next the manufacturing test process is applied to the electronic circuit design description and to said incoming fault probability value to estimate said manufacturing test and quality attributes.

The manufacturing test and quality attributes include: manufacturing test coverage, manufacturing test isolation, manufacturing test costs, assembly reliability, assembly repair costs, and assembly yield.

The incoming fault probability value (Pfi) of a component is determined as:

$$Pfi = 1-(1-fp)^n$$

where:
n is the number of trials of a test step and is derived from said predetermined test and quality information,
fp is the probability of a fault occurring in a component in a test step and is derived from said pre-determined test and quality information.

The methods of the present invention includes a new model to determine assembly yield (Y) which accounts for the clustering effects typical of solder assembly defects. The yield is determined as:

$$Y = Ycl \cdot Yncl$$

where:
Ycl is the yield determined from clustered solder defects, and
Yncl is the yield determined from non-clustered assembly defects including functional defects. The clustered yield (Ycl) is determined as:

$$Ycl = \left[ 1 + \frac{Do}{\alpha} \right]^{-\alpha}$$

where:
$\alpha$ is the clustering factor, and
Do is the estimated average faults per assembly as discussed below.

The non-clustered yield (Yncl) is determined as:

$$Yncl = e^{-Do}$$

The average number of defects (Do) in said electronic assembly is estimated as:

$$Do = \sum_{j=1}^{N} Pfi_j * TC_j$$

where:
$Pfi_j$ is the incoming fault probability value corresponding to the j'th said component in said electronic assembly as above,
$TC_j$ is a test coverage value corresponding to the j'th said component in said electronic assembly discussed below, and
N is the number of components in said electronic assembly.

The simulator of the present invention provides pre-determined test and quality information defining test attributes including: in-circuit, boundary scan, self test, functional test, incoming inspection, and visual inspection. The present invention also provides test coverage and isolation information for each test attribute appropriate for each component of said electronic assembly. The test coverage value used above to determine the average defects per assembly is determined to be the highest test coverage value of all test attributes appropriate to the component. This pre-determined information and other information known to manufacturing experts associated with the manufacture of electronic assemblies are contained in library files stored in the computer system on which the methods operate. The library files provide the expertise of manufacturing engineers and history to the user of the present invention to aid in design for manufacturability and design for testability of electronic assemblies concurrent with the functional design of those electronic assemblies.

The simulator of the present invention may also be utilized, in conjunction with a fixed electronic assembly design, to evaluate improvements in testability and quality attributable to changes in the manufacturing test process or changes in the manufacturing assembly process.

The present invention also provides pareto analysis ranking of said electronic assembly with respect to said manufacturing test and quality attributes of said electronic assembly, wherein said pareto analysis ranks each component used in said electronic assembly with respect to contribution to said manufacturing test and quality attributes. The pareto analysis may also be performed to rank unique part numbers as well as categories of components.

These and numerous other features, objects, and advantages of the present invention will become apparent from the following detailed description when read in conjunction with the accompanying drawing.

DETAILED DESCRIPTION OF A PREFERRED EMBODIMENT

OVERVIEW

Figure 1:
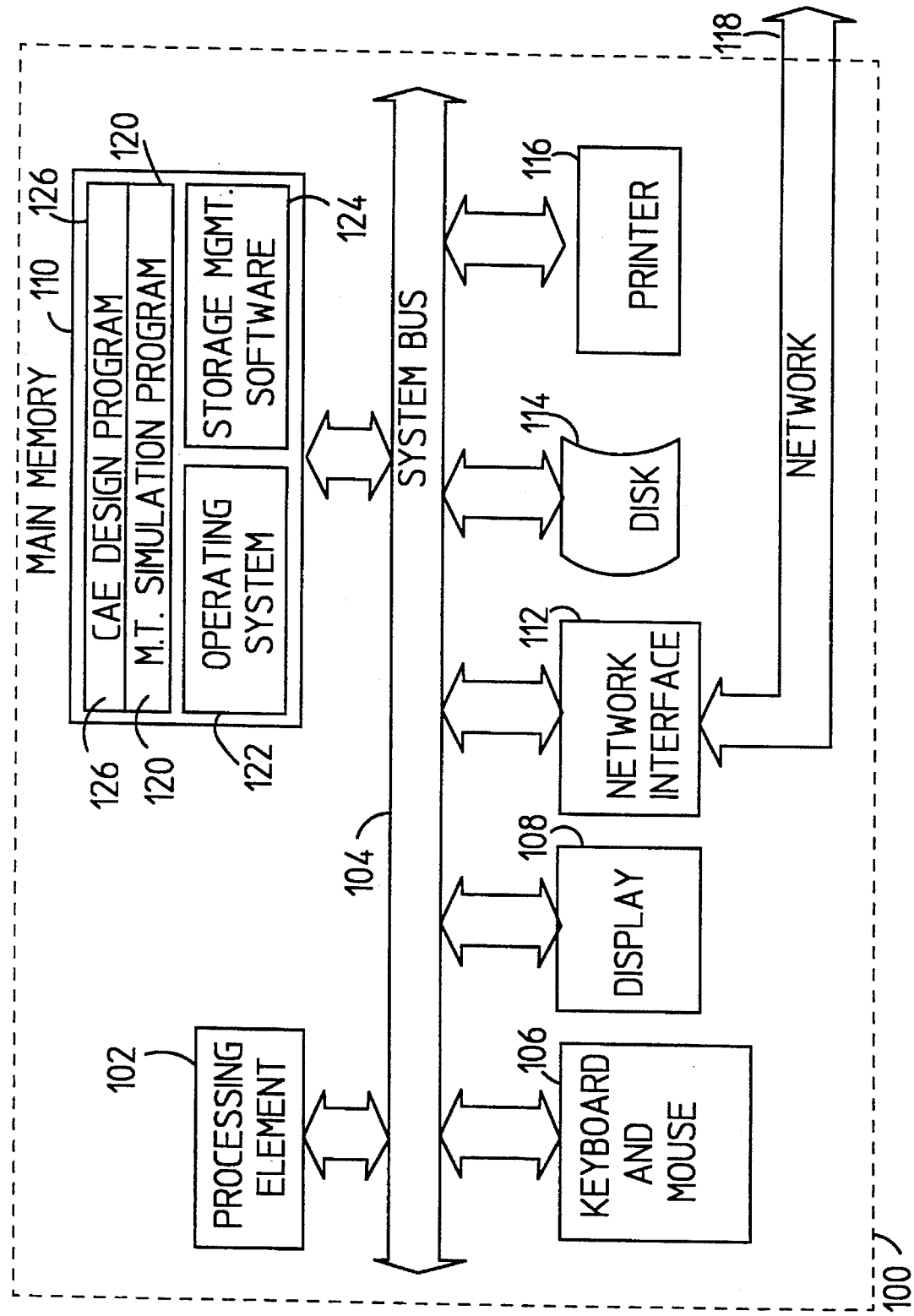
FIG. 1 depicts an exemplary computer system which comprises the manufacturing test simulation methods of the present invention.

FIG. 1 shows a block diagram of the manufacturing and test simulation system 120 of the present invention. In FIG. 1, a computer system 100 contains a processing element 102 which communicates to other elements within the computer system 100 over a system bus 104. A keyboard/mouse 106 is used to input information from a user of the system, and a display 108 is used to output information to the user. A network interface 112 is used to interface the system 100 to a network 118 to allow the computer system 100 to act as a node on a network and to thereby communicate with other nodes on the network. A disk 114 is used to store the software of the manufacturing and test simulation system of the present invention and to store the data relating to product designs and simulations. A printer 116 can be used to provide a hard copy output of the simulation results.

A main memory 110 within the system 100 contains the software methods of the manufacturing and test simulation system 120 of the present invention. A computer aided electronic design program 126 is integrated with the simulation system 120. Both rely on services supplied by an operating system 122 and storage management software 124 to perform the manufacturing and test simulations requested by the product designer. The computer aided electronic design programs 126 may operate locally, within computer system 100 or may operate on other computer systems attached to, and communicating over, network 118. It will also be recognized by those of ordinary skill in the art that the information stored locally on disk 114, may also be stored locally in main memory 110, or may be distributed over other computer systems accessible via network 118, or in any combination of storage devices. More generally, the information used by the design program 126 and the simulation system 120 may be stored in any memory device having suitable capacity and performance characteristics.

The simulator of the present invention operates in cooperation with computer aided electronic design tools to predict behavior of an electronic circuit design based on software models of the key components of the product being modeled. Simulation output is based on the circuit board topology (the layout of the board and the components used), the testability attributes of the circuit board, models of the manufacturing process, and models of the test process. By using this approach, circuit designers are able to simulate manufacturing test of their designs, and based on the simulation outputs, make changes to the design which will improve the quality and reduce the manufacturing cost of the product. Without the simulator of the present invention, the need for design changes will not be apparent until the product reaches volume manufacturing. Once the product is in volume manufacturing, the only alternative to implement changes is a costly redesign.

At the highest level, the simulation approach of the present invention models fault probability, test coverage, isolation costs, and repair costs for each component, at all test steps in manufacturing. Aggregate board measures of quality and cost are derived from the per component simulation data.

The selection of fault models in the simulator of the present invention reflects a delicate balance between modeling detail, and availability of input data. As discussed above, previous approaches attempted to provide accurate models by modeling a large number of fault classes, thus rendering the model practically unusable in the manufacturing environment due to lack of input data. In the simulator of the present invention, the fault models selected were solder faults, workmanship faults, functional faults, and reliability faults. This selection was based on examining historical failure data in manufacturing environments to conclude that this fault breakdown is sufficient to obtain simulation results accurate to within 10% of manufacturing historical data. These selected fault classes in the simulator of the present invention require only manufacturing defect data which is readily available on databases of most manufacturers. Validation of these fault models with actual manufacturing data demonstrates accurate simulation results.

The statistical models respect the underlying assumptions of the distribution theory on which they are based. Namely, all simulation is performed on a per component basis, thus insuring that defect rates are sufficiently small. This allows the usage of average PPM (parts per million) failure rates as model inputs. Average PPM failure rates are commonly available in manufacturing databases.

Current board yield models are based on a binomial distribution of defects. This approach predicts the yield well for assemblies which are not very complex. However for complex SMT (surface mount technology) boards, namely boards for which the average number of defects is greater than one, the binomial model will underestimate the yield since there is significant clustering of defects in a SMT production line. The manufacturing test simulator (MTSIM) of the present invention introduces a clustered yield model based on the negative binomial distribution, and discussed below.

Test coverage and test isolation models were developed to estimate the test coverage and the fault isolation capability of each test step. This innovation replaces the need of a manufacturing test expert to subjectively estimate test coverage and test isolation levels, as is the case in all previous approaches discussed above.

Finally, the present invention provides accurate quantitative results, including fault probabilities, test coverages, test costs, and repair costs, as discussed below. The approach also supports "what-if" and pareto analysis of any manufacturing attribute simulated as discussed below.

MTSIM METHODS

The methods of present invention are integrated with the circuit design environment with the same look and feel of other design tools. In addition MTSIM's test coverage model shelters the user from intimate knowledge of manufacturing test techniques, providing estimates for test coverage and test isolation of all test techniques available in board test. The test steps are fully configurable by a designer/user of the simulator, and repair and shipping can be enabled or disabled at each step.

One of the key objectives of MTSIM is to be a part of the design cycle. To this end, MTSIM minimizes the need for user input, as compared to prior approaches, by providing a library containing manufacturing data. This library is used by the simulator models to predict the manufacturing attributes of a board. The library is originally set up by a manufacturing expert, and then used by numerous designers. The result is that designers can simulate manufacturing test issues without becoming manufacturing experts. In contrast, all the previous work, described above, requires a manufacturing expert to run the model for each individual board design.

"What-if" and pareto analysis are also unique contributions of MTSIM. During pareto analysis, the user can evaluate simulation results sorted to determine the top pareto contributors in faults, test coverage, isolation time, repair cost etc. Pareto analysis can be done at three levels of abstraction, namely: individual components, groups of components with the same part number, and groups of components with the same component category. All part numbers are assigned a category based on the type of package, level of integration and functionality. "What-if" analysis assists the user in optimizing the test process flow, optimizing test coverage, minimizing defect rates, establishing appropriate levels of DFT investment, and establishing a reliability screen. Usually, "what-if" analysis will follow pareto analysis. During pareto analysis, major contributors to poor quality and test/repair costs are exposed, which drives the changes made in the next "what-if" analysis. This cycle continues until the optimum trade-offs are achieved.

Finally, the implementation of reliability models completes the tool, providing estimates on failures which will appear once the board has left the manufacturing floor and entered the warranty period in the customer environment. A bathtub curve can be generated based on data from a life test and an appropriate screen can be set up as part of the test process.

MTSIM USE

Figure 2:
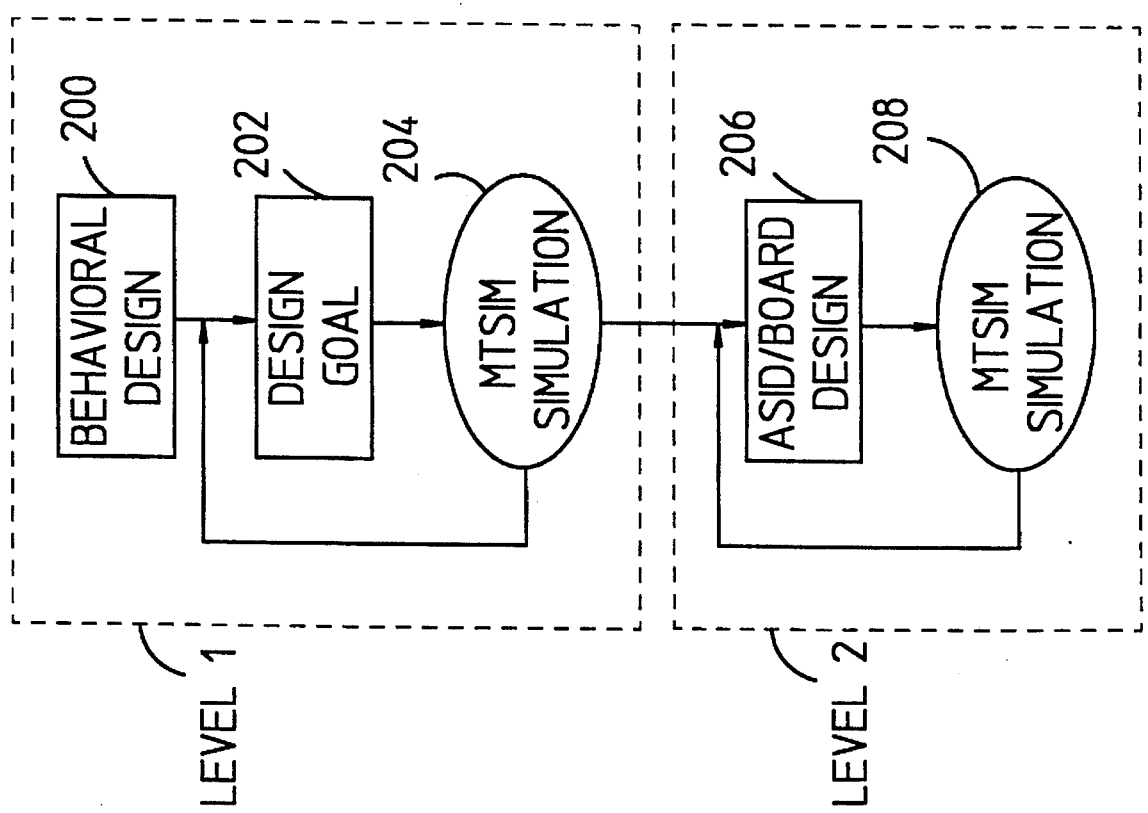
FIG. 2 is a high level flowchart indicating describing typical use of the simulation methods of the present invention for DFT and DFM design processes.

FIG. 2 shows a block diagram of MTSIM use. One purpose of the simulator is the designer's use for DFT and DFM of electronic circuit assemblies. When products are in their inception, a developer would perform a market analysis and estimate the size of the market and the retail value of the product. In addition, manufacturing is expected to provide an estimate of the manufacturing cost of the product. A large portion of the manufacturing cost is test and repair. The developer is also concerned with yields and outgoing quality from the manufacturing process. Designers using prior approaches make these estimates in a vacuum without any feedback.

MTSIM is used in this early phase, labelled "Level 1" in FIG. 2, to accept information regarding the circuit design and product goals then simulate the manufacturing and test processes and their key attributes. DFT of the product, including part selection and assembly process selection, will greatly influence the manufacturing test and repair. MTSIM exposes these sensitivities, providing feedback to the designer and ultimately driving changes in the design and DFT which optimize the product.

Once the original goals are agreed upon and the product enters the design phase, MTSIM can be used to predict the effect of unforeseen changes that occur during product development phase labelled "Level 2" in FIG. 2.

In addition, MTSIM is useful in conjunction with manufacturing process development. New assembly and test processes can be simulated before they are introduced, allowing for process tuning without affecting product ramps. This use of the simulator of the present invention is discussed below with respect to Test Process Simulation and Assembly Process Simulation.

DFT AND DFM SIMULATION (LEVEL 1 AND LEVEL 2)

All projects go through an early phase of validation and feasibility in the market place, which culminates at a review milestone when the project is either cancelled or proceeds to product development. It is preferable to negotiate testability features at this early planning phase. This is also the appropriate time to select the assembly technology used and the level of integration of ASICs. This early planning phase is labelled "Level 1" in FIG. 2.

Element 200 of FIG. 2 is representative of the planning for the desired circuit functionality (not necessarily the circuit design). Element 202 next operates to evaluate the planned functionality with respect to market requirements. Element 204 operates in conjunction with element 200 to iteratively refine the planned functionality to improve the product functionality with respect to manufacturing issues. The simulator use in this early phase is summarized in the following flow:

Establish preliminary cost and quality goals for the product
Create preliminary board placement or components list from desired architecture
Outline known testability features
Select assembly process
Build simulator model
Use MTSIM to predict and optimize testability, quality, cost, integration and technology The optimization described above with respect to element 204 is driven by pareto analysis of top contributors to poor quality and high cost. For example, MTSIM can compare the available assembly processes and determine the best yield versus assembly technology trade off.

Once the product proceeds to the development phase, the same simulator model is updated as more information becomes available. The simulator of the present invention is utilized in conjunction with the circuit design tools to refine the circuit design with respect to manufacturing test issues. Element 206 represents the operation of the computer aided electronic design tools. At any time in this design process, the circuit designer may invoke the simulator, represented by element 208 to evaluate the design with respect to manufacturing issues. In this phase, labelled "Level 2" in FIG. 2, the simulator is used to:
Define DFT needs on ASICs and board
Optimize ASIC defect level goals
Validate design partition
Validate assembly process choices
Optimize board test coverage levels
Predict effects in manufacturing test due to changes on the proposed DFT strategy
As the product is ready for manufacturing, the actual cost and quality goals are obtained directly from MTSIM simulation output. These cost and quality figures can be validated once the product reaches production. The validation can be used to continually improve MTSIM's accuracy. The outputs generated by the simulator are discussed in detail below.

TEST PROCESS SIMULATION

The test process is defined as the physical flow of a board through the test equipment and the kind of test equipment selected. A test engineer can use MTSIM to compare various test process and test equipment options. The simulator is used to model an existing board to establish a known starting point. Next, the simulator may be re-run with changes to the physical test process or test attributes of the test steps. Changes in the simulated product manufacturability may then be attributed to the change in physical test process.

ASSEMBLY PROCESS SIMULATION

MTSIM may be used to predict improvements attributable to changes in the assembly process. A process engineer uses MTSIM to estimate the manufacturability of a product design, then may iteratively evaluate the improvement in the product due to changes in the simulated assembly process used by the simulator. Such an assembly process evaluation is outlined as follows:
Simulating a product in the released process to establish a valid starting point
Create an assembly library for the new assembly process, simulate the same product again, and observe the predicted changes in the product quality, yield and cost
MTSIM is used to target resources, capacity, yields, coverage, cost and other production changes due to the new assembly process.

MTSIM ARCHITECTURE

Figure 3:
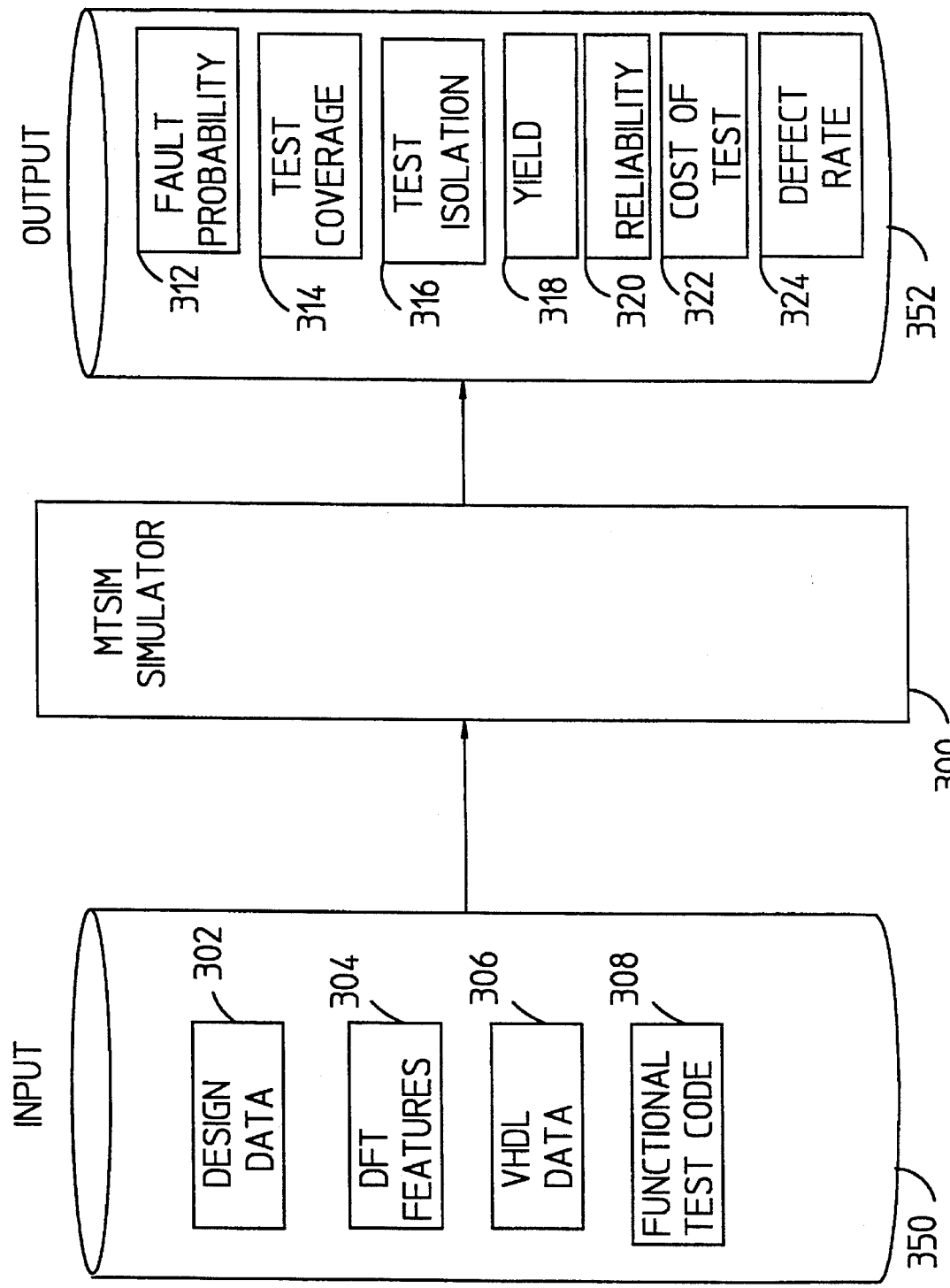
FIG. 3 is a block diagram indicating the relationship of inputs and outputs with the simulation methods of the present invention.

FIG. 3 depicts a high level description of the Manufacturing Test Simulator (MTSIM). The inputs 350 to the simulator 300 are depicted collectively at the left hand side of the simulator 300. The outputs 352 of the simulator 300 are depicted collectively at the right hand side of the simulator 300. The outputs 352 of MTSIM are manufacturing metrics which clearly communicate to designers how to improve the manufacturability of a board.

Inputs 350 to simulator 300 include several parts supplied by the circuit designer or by manufacturing process/test engineers. DFT features 304 of the design include test points, IEEE 1149.1 implementation, and BIST implementation. DFT features 304 are used to estimate coverage and isolation capabilities of a test. The VHDL model 306 of a board and its functional test code are used by other tools to estimate test coverage of the functional test code 308. The test coverage is read in by MTSIM and used in its test coverage modeling.

Design data 302 is supplied to simulator 300 by the circuit designer through operation of the computer aided electronic design system (e.g. Mentor's design database). This input describes the components and other design selections of the circuit designer in the creation of the product.

Outputs 352 of simulator 300 include fault probability 312, an estimate of the probability of faults on the board. Fault probability 312 estimation is useful in "what-if" exercises with different assembly processes and component failure rates. Test coverage 314 is a measure of the effectiveness of each test step in terms of fault detection. Test coverage 314 is a function of the DFT of the board. Test coverage 314 determines the output quality for a given fault spectrum. Test Isolation 316 is a measure of the test process' ability to isolate a fault to a given component, to a functional block or to a defect. Test isolation 316 to a defect via root cause analysis is extremely important in both the cost and the quality improvement cycle. Yield 318 gives the quantity of boards which will pass each step of the test process without failures. Yield 318 also determines manufacturing capacity. Reliability 320 gives an estimate of both the infant mortality failure rate and the useful life failure rate of a manufactured circuit design. Cost of test 322 estimates the cost of testing and repairing a board, including the cost of labor, test time, component cost and capital equipment cost. Defect rate 324 is the probability of faults left in a board after it has passed the board test process, which is a measure of the quality of a product.

MTSIM INTERNAL DESIGN

The MTSIM simulator 300 handles I/O operations, models the relationships between the design and the manufacturing processes, calculates all significant attributes, generates outputs, generates pareto analysis and controls "what-if" analysis. The simulator 300 is shown in additional detail in FIG. 13.

Figure 13:
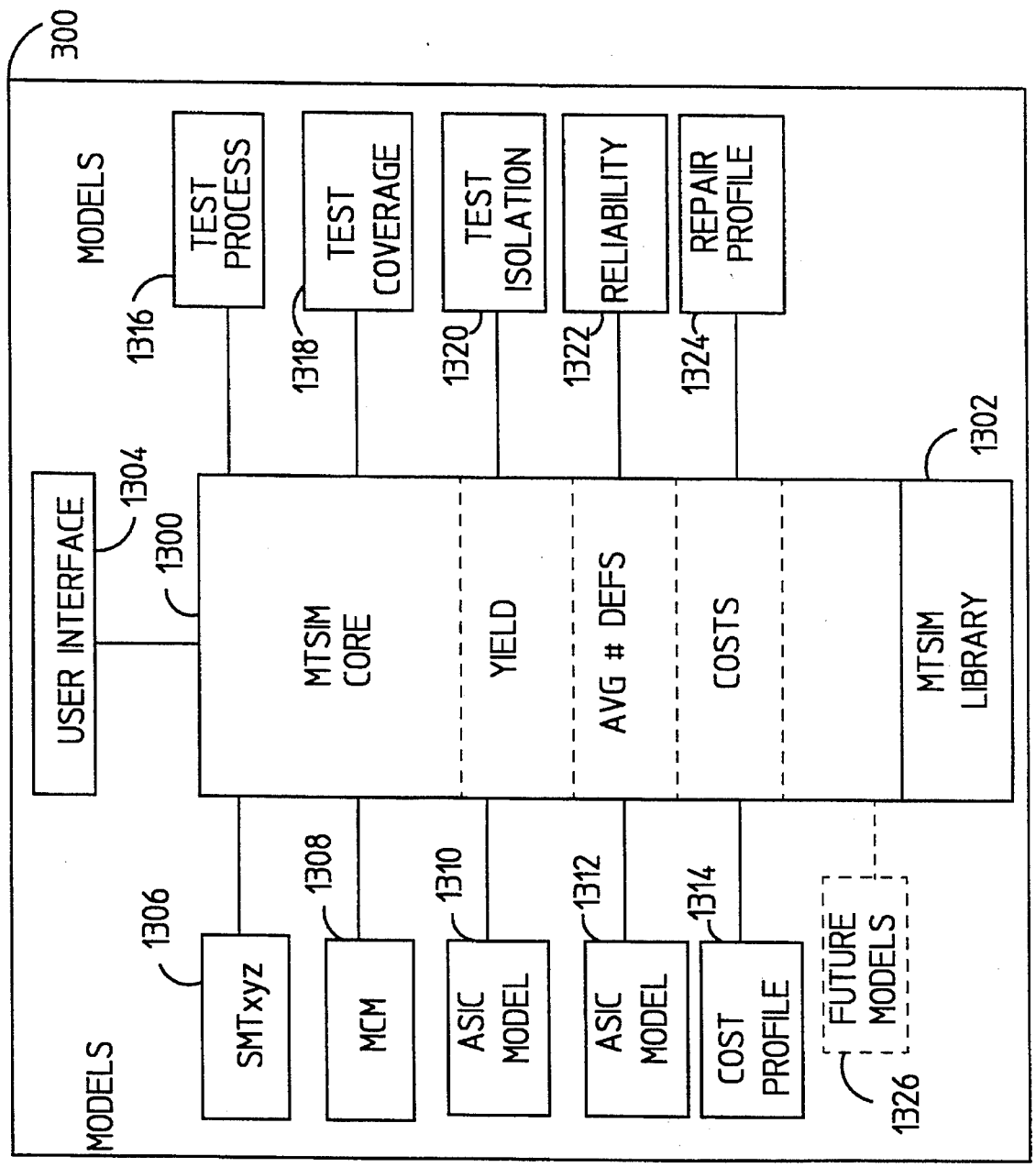
FIG. 13 is a block diagram indicating the relationship of various simulation models to portions of the simulation methods of the present invention.

As shown in FIG. 13, the simulator core 1300 has various components which serve to simulate different attributes of the manufacturing process of an electronic circuit design. The segments of the simulator core 1300 are labelled "CORE", "YIELD", "AVG # DEFS", and "COSTS". The simulator core 1300 is associated with the MTSIM library 1302 which is set up by an administrator and contains information on the manufacturing test process, the SMT assembly process, and the components used in the board. The library only needs to be set up once for the target manufacturing site, and then is used in the simulation of multiple assemblies.

Various models are utilized by simulator core 1300 to emulate assembly and test processes. In some cases, statistical models are used, and in other cases deterministic measures are used. These models, are shown in FIG. 13 as elements 1306 through 1324. Since manufacturing is not an exact science, the goal for these models is to provide a first order approximation of the manufacturing process based on empirical data gathered from past manufacturing experience. However, the modular architecture of simulator core 1300 of the present invention allows for inclusion of later developed, more accurate models. The ability to add new models is shown in FIG. 13 as future models 1326 with a dashed line to indicate its optional addition to the present invention. The various models used with the present invention are discussed in detail below.

USER INTERFACE

When running the simulator core 1300, a user needs to select the assembly process, and to specify the test process if different than the default provided. These data are provided by user interface 1304 of FIG. 13 to the simulator core 1300. The user interface 1304 represents the provision of information from the user to the simulator core 1300. This information may be provided as interactive input via keyboard/mouse 106 and display 108 of FIG. 1 or by files previously entered and stored on disk 114 also of FIG. 1. In addition, information may be required from the user as follows:

COMPONENT FILE—file containing the component part number, reference designator, Mentor design geometry, and component count. The component file can be obtained directly from the Mentor design database (design data 302 of FIG. 3), or provided in ASCII format by the user either interactively or through standard text editors to create an input file.

TEST ACCESS FILE—optional file which contains the number of component pins that have test access either via test points or boundary scan cells. The test access file is to be supplied by the user who obtains the information from the Mentor design database (design data 302 of FIG. 3).

COVERAGE FILE—optional file which contains self-test coverage for each component, if available from a VHDL coverage metric tool (VHDL model 306 of FIG. 3).

MTSIM CONTROL

Figure 4:
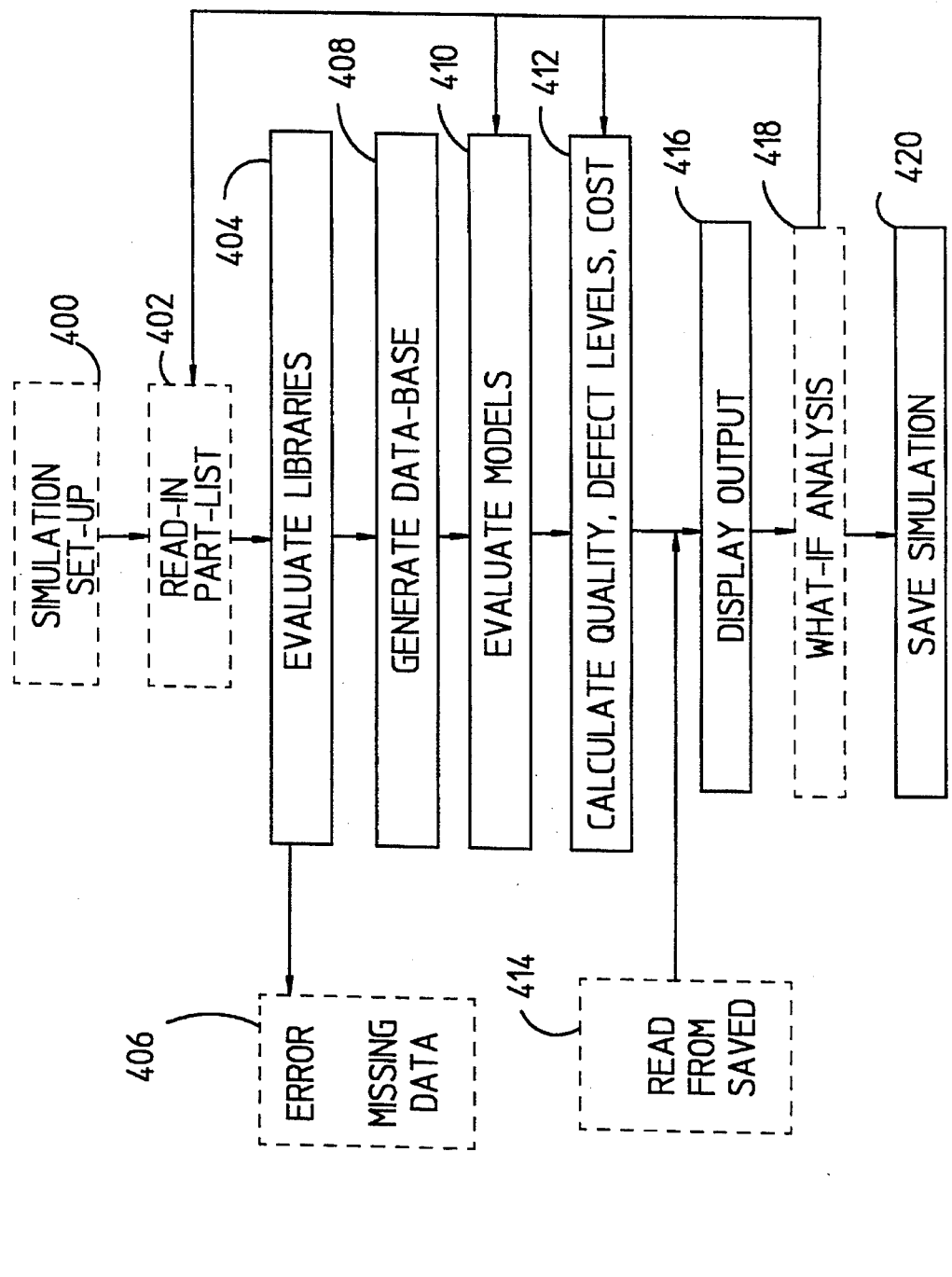
FIG. 4 is a flowchart indicating the overall flow of the simulation methods of the present invention.

Control of simulator 300 (of FIG. 3) is carried out by methods operable on computer system 100 of FIG. 1 which perform and coordinate interactions among the user, the various internal databases, and the models. In general these methods have two modes, direct mode and "what-if" mode. In the direct mode the simulator 300 uses the assembly and test processes, selected by the user, to perform the simulation and deliver the outputs back to the user for further use in improving the DFT and DFM of the electronic circuit. In the "what-if" analysis mode, the user can modify any of the available libraries and parameters, rerun the simulation and compare the results. FIG. 4 depicts the overall flow of control in the operation of simulator 300.

As depicted in FIG. 4, the simulation methods control all MTSIM activities. Boxes in dotted lines represent a step dependent on user interaction or user supplied information. Elements 400, 402, and 404 represent the start of a typical simulation. By operation of these elements, the user supplies basic setup information such as the directory or name which identifies the product design object to be simulated. This directory or name is used to identify and locate files which needed for the circuit design simulation and also serve to identify the location of database files created by operation of the simulator. It should be noted that multiple simulations can be created for the same design object. Each of these multiple simulations is self contained and can be rerun at any time. Once the user provides a simulation name, MTSIM checks if the simulation with that name already exists. If one exists, MTSIM asks the user whether the simulation is to be rerun with previous setup values or with new setup values and whether the results are to be appended to previous results or overwrite previous results. If this is a new simulation, MTSIM creates a directory with the simulation name under the appropriate directory. Next MTSIM asks the user if a Mentor component file is to be used, or a custom component file. Based on the answer MTSIM parses the input file to read in the parts list from the component file. Next MTSIM checks for the existence of library files required to run the requested simulation on the requested product. If any library files are missing or otherwise unusable, the process terminates with an error as shown in element 406.

The first step on a new simulation is to make copies of the MTSIM default libraries under the newly created simulation directory. Other files are created in the identified directory as needed for the requested simulation as follows:

| | |
|---|---|
| "comp_file.sim" | Parsed version of the input component file |
| "mtsim_lib.sim" | MTSIM library file for each component used |
| "tst_proc_lib.sim" | Test process library simulation file |
| "tst_para_lib.sim" | Test parameter library simulation file |
| "assy_proc_lib.sim" | Assembly process library simulation file |
| "func_dr_lib.sim" | Functional defect rate library simulation file |
| "reli_dr_lib.sim" | Reliability defect rate library simulation file |
| "repl_time_lib.sim" | Replacement times library simulation file |
| "tst_access_file.sim" | Test access library simulation file |
| "funccov_file.sim" | Functional coverage library simulation file |
| "reli_dat_lib.dss" | Reliability life test data library simulation file |
| "reli_plot_lib.dss" | Reliability life test plot simulation file |
| "comp.par" | Component pareto file |
| "pnum.par" | Part number pareto file |
| "categ.par" | Category pareto file |
| "tst_pareto_file.sim" | Test access pareto simulation file |
| "report.sim" | ASCII output of the simulation results |

Once all the simulation files are created, MTSIM element 408 of FIG. 4 starts building a database for the simulation on a per component basis. For each component, the simulation libraries containing manufacturing test data for each component are evaluated and the data used by the circuit design is loaded. Also the library information for various defect rates, test process, and repair profile is loaded.

The next step in the simulation is to evaluate the models, including the assembly defect model, the functional defect model, the test coverage model, the test isolation model, and the repair model. All these models are evaluated on a per component basis by operation of element 410 of FIG. 4.

Next, MTSIM starts simulating the circuit by operation of element 412. For each test step enabled, and for each component, MTSIM calculates the fault probability in and out of a test step, the average number of defects detected at a test step, the isolation and repair times at the test step, and the volume into the next step. The yield and cost of each step is also calculated. Reliability estimations are made, aggregate output is generated and the output is displayed in the user interface window by operation of element 416.

MTSIM is capable of performing "what-if" analysis for every parameter of the simulation wherein a particular parameter or set of parameters is changed and the entire simulation re-run. In this manner, the contributions of individual parameters to the overall product manufacturability can be isolated and evaluated. Based on top pareto output information, the user can modify an entry in one of the library file menus and re-run the simulation, generating new results for comparison. These what-if simulations can be stored for further evaluation. Typical what-if simulations will include changes in the test process flow, sensitivity analysis on defect rates, sensitivity analysis on test coverages, and comparison of assembly processes.

Element 418 is operable to determine whether the user wishes to perform "what-if" analysis. The user is then prompted to enter the desired "what-if" changes and element 418 continues operation of the process with element 402, 410, or 412 depending upon the nature of the changed parameters. Certain changes may require re-reading the parts list by operation of element 402, while others may require the re-evaluation of the manufacturing models by operation of element 410.

Element 420 is operable to save the present settings for the operation of the simulator. Saving the state of the simulator permits later continuation of the "what-if" analysis by the user. If a user desires to resume "what-if" analysis from a previous simulation run, the previous simulation is identified as described above by operation of element 400, and then processing continues with operation of element 414 to read all required settings from the previously saved simulation run.

Figure 14:
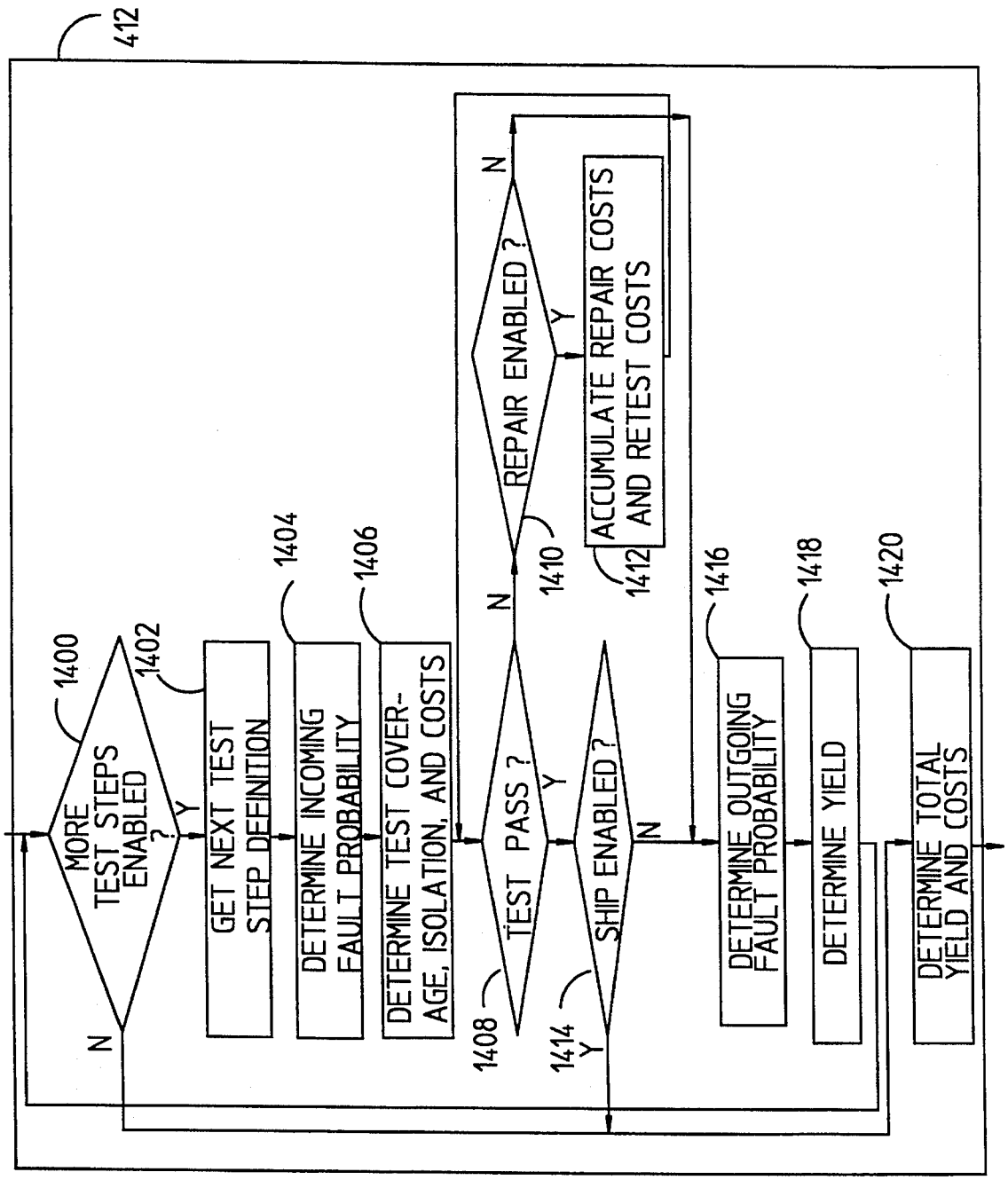
FIG. 14 is a detailed flowchart describing the accumulation of test information through simulated operation of the test process used in the simulation methods of FIG. 4.

FIG. 14 provides additional detail of the operation of element 412 of FIG. 4 which calculates quality and cost measures for the selected test steps in the test process model supplied to the simulator. Element 1400 is operational to loop over all defined test steps in the current test process model provided to the simulator. As discussed below, up to seven test steps are allowed in the preferred embodiment of the simulator though any number may be selected for a particular implementation. If more test steps are yet to be simulated, element 1400 continues processing with element 1402. Otherwise, element 1400 continues processing with element 1420 to total all estimated yields and costs for reporting to the user.

Element 1402 reads information defining the next test process step to be simulated from the test process definition library files discussed below. Element 1404 then operates determine the incoming fault probability. The incoming fault probability is the outgoing fault probability of the preceding step as discussed below with respect to element 1416. For the first test step, the incoming fault probability is estimated from the circuit design information supplied by the circuit designer. Element 1406 is then operable to simulate the defined test step to determine the coverage, isolation and costs of the test step.

Element 1408 determines whether or not the circuit would pass the test step, simulated by operation of element 1406, given the incoming fault probability. If the test would fail to pass the circuit, element 1410 is operable to determine whether the repair option is enabled for the current test step. If the repair option is enabled, element 1412 determines and accumulates the additional costs associated with repair and re-test of the circuit. Processing then continues by looping back to element 1408 to determine if the simulated re-test would pass the circuit. Additional repair and re-test loops are possible and element 1412 operates each time to accumulate the additional repair and re-test costs.

If the circuit fails to pass the simulated test step of element 1406 (or re-test of element 1412) and the repair option is disabled for this test step, then repair and further testing is skipped and processing continues with element 1416.

If the circuit passes the simulated test step of element 1406 (or retest of element 1412), then element 1414 determines whether the ship option is set to stop simulation of later test steps. If the ship option is set, then the circuit, having passed the simulated test or re-test, has completed the simulated test process and the method continues with operation of element 1420 to total the costs and yield as described above.

If the ship option is not set, then the process continues the test process by determining the outgoing fault probability after the simulated test step. This outgoing fault probability is used as the incoming fault probability of the next test step defined in the test process. Element 1418 is then operable to determine the product yield resulting from the operation of the current test step. Processing then continues by looping back to operation of element 1400 to process further test steps in the test process as described above.

This test process simulation provides the designer the flexibility to estimate costs and yields for many different models of manufacturing test. A variable number of test steps may be defined. Each test step may include or exclude a repair and re-test cycle. Each test step may optionally terminate testing if a circuit passes the simulated test step.

MTSIM MODELS

As mentioned above, the MTSIM methods of the present invention utilize a number of models to describe various process and product parameters useful in simulating the manufacturing test of an electronic circuit design. Listed below are the models as depicted in FIG. 13 followed by a more detailed description of the purpose and content of each model:

1. SMT XYZ MODEL (1306) and MCM MODEL (1308)—Estimates the expected assembly failure rates from the process being used. Statistical model of the assembly process used.

2. ASIC MODEL (1310) and MERCHANT MODEL (1312)—Models the functional defect rate of a custom ASIC or merchant components.

3. COST PROFILE MODEL (1314)—Models the cost of executing a particular test process in the manufacturing floor. Includes the cost of operators, technicians and capital equipment.

4. TEST PROCESS MODEL (1316)—Models the dynamics of the test process as implemented in manufacturing.

5. TEST COVERAGE MODEL (1318) and TEST ISOLATION MODEL 1320)—Models the coverage and isolation of the test attributes of each test step. Test attributes include in-circuit, Boundary scan, self test, functional test, incoming inspection, visual inspection and others.

6. RELIABILITY MODEL (1322)—Estimates the useful life defect rate and infant mortality of the boards being simulated.

7. REPAIR PROFILE MODEL (1324)—Provides the repair profile for standard packages and faults.

An accurate characterization of the fault probability is the first step in board and MCM simulation. Fault probability and test coverage are used to estimate the average number of defects per board. The fault probability spectrum can be broken into three major parts: the assembly faults caused by the SMT manufacturing process (such as solder opens, solder shorts, misloads, cracked etc.), functional faults, which include single component performance faults and multiple component interaction faults, and reliability faults which accounts for failures in time. The SMT XYZ (1306) and MCM (1308) models address the assembly fault probability, the ASIC (1310) and Merchant (1312) models address the functional fault probability and the Reliability model (1322) addresses the reliability fault probability. Various of the above identified models are discussed in detail below.

FAULT PROBABILITY MODELS

The assembly fault probability model and functional probability model are based on a binomial distribution of defects. To calculate the fault probability before test, consider a series of n independent trials, each resulting in either a fault or no fault, with fp being the fault probability in any trial. Further assume that fp remains constant from trial to trial. Then defining X as the random variable for the number of faults in n trials, the probability of k faults in n trials has a binomial distribution given by:

$$P[X = k;n,fp] = \frac{n!}{k!(n-k)!} fp^k (1-fp)^{n-k} \quad (3.1)$$

In the MTSIM methods, we are interested in the probability of at least one fault, which is one minus the probability of zero faults. To obtain the probability of zero faults in n trials, we set k to zero in the Equation (3.1) and obtain:

$$P[X=0]=(1-fp)^n \quad (3.2)$$

Then the probability of at least one fault before test, Pfi, in n trials with fault probability fp is:

$$Pfi=1-(1-fp)^n \quad (3.3)$$

In practice, it is not easy to obtain the fault probability fp for every component and every type of solder joint. In order to apply this model in the real world of manufacturing, we need to estimate the fault probability fp by defining the average point estimate fault probability, AvgFP, as:

$$AvgPF = \frac{NF}{NT} \quad (3.4)$$

where NF is the number of units that failed a certain test and NT is the total number that participated in that test. In the case of manufacturing data we approximate this average point estimate of the probability of a failure with data collected over the manufacturing life of components and solder joints. This data is usually kept in an average parts per million basis (PPM). In the case of new assembly process, estimates of the average point estimate of the probability of a failure are obtained from the research and development of the new process. In the case of new ASIC designs, estimates are obtained from defect level models. For released processes and for components that are already part of inventory, this is a matter of characterizing current products to obtain the failure data.

The fault probability after test, Pfo, can be derived as follows. Assume there are n faults in the component, and m out of the n faults are covered by the test, that is, the test coverage is m/n. Define A as the event in which the component has 0 faults, and define B as the event in which m out of n faults have been tested and were found good. The probability of zero faults after test is equal to the probability that the component has zero faults given that m out of n b have been tested good. This probability is the conditional probability of event A given event B, expressed as:

$$P[A|B] = \frac{P[A \cap B]}{P[B]} \quad (3.5)$$

but, the probability of A intersect B is equal to the probability of A which from $$P[A]=(1-fp)^n \quad (3.6)$$

The probability of B is the probability of zero faults out of the m tested faults, given as:

$$P[B]=(1-fp)^m \quad (3.7)$$

by substitution we have:

$$P[A|B] = \frac{(1-fp)^n}{(1-fp)^m} \quad (3.8)$$

or:

$$P[A|B]=(1-fp)^{n-m} \quad (3.9)$$

rearranging, we obtain:

$$P[A|B] = (1-fp)^{n(-\frac{m}{n})} \quad (3.10)$$

however, we are interested in the probability of at least one or more faults after test, Pfo, which is one minus the probability of zero faults after test, or one minus the probability of A given B. We also substitute the test coverage for m/n in Equation (3.10), obtaining:

$$Pfo=1-(1-fp)^{n(1-TC)} \quad (3.11)$$

Putting this in terms of the incoming probability of zero faults Yi, we obtain:

$$Pfo=1-Yi^{(1-TC)} \quad (3.12)$$

Putting this in terms of the incoming probability of at least one fault Pfi, we obtain:

$$Pfo=1-(1-Pfi)^{(1-TC)} \quad (3.13)$$

where the probability of faults after test, Pfo, equal to one minus the incoming yield (1−Pfi) to the power of one minus the test coverage. From these equations it can be seen that high test coverage is imperative to minimize the probability of at least one fault after test.

In MTSIM all simulations are performed on a per component basis. When aggregate calculations are performed, statistical independence is assumed to calculate fault probability for multiple components. This statistical technique is known as multiplying the yields. When using this technique for n components, each with its own independent fault probability, then the probability of zero failures in the n components is equal to the product of the probability of zero faults in the individual components.

However, there is a potential problem with this independence assumption. When dealing with complex boards, the average number of defects per board can be greater than one, that is, a board will have on average more than one defect. In this case the overall PPM level for assembly failures will become very close to one million or a probability of one. Since we are multiplying the yields, the overall fault probability of the board will be limited to a maximum of one million PPM and that would underestimate the average number of defects per board.

MTSIM methods of the present invention avoid this problem by using the following methodology: since all calculations are performed on a per component basis, the probability of at least one fault is small enough such that the statistical assumptions hold on a per component basis. When aggregate board calculations are performed, they are based on the average number of defects per board which is not limited by the PPM ceiling when the computation saturates. Rather, it is an averaging of all of the defects on the board. The average number of defects per board, Do, found after test for each type of test is computed as follows:

$$Do = \sum_{j=1}^{N} Pf_{ij} * TC_j \quad (3.14)$$

where N is the total number of components, the fault probability, Pf, includes all types of faults modeled in MTSIM, and TC is the test coverage. These statistical techniques (equations (3.3) and (3.13)) are used in the development of the fault probability models for assembly and functional defects.

ASSEMBLY FAULT PROBABILITY

The SMT XYZ (1306) and MCM (1308) models take the defect rate per joint given in the assembly library file, and assume a binomial distribution of defects to compute the probability of at least one fault per component before and after test.

The first aspect of assembly defects is the solder joint fault probability. Let Psfi be the probability of at least one fault per component before test, Psfo be the probability of at least one fault per component after test, sDR be the defect rate per joint from the SMT XYZ (1306) or MCM (1308) model (also referred to herein as library), N be the number of leads in the component and aTC be the assembly test coverage. Then Psfi and Psfo are expressed as:

$$Psfi = 1 - [1 - sDR/1000000]^N \quad (3.15)$$

$$Psfo = 1 - [1 - Psfi]^{(1-aTC)} \quad (3.16)$$

where, sDR/1000000 is the average point estimate for solder joint fault probability obtained from the PPM based solder joint defect rate sDR, $[1-sDR/1000000]^N$ is the probability of zero solder joint faults in a component with N solder joints, and
$[1-Psfi]^{(1-aTC)}$ is the probability of zero solder joint faults for the component after test.

The other aspect of assembly defects is the workmanship fault probability. Workmanship defects are defined as defects which occur during the manufacturing assembly process, but are not solder related defects. We assume that workmanship defects occur on a per component basis and include reversed components, wrong value components, wrong revision components, etc. Let Pwfi be the probability of at least one fault per component before test, Pwfo be the probability of at least one fault per component after test, wDR be the component workmanship defect rate from the SMT XYZ or MCM library, and aTC be the assembly test coverage. Then Pwfi and Pwfo are expressed as:

$$Pwfi = wDR/1000000 \quad (3.17)$$

$$Pwfo = 1 - [1 - Pwfi]^{(1-aTC)} \quad (3.18)$$

where, wDR/1000000 is the average point estimate for component workmanship fault probability obtained from the PPM based workmanship defect rate wDR, and $[1-Pwfi]^{(1-aTC)}$ is the probability of zero workmanship faults for the component after test.

FUNCTIONAL FAULT PROBABILITY

In the case of functional defects the incoming functional defect level is obtained either from the functional defect rate library or from the component library. The model assumes a binomial distribution of defects to compute the probability of at least one fault per component before test. Let Pffi be the probability of at least one fault per component before test, Pffo be the probability of at least one fault per component after test, fDR be the component functional defect rate, and fTC be the functional test coverage. Then Pffi and Pffo are expressed as:

$$Pffi = fDR/1000000 \quad (3.19)$$

$$Pffo = 1 - [1 - Pffi]^{(1-fTC)} \quad (3.20)$$

where fDR/1000000 is the average point estimate for component functional fault probability obtained from the PPM based functional defect rate fDR, and $[1-Pffi]^{(1-fTC)}$ is the probability of zero functional faults for the component after test.

COST PROFILE

The cost profile model (1314) estimates the overall cost of testing the board. It is a model of the factory floor. Given the test times, the test process, the isolation and the repair information, it will estimate the cost of testing the assembly.

The cost profile model provides an accurate view of the financial aspects of testing the board. The labor and equipment rates given in the test process library need to account for utilization and efficiency. Also, overhead charges due to information system transactions or extra handling are to be included in the test operator time. There are four contributors to the cost of testing the board:

TEST OPERATOR COST—Operator cost to test and retest boards

TEST CAPITAL COST—Equipment cost to test and retest boards

TEST ISOLATION COST—Technician cost to isolate defects

COMPONENT REPAIR COST—Operator cost to repair boards

These costs are based on the average number of defects per board for each test step. The test operator time and test equipment time are functions of the board volume and of the number of defects. The board volume may decrease during the test process if boards are shipped after a given test step. MTSIM assumes that all boards that have a defect and are repaired in a given test step are also re-tested on that step. Isolation time and repair time are calculated on a component basis based on the type of fault and the type of component. Test times, isolation times and repair times are turned into costs by using the test and labor rates provided in the test process library as follows:

OPERA_RATE—Labor rate for operator in test execution $/hr

CAP_RATE—Rate for equipment used in test execution Cost $/hr

ISOL_RATE—Labor rate for operator or technician in fault Isolation $/hr

REPL_RATE—Labor rate for operator or technician in fault repair $/hr

TEST PROCESS

The test process simulates the physical test process of board manufacturing, that is, the physical test steps which will be performed in the manufacturing of the board. Once the physical process is established, the structure of the simulator is derived from the test process model (1316). The data needed for test coverage, test costs, and repair costs is obtained from the appropriate models (e.g. 1318, 1320, 1314, and 1324).

Figure 5:
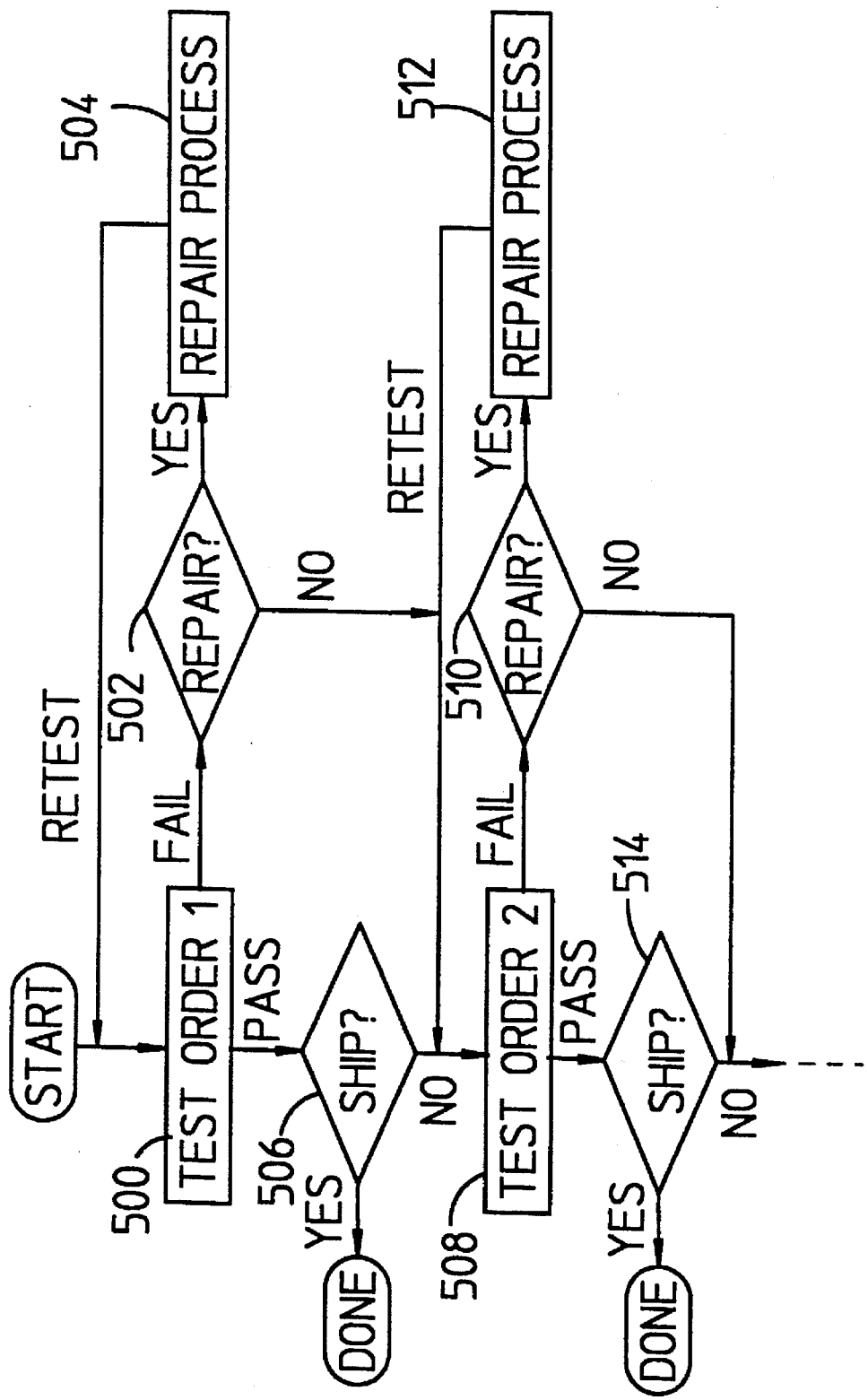
FIG. 5 is a flowchart showing additional detail of the simulation steps of FIG. 4 which simulate each configured test step defined by a given test process.

FIG. 5 is a general block diagram for the test process. The designer/user of the present invention specifies the test process via the test process library menu, described below. The test process model (1316 of FIG. 13) creates a linear flow for boards. Boards start at the test step which is declared in the test process library menu as the first step 500 of FIG. 5 (TEST_ORDER=1), and follows on through all of the enabled test processes. If the simulated test of the product by operation of element 500 fails then repair can be performed, or not performed, at each step as determined by operation of element 502 (REPL_ENABLED flag). If the simulated test of the product succeeds in operation of element 500, then boards may exit to the next level of system integration at any step as determined by operation of element 506 (SHIP_ENABLED flag). It is assumed that all boards will ship to the next level of system integration from the last test step with the fault probability remaining in the boards. This remaining fault probability can be interpreted as the incoming fault probability in the next level of integration such as system test. If the simulated test failed in operation of element 500 and the repair simulation option is enabled as determined in operation of element 502, then element 504 operates to simulate the repair efforts to repair the failed product. Costs associated with such a repair are estimated by the simulator operation of element 504. The repaired product is then retested by repeated operation of element 500 as described above.

If repair of simulated product failure is disabled as determined by operation of element 502, or if the product passes the simulated test and the modelled product is not shipped following the test success as determined by operation of element 506, then the test process continues to the next simulated test at element 508 of FIG. 5 (TEST_ORDER=2). Elements 508–514 operate identically to elements 500–506, respectively, to perform a second simulated manufacturing test. Additional elements, indicated by dotted line descending from element 514, may be included to simulate additional manufacturing test steps. The test process model depicted in FIG. 5 is extendible to include optimization simulations.

Figure 6:
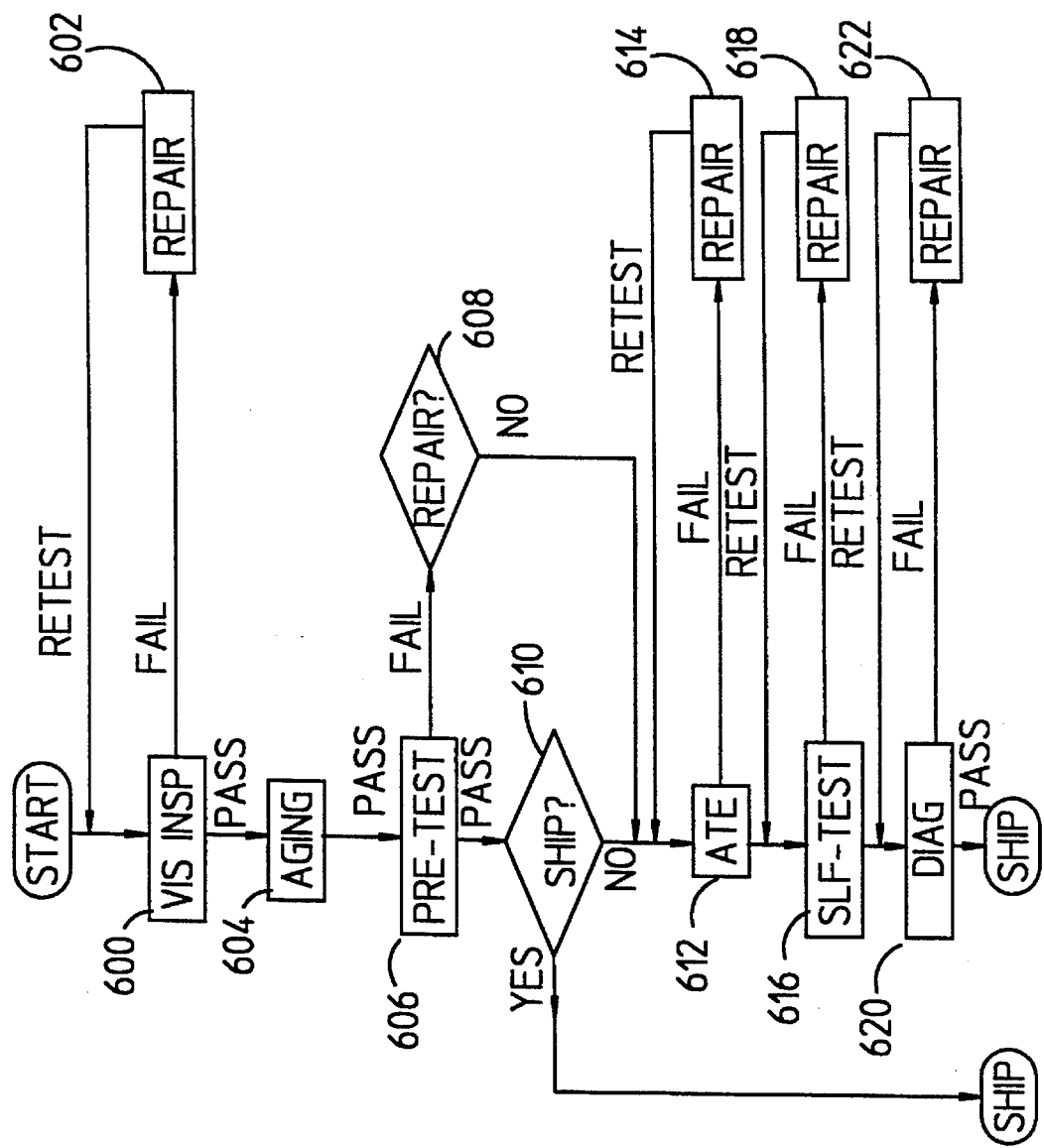
FIG. 6 is a flowchart of a typical test process capable of being modelled by the simulation methods of the present invention.

FIG. 6 depicts a more complex example of a test process flow which may be simulated by the methods of the present invention. In this example the user has defined several test steps to be simulated. The visual inspection test step of element 600 is an operator manual screening process to detect assembly defects. If the inspection reveals assembly faults, repair procedures are simulated by operation of element 602. The aging step of element 604 simulates the aging of the board to reduce infant-mortality failures. The nature of an aging step of element 604 is such that there is no mode of failure for the simulated test step. The repair option is thus irrelevant with respect to this test step. The pre-test step of element 606 is used to provide a high level of functional coverage early in the test process. The repair process associated with the failure of this pretest step of element 606 has been disabled as configured by the designer/user of the simulator. Thus, products which fail the pre-test element 606 are sent directly to the ATE test element 612 because element 608 always determines that repair is not required. However, the boards which pass the pre-test step are optionally shipped and do not have to go through the remainder of the test. Operation of element 610 determines whether products which pass the pre-test element 606 go directly to shipping or must first go on to more rigorous testing in further test elements, beginning with ATE test in element 612.

ATE test element 612 provides high levels of coverage and efficient isolation for assembly faults. Circuits which fail the simulated ATE test element 612 are next routed through a simulated repair element 614 to estimate the costs of required repairs. Repaired circuits are then re-tested by operation of ATE test element 612 until the circuit passes the ATE test element 612. Selftest element 616 and diagnostic test element 620 and their respective repair elements 618 and 622 operate identically to elements 612 and 614 to simulate further manufacturing test and repair operations. Self-test element 616 and diagnostic test element 620 provide high levels of coverage for both assembly and functional faults.

TEST COVERAGE MODELS

Figure 7:
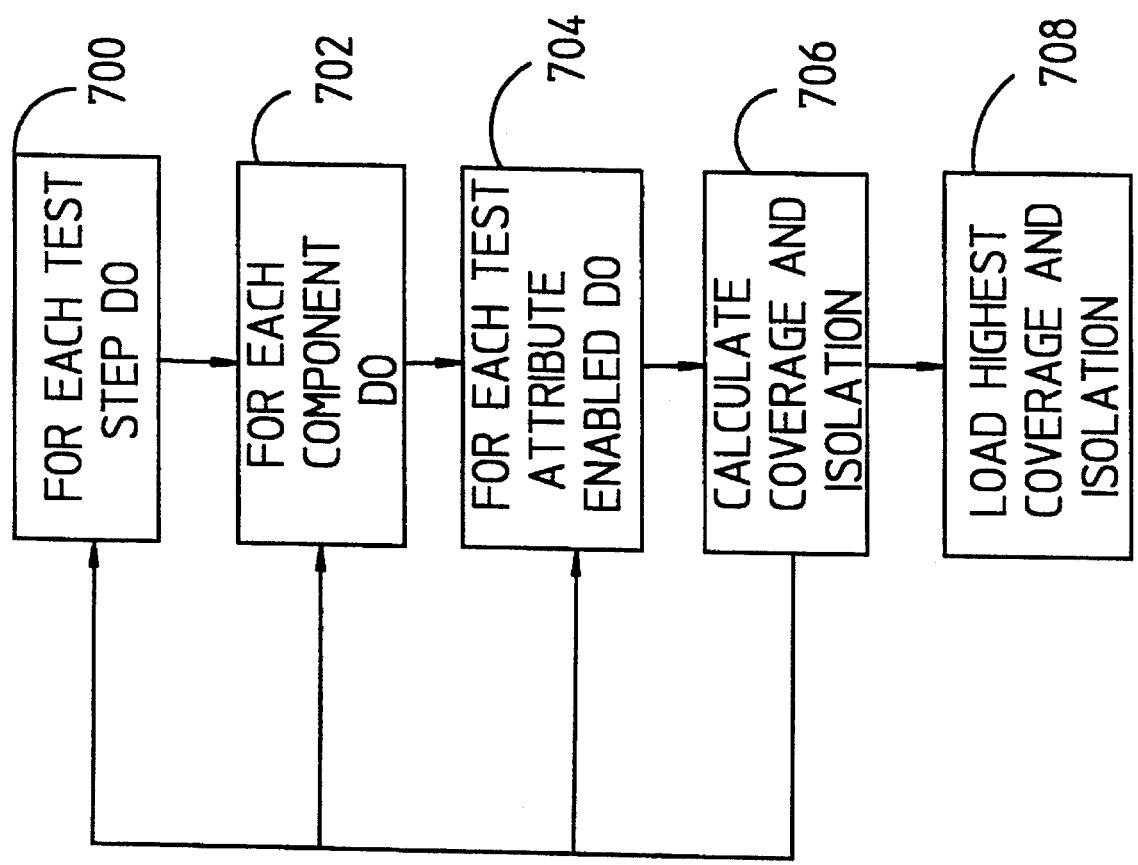
FIG. 7 is a flowchart showing the detail of steps in FIG. 4 which estimate test coverage and isolation values.

The most difficult parameter to estimate in the simulator of the present invention is the test coverage. Unlike prior approaches which merely guess at test coverage and isolation values, the simulator of the present invention derives a coverage and isolation estimate based on the attributes of the test step and the DFT attributes of the components and circuit design. FIG. 7 is a high level view of the test coverage model algorithm.

As shown in FIG. 7, element 706 is operated within three nested loops. The innermost loop invokes element 706 once for each test attribute of a component under control of element 704. This innermost loop, comprising elements 704 and 706, is operated by the next loop once for each component in the circuit design under the control of element 702. This middle loop, comprising elements 702–706, is operated by the outermost loop once for each test step selected in the simulator test models under control of element 700.

Each invocation of element 706 in the triple nested loops of FIG. 7 computes the test coverage and test isolation for a particular test attribute of a particular component in a particular simulated test step of the manufacturing test process. Element 708 is operable at the completion of the triple nested loop execution of element 706. Element 708 saves the best values computed by operation of element 706 for test coverage and isolation. The best coverage value is the highest test coverage while the best test isolation value is the shortest isolation time computed by element 706.

This derivation of test coverage and test isolation allows for coverages from multiple test attributes to overlap with the highest coverage prevailing. The modeling of coverages for each test attribute is based on intimate knowledge of each of the test techniques used in manufacturing and shelters designers from having to gain that expertise. For instance, self-test and diagnostics will typically cover the same functional faults on a component. Diagnostics will usually have higher coverage, while self-test will have better isolation capabilities (i.e. shorter time to isolate the problem). If both test attributes are modeled in the same test step, the higher coverage will prevail along with the longer isolation time. However, if the two test attributes are modeled in separate test steps, the coverage of self-test and its isolation capability will be loaded for the self-test step.

In-circuit test techniques include analog unpowered, analog in-circuit, digital in-circuit and functional in-circuit. User manuals of in-circuit testers give detailed description of theses tests, and real life experience implementing them allow for modeling their coverage based on knowledge of board attributes such as component type and number of test access points. For boundary scan tests, the coverage and isolation are proportional to the number of device pins that have boundary scan capability. Isolation capability is typically very high, as long as there is a designated driver and receiver on the net.

Built-In Self Test (BIST), and other board level structured test techniques have their coverage estimated based on experience using these techniques. Unfortunately, when it comes to functional coverage, a stuck-at fault coverage measure is not sufficient to estimate functional coverage, since functional failures are dominated by delay and interaction faults.

Reliability tests are modeled in terms of their burn-in and strife capabilities. The underlying assumption is that the reliability testing is only eliminating failures in time and is not adding any coverage to the assembly and functional faults.

As new test techniques emerge, they can easily be added to the test coverage model. Exemplary additions to the test coverage models of the present invention are analog boundary scan developed by the IEEE P1149.4 working group, and thermal inspection of boards.

Test effectiveness is defined as the actual detection of faults by the given test coverage. As with the fault probabilities, test coverage is estimated for both assembly and functional faults for each test step. However test coverage is not the same as test effectiveness since there are two kinds of errors which can occur: Type I errors and Type II errors. Type I errors occur when the test fails the board and the board is fault free. Type I errors are modeled by introducing a No Trouble Found (NTF) defect rate, as described below. Type II errors occur when the test passes the board, but the board has a fault, which should have been detected by the test. Type II errors are modeled by scaling down the estimated coverage by an experimental factor. This experimental factor is derived from the manufacturing data and is entered in the test parameter library as described below.

To illustrate the test coverage model, an exemplary version of a software function which estimates coverage and isolation for an large scale integrated circuit (LSI) is given below. The TEST PARAMETER entries refer to the test parameter library (described below), and its entries for the various types of coverages and isolations for each test attribute. Note that in this model, only the enabled test attributes would be considered. The exemplary function is invoked by each operation of element 706 of FIG. 7. The function retrieves the test coverage and test isolation values associated with a particular test attribute of a particular component in a particular simulated test step. Additional processing within elements 706 and 708 of FIG. 7 compares the retrieved values against all other values to determine the best coverage and isolation values for the circuit assembly. After retrieving all test coverage and isolation values for all test attributes of all components in all test steps, element 708 of FIG. 7 saves the highest test coverage value and best test isolation value (lowest isolation time) for further processing in reference to the circuit assembly.

```
function model_lsi
if there are no power pins
   testpoint_coverage=#of testpoints/#pins
else
```

```
   testpoint_coverage=(# testpoints - #power pins +2) /
(#pins+#power pins)
switch (test attribute)
   case ANALOG_UNP:
      Assembly Test Coverage=testpoint coverage*
         TEST PARAMETER PIN_SHORTS
      Assembly Test Isolation=TEST PARAMETER ISO
   case ANALOG_INC:
      if (func="ANALOG")
         Assembly Test Coverage=testpoint_coverage;
         Assembly Test Isolation=TEST PARAMETER ISO
         Functional Test Coverage=
            testpoint_coverage*PARAMETER PIN_FCINC
         Functional Test Isolation=TEST PARAMETER ISO
   case BOUND_SCAN:
      if ( BSFLG]="yes")
         Assembly Test Coverage=testpoint_coverage
         Assembly Test Isolation=TEST PARAMETER ISO
   case DIGITAL_INC:
      if (func!="ANAL")
         Assembly Test Coverage=testpoint_coverage
         Assembly Test Isolation=TEST PARAMETER ISO
         Functional Test Coverage=
            testpoint_coverage*PARAMETER PIN_FCINC
         Functional Test Isolation=TEST PARAMETER ISO
   case BIST_BOARD:
      if (BISTB]="yes")
         Assembly Test Coverage=TEST PARAMETER COV
         Assembly Test Isolation=TEST PARAMETER ISO
         Functional Test Coverage=TEST PARAMETER COV
         Functional Test Isolation=TEST PARAMETER ISO
   case FUNC_DIAG_OFL:
      if (DIAOF]="yes")
         Assembly Test Coverage=TEST PARAMETER COV
         Assembly Test Isolation=TEST PARAMETER ISO
         Functional Test Coverage=TEST PARAMETER COV
         Functional Test Isolation=TEST PARAMETER ISO
   case SELF_TEST:
      if (STFLG]="yes")
         Assembly Test Coverage=TEST PARAMETER COV
         Assembly Test Isolation=TEST PARAMETER ISO
         Functional Test Coverage=TEST PARAMETER COV
         Functional Test Isolation=TEST PARAMETER ISO
      if (S_FUNCCOV_FILE="yes")
         if (SLFT_COV]!="default")
            Functional Test Coverage=SLFT_COV
         if (SLFT_ISO]!="default")
            Functional Test Isolation=SLFT_ISO
   case VISUAL_INSP:
      Assembly Test Coverage=TEST PARAMETER COV
      Assembly Test Isolation=TEST PARAMETER ISO
```

Test isolation capability is modeled using a similar algorithm to the coverage model discussed above with reference to FIG. 7. Test isolation capability is defined herein as the ability of the test to automatically isolate faults detected by the test to the causing defect. Some test methodologies have excellent inherent isolation capability. In-circuit test, for example, tests one component at a time, and once it detects a fault it will usually be able to name the defective pin. Selftest, on the other hand, tests a large portion of the board at one time, and in many cases is not able to locate the defect once a fault is detected. The fact remains that many faults detected at functional test must be moved over to a technician station for defect isolation. Aggregate coverage figures are obtained by weighing the coverage of each component by the number of pins of that component averaged over all pins on the board.

RELIABILITY MODEL

Figure 8:
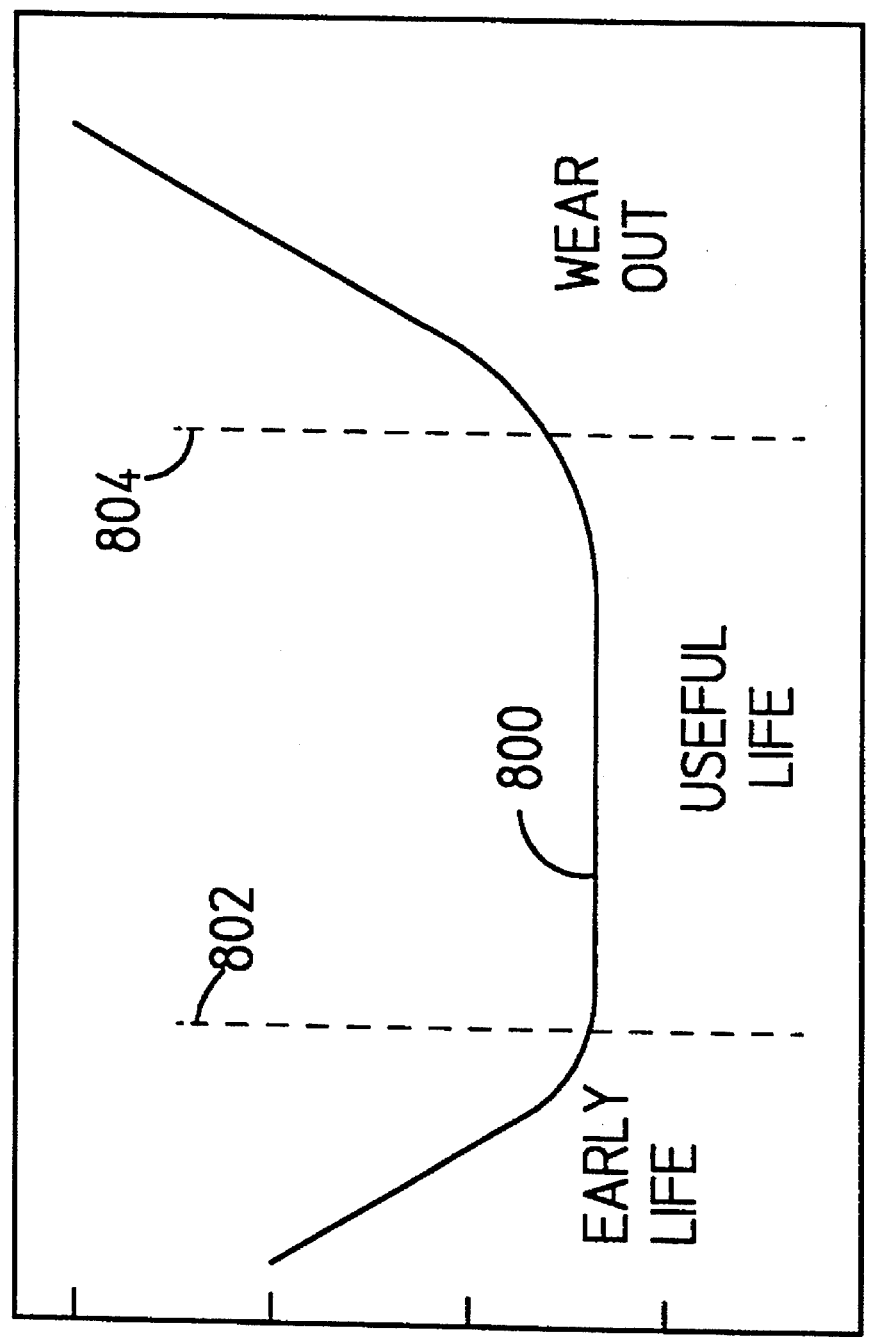
FIG. 8 is a plot of a typical "bathtub" curve showing the failure rate of an electronic circuit as a function of its lifetime.

The manufacturing test simulator of the present invention utilizes two separate reliability models (combined as 1322 in FIG. 13). Each of the two reliability models predicts different portions of the reliability bathtub curve. The "bathtub curve" is a well known plot of failure rate versus age of electrical circuits. Failure rate is typically measured in Failures in Time (FITS). The bathtub curves represents the life of a component or a system. The curve has three recognizably distinct area, namely: early life, useful life, and wear out periods. A typical bathtub curve is given in FIG. 8 which shows the bathtub curve 800 as a plot of failure rate as a function of circuit life. Dotted line 802 depicts the apparent position of a shift in the curve from the early life are to the useful life area. Dotted line 804 depicts the apparent position of a shift in the curve from the useful life to the wear-out period.

The early life are of curve 800 has a falling failure rate. These are failures due to infant mortality in the components. A manufacturer wants to avoid shipping early life products to the end customer. Reliability screens are put in place to eliminate early life failures prior to shipment to the customer. Burn-in is a common method used to accomplish this type of screening. The next area in the bathtub curve 800 is the useful life area. Useful life typically has a constant failure rate due to chance failures. The objective of reliability studies in the useful life period is to minimize the failure rate as much as possible. The wear out period of curve 800 has an increasing failure rate caused by parts being so old that they eventually fail. For most applications in the computer industry, due to rapid changes in the technology, the equipment is typically replaced prior to the beginning of the wear out period. Therefore, in MTSIM of the present invention, reliability modeling is limited to the early and useful life periods.

In the presently best known implementation of reliability models, reliability coverage is calculated in terms of hours of testing in an effort to eliminate early failures. It is assumed that no faults are isolated or repaired during reliability testing and that the boards that fail a reliability screen need to be retested and repaired in a subsequent regular test step. Reliability isolation and repair times are therefore always zero if no assembly or functional coverage is present in the test step.

The first reliability model is based on the Military Standard 217 (See MIL-HDBK-217F, "Military Handbook—Reliability Prediction of Electronic Equipment", Department of Defense, Washington, D.C.). It predicts the useful life failure rate of the board based on the parts count method. As described in the Reliability Failure Rate library below, each component has a useful life failure rate as given by the Military Standard 217. This failure rate is then multiplied by the appropriate quality factor, and all the failure rates are added up and a figure for the useful life failure rate is obtained. We note that a particular manufacturing operation may have its own database of useful life failure rates which would replace the one from the Military Standard 217.

RELIABILITY MODEL—LIFE TEST DATA

The second reliability model implemented in the present invention is referred to as the life test model (see Kececioglu, D., "Reliability Engineering Handbook", Volume 1, Prentice Hall, ISBN 0-13-772284-x, 1991)). The life test model predicts the early life and the useful life periods based on life test data recorded from previous actual life tests. To gather this information, an actual life test is run by a manufacturing engineer. The results of the actual life test are recorded by the manufacturing engineer for reference by the simulator of the present invention. The life test is performed as follows: the sample size of the life test is selected (at least 25 boards) and the life test is performed under a stress environment to accelerate failures. The failures which occur during this test are numbered and the time to failure recorded in a table. An exemplary table 1 is as follows:

TABLE 1

| Failure Number | Time to Failure (hrs) |
|---|---|
| 1 | 25 |
| 2 | 100 |
| 3 | 700 |
| 4 | 1350 |
| 5 | 2500 |
| 6 | 5000 |
| 8 | 9000 |
| 11 | 11000 |
| 12 | 18000 |

The life test model implemented in MTSIM is a truncated extreme value distribution with Weibull-type parameterization (see B. S. Dhillon, "Network Reliability Evaluation—Application of Bathtub Failure Rate Curve", IEEE Transactions on Reliability, R-21, 103–11 (1981)). This model is attractive to MTSIM because the parameters can be estimated by the least squares method, which is possible to implement in the Mentor environment without the aid of statistical software packages. The data in the table is then used to determine the median rank using a cumulative binomial distribution function. Let N be the number of units in the test, then the median rank (MR) for the jth failure in N units tested is MR value, such that the probability that the jth failure in N occurs before time Tj is 0.5. This probability is expressed as:

$$\sum_{k=j}^{N} \frac{N!}{k!(N-k)!} MR^k (1-MR)^{N-K} = 0.50 \quad (3.21)$$

where MR is the median rank. Equation (3.21) could be solved by iterative methods given values for N and j. However if N is larger than 25 the following approximation may be used (see Kececioglu, supra):

$$MR(\%) = \frac{j - 0.3}{N + 0.4} * 100 \quad (3.22)$$

where j is the failure number, and N is the total number of units tested. The MR can also be interpreted as the value that the true probability of failure, Q(t), must have at the time of the jth failure in N units, with 50% confidence. The reliability is the probability of the successful completion of a mission. An average or point estimate of reliability is given by the ratio of the number of successful missions undertaken to the number of total missions:

$$\hat{R}(T) = \frac{N_S(T)}{N_T(T)} \quad (3.23)$$

where $N_S(T)$ is the number of successful missions of T duration each, and $N_T(T)$ is the total number of missions undertaken. The reliability estimate can be rewritten as:

$$\hat{R}(T) = 1 - \frac{N_F(T)}{N_T(T)} \quad (3.24)$$

where $N_F(T)$ is the number of missions of T duration each that failed. The ratio $N_F(T)$ over $N_T(T)$ is also defined as the average or point estimate of the unreliability or probability of failure, Q(T):

$$\hat{Q}(T) = \frac{N_F(T)}{N_T(T)} \quad (3.25)$$

then we have by substitution:

$$\hat{R}(T) = 1 - \hat{Q}(T) \quad (3.26)$$

Using the fact that the MR is a point estimate for the probability of failure Q(T), the reliability estimate is obtained from the Median Rank data as follows:

$$\hat{R}(T) = 1 - \frac{MR(\%)}{100} \quad (3.27)$$

THE RELIABILITY MODEL

The failure rate function used in the life test model was given by Dhillon in (see Dhillon, supra):

$$\lambda(T) = \left(\frac{\beta}{\alpha^\beta}\right) * T^{\beta-1} * \exp\left[\left(\frac{T}{\alpha}\right)^\beta\right], T \geq 0, \alpha, \beta > 0 \quad (3.28)$$

the reliability function for the life test model is also given by Dhillon (see Dhillon, supra):

$$R(T) = \exp\left[1 - \exp\left[\left(\frac{T}{\alpha}\right)^\beta\right]\right] \quad (3.29)$$

We now substitute Equation (3.27), the estimate of the reliability function from the median rank of the life test data, into Equation (3.29):

$$1 - \frac{MR\%}{100} = \exp\left[1 - \exp\left[\left(\frac{T}{\alpha}\right)^\beta\right]\right] \quad (3.30)$$

To estimate the life test model parameters $\alpha$ and $\beta$ using the least squares method, algebraic transformations are performed to the reliability function equation in order to get it in the form of a straight line. Once in the form of a straight line, the parameters of the test model can be estimated using a least square method. So, taking the natural logarithm of Equation (3.30) twice to remove the exponentials obtains:

$$\log\left[1 - \log\left[1 - \frac{MR\%}{100}\right]\right] = \left(\frac{T}{\alpha}\right)^\beta \quad (3.31)$$

Next, taking the natural logarithm of equation (3.31) to move the parameter $\beta$ out of the exponent in the right hand side of the equation:

$$\log\left[\log\left[1 - \log\left[1 - \frac{MR\%}{100}\right]\right]\right] = \beta * \log[T] - \beta * \log[\alpha] \quad (3.32)$$

Equation (3.32) has the same form as the straight line equation:

$$y = \beta x + h \quad (3.33)$$

with the following values for y, x, and h:

$$y = \log\left[\log\left[1 - \log\left[1\frac{MR\%}{100}\right]\right]\right] \quad (3.34)$$

$$x = \log[T], \quad (3.35)$$

and $$h = -\beta \cdot \log[\alpha] \quad (3.36)$$

The parameters $\alpha$ and $\beta$ for the failure rate function given in Equation (3.28) are estimated by the least square method from equations (3.34–3.36) and the Median Rank data from the life test.

REPAIR MODEL

The repair profile model utilized by the simulator of the present invention uses the replacement time library (described below), to estimate the time required to repair the various defects detected in the assembly. The results of this estimation are used by the cost profile model to estimate the overall cost of an assembly. The model inputs are the component package type, the assembly technology and the type of defect. For solder type defects, the model assumes that the operator will touch-up the joint and not replace the component, so a touch-up repair time is provided. For other types of faults, the replacement times for the component are used.

YIELD MODEL

The simulator of the present invention estimates the product yield after each simulated test step. There are two kinds of yield models used in MTSIM, non-clustered and clustered. This bifurcated yield model was developed based on the observation that defects on complex SMT boards are clustered. Prior approaches which predicted product yield based on binomial distribution of defects were underestimating the yield by as much as 10 times.

Solder defects tend to be clustered, especially for finer pitch components. Functional defects can be adequately modeled with the binomial distribution. Non-solder assembly defects, such as cracked, misloads, reversed polarity and wrong value component, also can be adequately modeled with the binomial distribution. Assuming statistical independence, the overall yield is then obtained by multiplying the clustered and the non-clustered yield:

$$Y = Ycl \cdot Yncl \quad (3.37)$$

where,

Y=overall yield after test

Ycl=yield from clustered solder defects

Yncl=yield from non-clustered assembly defects

Once the incoming fault probability is calculated and the test coverages are modeled, one can estimate the average number of defects per board. The average number of defects per board is analogous to the average number of defects in IC yield calculations. The average number of defects per board Do for each type of faults modeled, is computed as follows:

$$Do = \sum_{j=1}^{N} Pfi_j * TC_j \quad (3.38)$$

where j is the component index, N is the total number of components, Pfi is the incoming fault probability of the jth component, including assembly and functional faults, and TC is the test coverage of the jth component.

YIELD MODEL—NON-CLUSTERED YIELD

For functional defects and non-solder assembly defects the binomial distribution of defects known in prior designs provides a sufficiently accurate estimate of yield. To calculate the probability of catching x defects, the Poisson approximation of the binomial distribution provides sufficient accuracy because the sample size is large and the defect rate is small for most cases that will be encountered, with functional and workmanship defects. The Poisson approximation calculating the probability of a test catching x defects per board can be expressed as (see M. V. Tegethoff et al., "Board Test DFT Model for Computer Products", Proceedings of the 1992 International Test Conference, 367–71):

$$P(x) = \frac{D_0^x e^{-D_0}}{x!}, \quad x = 0, 1, 2, \ldots \quad (3.39)$$

where Do is the average number of defects per board. The yield is defined as a board with no defects, so we let x=0 in Equation (3.39) and obtain:

$$Y_{nc} = e^{-D_o} \quad (3.40)$$

YIELD MODEL—CLUSTERED YIELD

The modeling of clustered yield is another innovative aspect of the simulator of the present invention. Solder defects make up the majority of SMT defects, and manufacturing data demonstrates that their behavior is clustered for complex boards. As used herein, "clustered" refers to the observed phenomenon that certain types of faults are not evenly distributed across a product. There has been much work done on the modeling of clustered phenomena in electronics as well as non-electronic fields of art. Rogers described how the negative binomial distribution can be used to model clustering of retail stores in a given town (see A. Rogers, "Statistical Analysis of Spatial Dispersion", Pion Limited, ISBN 0-850860458, 1974). Ferris-Prabhu extended the integrated circuit Poisson yield model to account for defect clusters by modifying the manner by which the defect density of the process is estimated (see A. V. Ferris-Prabhu, "A Cluster Modified Poisson Model for Estimating Defect Density and Yield", IEEE Transactions on Semiconductor Manufacturing, Vol. 3, No. 2, 54–9, May 1990). Stapper evaluated the distribution of defects in integrated circuits, and concluded that they followed a Gamma distribution instead of a binomial distribution (see C. H. Stapper, "Defect Density Distributions for LSI Yield Calculations", IEEE Transactions on Electron Devices, 655–58, July 1973). This led to the development of yield models which use distribution of defects other than the binomial distribution.

Clustering became an important problem for chip designers as integrated circuit chips became larger, and binomial yield models were predicting overly-pessimistic yields. The binomial yield models did not properly account for the clustering effect faults common to wafer manufacturing techniques. Several new yield models based on different distribution of defects were developed, such as the Seeds model (see R. B. Seeds, "Yield and Cost Analysis of Bipolar LSI", Proceedings of the 1967 IEEE International Electron Device Meeting, Washington, D.C., October 1967), the Murphy model (see B. T. Murphy, "Cost Size Optima of Monolithic Integrated Circuits", Proceedings of IEEE, Vol. 52, 1537–1545, December 1964), and the negative binomial model (See J. A. Cunningham, "The Use and Evaluation of Yield Models in Integrated Circuits Manufacturing, IEEE Transactions on Semiconductor Manufacturing, Vol. 3, No. 2, 60–71, May 1990). Of these various new models, the negative binomial model has become one of the most widely used IC yield models, because of its accuracy and simplicity. Stapper et al. from IBM, pioneered much of this work for ICs as documented in (See C. H. Stapper et al., "Integrated Circuit Yield Statistics", Proceedings of the IEEE, Vol. 71, No. 4, 453–70, April 1983; C. H. Stapper, "Yield Model for Fault Clusters and Within Integrated Circuits", IBM Journal of Research and Development, Vol. 28, No. 5, 637–39, September 1984; and C. H. Stapper, "Fault Simulation Programs for Integrated Circuit Yield Estimations", IBM Journal of Research and Development, Vol. 33, No. 6, 647–649, November 1989). However, these methods are not directly applicable to SMT or MCM assemblies since the fault spectrum of an SMT or MCM board is not easily characterized in terms of defect density.

In IC yield modeling, the average number of defects is estimated as the product of the process defect density and the chip area. SMT process assemblies do not have a defect density, since they are made up of various components with different pitches and different solder joint defect rate. In fact the solderability of a 20 mil SMT part with 250 pins is very different from a 2-pin resistor or a through hole connector. However, an analogous average number of defects per board can be obtained as described above.

In deriving the negative binomial yield model for boards, we will start with the Poisson model given in Equation 3.39. Let Do be the average number of defects per board, and x the random variable representing the varying number of defects per board, then using the Poisson distribution, the probability that the die has x defects is:

$$P(x) = \frac{D_0^x e^{-D_0}}{x!}, \quad x = 0, 1, 2, \ldots \quad (3.41)$$

Since the defect distribution will vary from board to board, from component to component, and from batch to batch, the value of the average number of defects needs to be summed over all boards using a normalized probability. We define D as a continuous random variable representing the number of defects per board, with a distribution function of defects f(D). Then the probability of having x defects in Equation (3.41) becomes:

$$P(x) = \int_0^\infty \frac{D^x e^{-D}}{x!} f(D)\, dD \quad (3.42)$$

We use the Gamma distribution function for f(D). We justify this selection based on the fact that the Gamma distribution can model a wide range of defect distribution by properly selecting its parameters, and on the precedent set by integrated circuit yield modeling. Substituting for f(D) with the Gamma distribution we obtain:

$$P(x) = \int_0^\infty \frac{D^x e^{-D}}{x!} \left( \frac{1}{\beta^\alpha \Gamma(\alpha)} D^{\alpha-1} e^{(\frac{-D}{\beta})} \right) dD \quad (3.43)$$

where $\alpha$ and $\beta$ are the parameters of the gamma distribution, and $\Gamma(\alpha)$ is the gamma function. We now take the terms that are constant with respect to the integration outside the integral and obtain:

$$P(x) = \frac{1}{\beta^\alpha \Gamma(\alpha)} \frac{1}{x!} \int_0^\infty D^x e^{-D} D^{\alpha-1} e^{(\frac{-D}{\beta})} dD \quad (3.44)$$

Rearranging terms inside the integral we obtain:

$$P(x) = \frac{1}{\beta^\alpha \Gamma(\alpha)} \frac{1}{x!} \int_0^\infty D^{(x+\alpha-1)} e^{-D(1+\frac{1}{\beta})} dD \quad (3.45)$$

we now make use of the following relationship on the Gamma function, $$\int_0^\infty y^{(r-1)} e^{-ky} dy = \frac{1}{k^r} \Gamma(r) \quad (3.46)$$

performing the integration in Equation (3.45) we obtain:

$$P(x) = \frac{1}{\beta^\alpha \Gamma(\alpha)} \frac{1}{x!} \frac{1}{\left(1+\frac{1}{\beta}\right)^{(x+\alpha)}} \Gamma(x+\alpha) \quad (3.47)$$

or:

$$P(x) = \frac{\Gamma(x+\alpha)}{x! \, \Gamma(\alpha)} \frac{1}{\left(1+\frac{1}{\beta}\right)^{(x+\alpha)}} \frac{1}{\beta^\alpha} \quad (3.48)$$

multiplying both the numerator and the denominator by $\beta^x$ we obtain:

$$P(x) = \frac{\Gamma(x+\alpha)}{x! \, \Gamma(\alpha)} \frac{\beta^x}{(1+\beta)^{(x+\alpha)}} \quad (3.49)$$

using the fact that in the Gamma distribution the mean is the product of the parameters $\alpha\beta$, we set the expected value of D, defined as the average number of defects per board Do, equal to $\alpha\beta$ in Equation (3.49), obtaining:

$$P(x) = \frac{\Gamma(x+\alpha)}{x! \, \Gamma(\alpha)} \frac{\left(\frac{Do}{\alpha}\right)^x}{\left(1+\frac{Do}{\alpha}\right)^{(x+\alpha)}} \quad (3.50)$$

Equation (3.50) is known as the negative binomial distribution, with parameter $\alpha$. If we calculate the probability of zero defects, by setting x=0 in Equation (3.50) we obtain:

$$P(x=0) = \frac{\Gamma(\alpha)}{\Gamma(\alpha)} \frac{1}{\left(1+\frac{Do}{\alpha}\right)^{(\alpha)}} \quad (3.51)$$

Since the yield is define as the probability of zero defects, Equation (3.51) can be rewritten in the form of the clustered yield model based on the negative binomial distribution of defects:

$$Ycl = \left[1 + \frac{Do}{\alpha}\right]^{-\alpha} \quad (3.52)$$

where Do is the average number of defects and $\alpha$ is the clustering factor. However, before this yield model can be applied in simulation, the clustering parameter $\alpha$ has to be estimated.

Alpha ($\alpha$) is the process dependent clustering parameter of the negative binomial yield model in Equation (3.52), and its value determines the shape of the yield curve. For large values of $\alpha$, the negative binomial model will approximate the Poisson model, and small values of $\alpha$ are used when clustering is severe. The value of $\alpha$ is estimated based on the distribution of defects per board. One would expect the clustering factor to remain constant for a given SMT process, as long as the boards have similar complexity. The estimation of the clustering factor needs to be performed experimentally and will vary for different SMT processes.

The value of $\alpha$ is estimated based on the distribution of defects per board. It is expected that boards of similar complexity, built in the same assembly process will have similar distribution of defects. The following table 2 shows how the distribution of defects per board needs to be tabulated for $\alpha$ estimation:

TABLE 2

| | |
|---|---|
| #circuits with 0 defects | 1000 |
| #circuits with 1 defect | 300 |
| #circuits with 2 defects | 150 |
| ... | ... |
| #circuits with > 16 defects | 2 |

If we define $\mu$ to be the mean and $\sigma$ the standard deviation of the data in Table 3, and use the fact that in the Gamma distribution, the mean is equal to $\alpha\beta$, and the variance is $\alpha\beta(\beta 1)$ the value of $\alpha$ can be estimated by:

$$\mu = \alpha\beta \quad (3.53)$$

$$\sigma^2 = \alpha\beta(1+\beta) \quad (3.54)$$

substituting Equation (3.53) into Equation (3.54) we obtain:

$$\sigma^2 = \mu\left(1 + \frac{\mu}{\alpha}\right) \quad (3.55)$$

by rearranging, the value of $\alpha$ can be obtained from:

$$\alpha = \frac{\mu^2}{\sigma^2 - \mu} \quad (3.56)$$

where $\mu$ is the mean number of defects per board and $\sigma$ the standard deviation, based on defect distribution data such as the example given in the table above.

Figure 9:
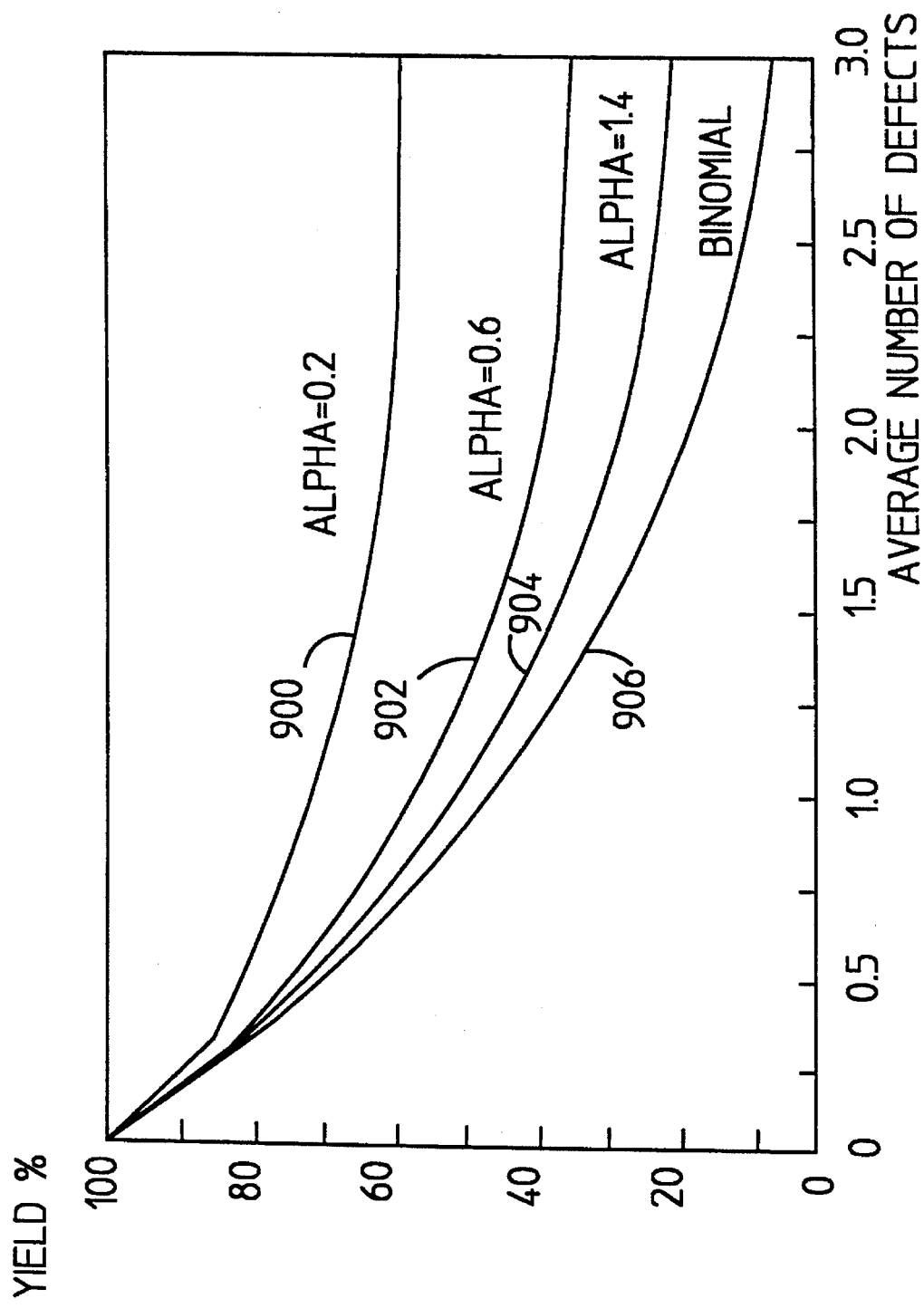
FIG. 9 is a family of plots of yield as a function of average number of defects for various alpha weighting factors.

FIG. 9 depicts the graph of yield versus average number of defects for the binomial model and the clustered model for different $\alpha$ values. Four curves are shown in FIG. 9 depicting the yield estimate as a function of average number of defects. Curve 900 indicates the yield estimate as a function of average number of defects with the cluster model $\alpha$ value at 0.2. Similarly, curve 902 shows a curve with an $\alpha$ value of 0.6, curve 904 is for an $\alpha$ value of 1.4, and curve 906 is for the non-clustered binomial model of prior designs. FIG. 9 shows that for large value of $\alpha(\alpha > 1)$, the clustered model starts to approximate the binomial model. In the limit for large $\alpha$ the clustered model will match the binomial model. One can also observe that the accuracy of the cluster model becomes necessary as the average number of defects becomes larger. The average number of defects for complex SMT boards is becoming larger as manufacturers push the edge in density and performance.

In alternative embodiments of the present invention, clustering may be modelled for each type of solder joint as well as clustering in a batch of boards. However, test results demonstrated that it was sufficient to model clustering for all solder joint types on a per board basis. This simplifies the model significantly, since only one clustering factor needs to be determined. Therefore, in applying the negative binomial yield model to boards, we assume that defects at the component level are independent, and have a binomial distribution. We then account for the clustering at the board level. The average number of defects per board is usually greater than 1, implying that the yield should be very low. However, by accounting for clustering at the board level we predict that some boards will have multiple defects while other boards will be defect free.

To this point of the discussion, the models used in MTSIM were derived as above. The following sections describe the libraries developed for MTSIM and the methodology used for pareto analysis.

MTSIM SIMULATION FILES AND LIBRARY

The MTSIM library used by the simulator of the present invention contains the default information for the assembly process, the test process and the components used. A typical circuit designer uses default libraries since much of the data needed to model manufacturing processes is collected and tracked by quality systems. For example, board manufacturers keep track of solder joint defect rates and component functional defect rate on an averaged PPM basis. It is expected that an engineer familiar with the design and manufacturing process will set up the libraries prior to MTSIM use by design engineers. Master libraries are kept with the simulation source code. When a new simulation is started, copies of the master libraries are made in the new simulation directory, allowing local modifications for "what-if" analysis.

COMPONENT LIST

A component list is provided for reference purposes during the "what-if" analysis. Modifications in the component list should be made in the original design and re-run as a new simulation. Table 3 listed below shows a sample user supplied (versus Mentor design tools supplied) component list file which enters multiple instances of the same part number. A component file obtained from a Mentor design would have entries per instance, including the reference designator.

TABLE 3

| PART NUM | REF DES | GEOM | COUNT |
| --- | --- | --- | --- |
| 0160-6222 | refdes | geom | 73 |
| 0160-7347 | refdes | geom | 54 |
| 0180-3755 | refdes | geom | 71 |
| 0180-4287 | refdes | geom | 6 |
| 0361-1297 | refdes | geom | 4 |
| 0361-1356 | refdes | geom | 1 |
| 0361-1392 | refdes | geom | 2 |
| 0361-1778 | refdes | geom | 1 |
| 0535-0082 | refdes | geom | 2 |
| 0699-1388 | refdes | geom | 15 |
| 0699-1344 | refdes | geom | 5 |

COMPONENT LIBRARY

The component library is generated by MTSIM for a board from the component list and the simulator master component library. It includes only the components used in the board. Details on each entry are given in the database description below. The library entries can be modified and re-simulated during "what-if" analysis. For each component in the board the component library contains:
Reference designator
Part number
Pin count
Power pin count
Number of total pins
Part category—a four field category assigned to each component. The fields are component type, component pitch, assembly process, and functionally
Part cost
Flag for boundary scan implementation
Flag for component BIST implementation
Flag for board level BIST coverage
Flag for self-test coverage
Flag for off-line diagnostics coverage
Flag for on-line diagnostics coverage
Incoming functional defect rate if other than default
Reliability quality factor used in the reliability model The flags are boolean types and indicate whether that particular test would cover that component if enabled. Table 4 below shows a sample of the component library menu.

TABLE 4

| REF DES | PART NUM | #PINS | #PPINS | #TPINS | COST | CATEG | COMB | BSCAN | BISTBCHIP | BISTBRD | SELFTST | DIAGOFL | DIAGONL | FPPM | RELO |
|---|---|---|---|---|---|---|---|---|---|---|---|---|---|---|---|
| refdes | 0160-6222 | 2 | 0 | 2 | 1 | CAPC 050T SMTM DIGI | yes | no | no | yes | yes | yes | yes | def | CNB |
| refdes | 0160-7347 | 2 | 0 | 2 | 1 | CAPC 050T SMTM DIGI | yes | no | no | yes | yes | yes | yes | def | CNB |
| refdes | 0180-3755 | 2 | 0 | 2 | 1 | CAPC 050T SMTM DIGI | yes | no | no | yes | yes | yes | yes | def | CNB |
| refdes | 0180-4287 | 2 | 0 | 2 | 1 | CAPC 050T SMTM DIGI | yes | no | no | yes | yes | yes | yes | def | CNB |
| refdes | 0361-1297 | 0 | 0 | 0 | 1 | MECH 050T SMTM DIGI | yes | no | no | yes | yes | yes | yes | def | CNB |
| refdes | 0361-1356 | 0 | 0 | 0 | 1 | MECH 050T SMTM DIGI | yes | no | no | yes | yes | yes | yes | def | CNB |
| refdes | 0361-1392 | 0 | 0 | 0 | 1 | MECH 050T SMTM DIGI | yes | no | no | yes | yes | yes | yes | def | CNB |
| refdes | 0361-1778 | 0 | 0 | 0 | 1 | MECH 050T SMTM DIGI | yes | no | no | yes | yes | yes | yes | def | CNB |
| refdes | 0535-0082 | 0 | 0 | 0 | 1 | MECH 050T SMTM DIGI | yes | no | no | yes | yes | yes | yes | def | CNB |
| refdes | 0699-1318 | 2 | 0 | 2 | 1 | RESC 050T SMTM DIGI | yes | no | no | yes | yes | yes | yes | def | CNB |
| refdes | 0699-1344 | 2 | 0 | 2 | 1 | RESC 050T SMTM DIGI | yes | no | no | yes | yes | yes | yes | def | CNB |
| refdes | 0699-1348 | 2 | 0 | 2 | 1 | RESC 050T SMTM DIGI | yes | no | no | yes | yes | yes | yes | def | CNB |
| refdes | 0699-1361 | 2 | 0 | 2 | 1 | RESC 050T SMTM DIGI | yes | no | no | yes | yes | yes | yes | def | CNB |
| refdes | 0699-1366 | 2 | 0 | 2 | 1 | RESC 050T SMTM DIGI | yes | no | no | yes | yes | yes | yes | def | CNB |
| refdes | 0699-1369 | 2 | 0 | 2 | 1 | RESC 050T SMTM DIGI | yes | no | no | yes | yes | yes | yes | def | CNB |
| refdes | 0699-1415 | 2 | 0 | 2 | 1 | RESC 050T SMTM DIGI | yes | no | no | yes | yes | yes | yes | def | CNB |

TEST PROCESS LIBRARY

Table 5 below depicts the MTSIM menu for modifying the test process library. The columns have entries for each test step. The rows specify the attributes of each test step as described below.

TABLE 5

|  | Tstep one | Tstep two | Tstep three | Tstep four | Tstep five | Tstep six | Tstep seven |
|---|---|---|---|---|---|---|---|
| TST NAME | VSI INSP | ATE | SLF TST | DIAG | AGING | PRE TST | Tstep seven |
| IS TEST USED | yes | yes | yes | yes | yes | yes | yes |
| TEST ORDER | 1 | 4 | 5 | 6 | 2 | 3 | 7 |
| ANALOG UNP | no | yes | no | no | no | no | no |
| ANALOG INC | no | yes | no | no | no | no | no |
| BOUND SCAN | no | yes | no | no | no | no | no |
| DIGITAL INC | no | yes | no | no | no | no | no |
| BIST COMP | no | no | no | no | no | no | no |
| BIST BOARD | no | no | no | no | no | no | no |
| FUNC DIAG OFL | no | no | no | yes | no | yes | no |
| FUNC DIAG ONL | no | no | no | yes | no | yes | no |
| SELF TEST | no | no | yes | no | no | no | no |
| STRESS AGING | no | no | no | no | yes | no | no |
| FUNIN AGING | no | no | no | no | no | no | no |
| VISUAL INSP | yes | no | no | no | no | no | no |
| OPER TIME min | 3 | 2 | 3 | 0.5 | 5 | 3 | 1 |
| CAPI TIME min | 0 | 2 | 6 | 15 | 288 | 15 | 1 |
| OPER RATE $ | 50 | 40 | 40 | 40 | 40 | 40 | 1 |
| CAPI RATE $ | 40 | 40 | 30 | 30 | 40 | 30 | 1 |
| ISOL RATE $ | 80 | 80 | 80 | 80 | 1 | 80 | 1 |
| REPL RATE $ | 40 | 40 | 40 | 40 | 1 | 40 | 1 |
| REPL ENABLE | yes | yes | yes | yes | yes | no | yes |
| SHIP ENABLE | no | no | no | no | no | yes | no |
| NTF/PIN ppm | 0 | 0 | 0 | 0 | 0 | 0 | 0 |
| NFT/COMP ppm | 0 | 0 | 0 | 0 | 0 | 0 | 0 |

Up to seven different test steps can be specified by their testing attributes. The order of execution of a test step is also specified in this menu. This approach allows the simulation of any combination of test processes available. In the above table, for example, the ATE test step has unpowered analog testing, analog in-circuit, boundary scan and digital in-circuit enabled, with all other attributes disabled. The test simulator of the present invention uses this test attribute information along with the assembly's component information to estimate the test coverage and isolation for the test step. The expected test time and various labor rates are also entered in this library file.

As discussed above with reference to FIG. 5, the manufacturing test simulator assumes a linear flow of the simulated tests. In other words, all boards enter in test step with TEST_ORDER=1, then flow to the test step with TEST_ORDER=2 and so on. However, the flags REPL_ENABLE and SHIP_ENABLE allow for multiple flows in the simulation, controlling whether to repair locally or whether to ship from the current test step. A description of the function of each of the row entries in the test process library is as follows:

TST_NAME—Test name for each test step.
IS_TEST_USED—Is this test step used in the simulation? User enters boolean value.
TEST_ORDER—Physical order of execution. A number from 1 through 7. Simulation of test steps in different orders ca be accomplished by reversing the order here.
ANALOG_UNP—boolean flag for test attribute Analog unpowered, typically found in a in-circuit tester.
ANALOG_INC—boolean flag for test attribute Analog in-circuit, a powered analog test typically found in a in-circuit tester.
BOUND_SCAN—boolean flag for test attribute Boundary scan, used if the IEEE 1149.1 boundary scan standard is implemented in the chip.
DIGITAL_INC—boolean flag for test attribute digital in-circuit test, a powered parallel vector test applied through the nails of an in-circuit tester.
BIST_COMP—boolean flag for test attribute Built in Self Test for an individual component.
BIST_BOARD—boolean flag for test attribute Built in Self Test for multiple components on the board.
FUNC_DIAG_OFL—boolean flag for test attribute Functional Diagnostics off-line, which run without the operating system of the product booted.
FUNC_DIAG_ONL—boolean flag for test attribute Functional Diagnostics on-line, which run with the operating system of the product booted.
SELF_TEST—boolean flag for test attribute Self-test which typically is a machine code level test from the boot ROM.
STRESS_AGING—boolean flag for test attribute stress aging which uses an acceleration environment such as temperature to reduce infant mortality failures.
RUNIN_AGING—boolean flag for test attribute run#in aging which uses a standard environment to reduce infant mortality failures.
VISUAL_INSP—boolean flag for test attribute for human based visual inspection.
OPER_TIME—Operator test time in minutes for this step.
CAPI_TIME—Equipment (capital) test time in minutes for this step.
OPER_RATE—Labor rate for operator in test execution $/hr.
CAP_RATE—Rate for equipment used in test execution Cost $/hr.
ISOL_RATE—Labor rate for operator or technician in fault isolation $/hr.
REPL_RATE—Labor rate for operator or technician in fault repair $/hr.

REPL_ENABLE—Is repair enable in this step? If repair is enabled, the faults detected at this test step get repaired and retested. If repair is not enabled the faults will flow with the board into the next test step.

SHIP_ENABLE—Are boards that pass this test to be shipped and skip further testing? If shipping is enabled, the boards that pass this test are shipped and do not participate in any further testing.

NTF/PIN—(ppm) per pin NTF rate

NTF/COMP—(ppm) per component NTF rate

The No Trouble Found (NTF) rates for pins and for components assume that the equivalent of 100% coverage affects them. The NTF/PINS gets added to the assembly isolation time. NTF models the type I error discussed in above. Its purpose is to account for NTF due to pin contact failures. The NTF/COMP gets added to the functional isolation time. Its purpose is to account for NTF in the test itself.

TEST PARAMETER LIBRARY

The test parameter library is used to fine tune the test coverage model. Table 6 below depicts a sample of the test parameter "what-if" menu.

TABLE 6

|              | Assy cov | Assy iso | Func cov | Func iso | Reli act |
|--------------|----------|----------|----------|----------|----------|
| ANALOG UNP   | 1        | 0.7      | 1        | 0.7      | 0        |
| ANALOG INC   | 1        | 0.7      | 1        | 0.7      | 0        |
| BOUND SCAN   | 1        | 0.7      | 0        | 0        | 0        |
| DIGITAL INC  | 1        | 0.7      | 1        | 0.7      | 0        |
| BIST COMP    | 0        | 0        | 0.5      | 0.7      | 0        |
| BIST BOARD   | 1        | 5        | 1        | 5        | 0        |
| FUNC DIAG OFL| 1        | 15       | 1        | 15       | 0        |
| FUNC DIAG ONL| 1        | 15       | 1        | 15       | 0        |
| SELF TEST    | 1        | 5        | 1        | 5        | 0        |
| STRESS AGING | 0        | 0        | 0        | 0        | 10       |
| RUNIN AGING  | 0        | 0        | 0        | 0        | 1        |
| VISUAL INSP  | 0.5      | 0.7      | 0        | 0        | 0        |

The test parameter "what-if" menu allows deration of test coverage and average isolation times for assembly and functional faults. This deration factor can be used to model the type II error in test coverage discussed above. For example, in the above table 6, the entry in the assembly coverage (assy_cov) column and analog unpowered test attribute (I_ANALOG_UNP) row is set to 1. In this case, the test coverage model will use the information about the components, the test process, and test access to predict coverage for each component without any deration. If the value was set to 0.9 the coverage value would be scaled by multiplying it by 0.9. The "Reli_act" column in the above table is the activation energy of a stress based test, used when predicting the effective time of a stress screen, such as burn-in, for infant mortality.

ASSEMBLY PROCESS LIBRARY

Table 7 below depicts a sample menu for modifying the Surface Mount Technology (SMT) assembly process library. This library contains solder joint defect rates (in PPM units) for various pitches and technologies. There is an assembly process library file for each assembly process available, whether SMT or MCM. These defect rates are used by the assembly model to estimate the incoming assembly fault probability. A similar library for Multi-Chip Module (MCM) technology is available, which has entries for bond wire and solder bump technologies.

TABLE 7

|        | SMTM | SMTH | THTM | THTH |
|--------|------|------|------|------|
| P 100T | 0    | 0    | 100  | 100  |
| P 100B | 0    | 0    | 100  | 100  |
| P 070T | 0    | 0    | 100  | 100  |
| P 070B | 0    | 0    | 100  | 100  |
| P 050T | 50   | 50   | 0    | 0    |
| P 050B | 50   | 50   | 0    | 0    |
| P 025T | 75   | 75   | 0    | 0    |
| P 025B | 75   | 75   | 0    | 0    |
| P 020T | 100  | 100  | 0    | 0    |
| P 020B | 100  | 100  | 0    | 0    |
| P 015T | 200  | 200  | 0    | 0    |
| P015B  | 200  | 200  | 0    | 0    |
| P WORK | 100  | 100  | 100  | 100  |
| P CLST | 0.5  | 0.5  | 0.5  | 0.5  |

As discussed above, assembly defects can be broken into solder defects and workmanship defects. Solder defects are typically shorts or opens of different forms. A defect rate for a solder joint is characterized in PPM per joint when a new SMT process is developed. This solder defect rate is constantly monitored in SMT manufacturing facilities. Workmanship defects are found in a per component basis and include wrong value component, reversed polarity, etc.

The columns in the assembly process library table 7 shown above represent the types of solder joint. SMTM means a SMT joint machine placed, SMTH means SMT joint hand placed. THT stands for Through-hole joints. The rows represent the joint pitch. P_100T represents a 100 mil joint on the top side of the board, and P_100B represents a 100 mil joint in the bottom of the board. Row P_WORK represents the workmanship defect rate and row P_CLST is the clustering factor used in the negative binomial yield model, which accounts for the clustering effect of solder defects as discussed above. In the case of MCM technology, the defect rates for bond wire assembly and solder bump technology with the appropriate pitch is used.

FUNCTIONAL DEFECT RATE LIBRARY

Table 8 below depicts a sample menu for modifying the functional defect rate library. This library contains functional defect rates for various component types and their functionality. Information relating to component functional defect rates is regularly maintained by manufacturers. A high volume manufacturing facility will typically keep track of these defect rates in their quality database. These defect rates are used by the functional fault probability model to estimate the incoming functional fault probability.

TABLE 8

|      | DIGI | ANAL | RAMM | ROMM | GLUE | 1010 | CPUC | DSPC | VIDE |
|------|------|------|------|------|------|------|------|------|------|
| SSIC | 200  | 300  | 200  | 200  | 200  | 200  | 500  | 200  | 300  |
| MSIC | 300  | 400  | 300  | 300  | 300  | 300  | 600  | 300  | 400  |
| LSIC | 500  | 500  | 500  | 400  | 300  | 500  | 700  | 500  | 600  |
| VLSI | 2000 | 2000 | 2000 | 2000 | 2000 | 2000 | 2000 | 2000 | 2000 |
| RESC | 50   | 50   | 50   | 50   | 50   | 50   | 50   | 50   | 50   |
| RESP | 50   | 50   | 50   | 50   | 50   | 50   | 50   | 50   | 50   |
| CAPC | 50   | 50   | 50   | 50   | 50   | 50   | 50   | 50   | 50   |
| CAPE | 50   | 50   | 50   | 50   | 50   | 50   | 50   | 50   | 50   |
| INDU | 50   | 50   | 50   | 50   | 50   | 50   | 50   | 50   | 50   |
| CRYS | 500  | 500  | 500  | 500  | 500  | 500  | 500  | 500  | 500  |
| OSCI | 500  | 500  | 500  | 500  | 500  | 500  | 500  | 500  | 500  |
| CONN | 50   | 50   | 50   | 50   | 50   | 50   | 50   | 50   | 50   |
| TRAN | 50   | 50   | 50   | 50   | 50   | 50   | 50   | 50   | 50   |
| DIOD | 50   | 50   | 50   | 50   | 50   | 50   | 50   | 50   | 50   |
| POWR | 50   | 50   | 50   | 50   | 50   | 50   | 50   | 50   | 50   |
| BOAD | 50   | 50   | 50   | 50   | 50   | 50   | 50   | 50   | 50   |
| MECH | 50   | 50   | 50   | 50   | 50   | 50   | 50   | 50   | 50   |

The rows in the table 8 above specify the type of the component. The columns provide the functionality of the component. The entries are the defect level of component in parts per million. For an Application Specific Integrated Circuit (ASIC), the entry is usually estimated by calculating the defect level of the ASIC as given in (see T. W. Williams and N. C. Brown, "Defect Level as a Function of Fault Coverage", IEEE Transactions on Computers, Vo. C-30, No. 2, 987–88, December 1981; E. J. McCluskey, "IC Quality and Test Transparency", Proceedings of the 1988 International Test Cnference, 295–301; and P. C. Maxwell & R. C. Aitken, "All Fault Coverages Are Not Created Equal", IEEE Design & Test of Computers, 42–51, March 1993). Alternatively, a designer may supply a more accurate estimation of the defect level as discussed by Maxwell (see P. C. Maxwell et al., "The Effectiveness of IDDQ, Functional and Scan Tests: How many Fault Coverages Do We Need?", Proceedings of the 1992 International Test Conference, 168–77.). The designer may use a calculated defect level for an ASIC instead of this default model. In this case, the designer enters the calculated value in the MTSIM library under the Func PPM column for that part number.

RELIABILITY DEFECT RATE LIBRARY

There are two types of reliability modeling in MTSIM: useful life failure rate and infant mortality prediction. The reliability defect rate library deals with the useful life failure rate modeling. Reliability modeling has long been a concern in military electronics applications. Specifically, predicting the useful life constant failure rate is routinely done for all military applications. The military handbook 217F (see MIL-HDBK-217F, "Military Handbook—Reliability Prediction of electronic Equipment", Department of Defense, Washington, D.C. 20301) gives the useful life failure rate for different component types and applications. The defect rate library is based on the MIL STD 217F handbook data. Table 9 below shows a sample of the reliability failure rate.

TABLE 9

|      | DIGI   | ANAL   | RAMM   | ROMM   | GLUE   | 1010   | CPUC   | DSPC   | VIDE   | MIL | CBI | CNB |
|------|--------|--------|--------|--------|--------|--------|--------|--------|--------|-----|-----|-----|
| SSIC | 0.0115 | 0.011  | 0.02   | 0.0285 | 0.0115 | 0.0115 | 0.0186 | 0.0115 | 0.0115 | 1 | 10  | 20  |
| MSIC | 0.0225 | 0.0207 | 0.038  | 0.0541 | 0.0225 | 0.0225 | 0.0357 | 0.0225 | 0.0225 | 1 | 10  | 20  |
| LSIC | 0.0604 | 0.0465 | 0.0734 | 0.1036 | 0.0604 | 0.0604 | 0.0758 | 0.0604 | 0.0604 | 1 | 10  | 20  |
| VLSI | 0.1066 | 0.0465 | 0.1445 | 0.2052 | 0.1066 | 0.1066 | 0.0758 | 0.1066 | 0.1066 | 1 | 10  | 20  |
| RESC | 0.0025 | 0.0025 | 0.0025 | 0.0025 | 0.0025 | 0.0025 | 0.0025 | 0.0025 | 0.0025 | 1 | 3   | 3   |
| RESP | 0.025  | 0.025  | 0.025  | 0.025  | 0.025  | 0.025  | 0.025  | 0.025  | 0.025  | 1 | 3   | 3   |
| CAPC | 0.0025 | 0.0025 | 0.0025 | 0.0025 | 0.0025 | 0.0025 | 0.0025 | 0.0025 | 0.0025 | 1 | 3   | 3   |
| CAPE | 0.0055 | 0.0055 | 0.0055 | 0.0055 | 0.0055 | 0.0055 | 0.0055 | 0.0055 | 0.0055 | 1 | 3   | 3   |
| INDU | 0.002  | 0.002  | 0.002  | 0.002  | 0.002  | 0.002  | 0.002  | 0.002  | 0.002  | 1 | 3   | 3   |
| CRYS | 0.032  | 0.032  | 0.032  | 0.032  | 0.032  | 0.032  | 0.032  | 0.032  | 0.032  | 1 | 2.1 | 2.1 |
| OSCI | 0.032  | 0.032  | 0.032  | 0.032  | 0.032  | 0.032  | 0.032  | 0.032  | 0.032  | 1 | 2.1 | 2.1 |
| CONN | 0.0027 | 0.0027 | 0.0027 | 0.0027 | 0.0027 | 0.0027 | 0.0027 | 0.0027 | 0.0027 | 1 | 3   | 3   |
| TRAN | 0.0025 | 0.0025 | 0.0025 | 0.0025 | 0.0025 | 0.0025 | 0.0025 | 0.0025 | 0.0025 | 1 | 5   | 10  |
| DIOD | 0.0007 | 0.0007 | 0.0007 | 0.0007 | 0.0007 | 0.0007 | 0.0007 | 0.0007 | 0.0007 | 1 | 5   | 10  |
| POWR | 0.003  | 0.003  | 0.003  | 0.003  | 0.003  | 0.003  | 0.003  | 0.003  | 0.003  | 1 | 1   | 3   |
| BOAD | 0.041  | 0.041  | 0.041  | 0.041  | 0.041  | 0.041  | 0.041  | 0.041  | 0.041  | 1 | 10  | 10  |
| MECH | 0.0007 | 0.0007 | 0.0007 | 0.0007 | 0.0007 | 0.0007 | 0.0007 | 0.0007 | 0.0007 | 1 | 3   | 3   |

As in the case of the functional defect rate discussed above, the rows in the above table 9 are the component types from the component categories and the columns are the functionality part of the component category. The last three columns on the right in the above table 9 are multipliers used by the reliability model. The multipliers account for the reliability screening which the part underwent during component test. In the last three columns, MIL stands for military, CBI stands for chip with burn-in and CNB stands for chip without burn-in. Each part is assigned one of these three categories in the MTSIM component library.

REPLACEMENT TIME LIBRARY

Table 10 below depicts a sample menu for modifying the replacement time library. The replacement time library contains replacement time figures for various component package types and their type of assembly process. A high volume manufacturing facility will typically keep track of these replacement times making this data easy to gather.

TABLE 10

|      | THT | SMT50 | SMT25 | SMT20 | SMT15 | TCHUP |
|------|-----|-------|-------|-------|-------|-------|
| SSIC | 10  | 15    | 20    | 25    | 30    | 5     |
| MSIC | 10  | 15    | 20    | 25    | 30    | 5     |
| LSIC | 15  | 20    | 25    | 30    | 35    | 5     |
| VLSI | 15  | 20    | 30    | 35    | 40    | 5     |
| RESC | 5   | 5     | 5     | 5     | 5     | 5     |
| RESP | 5   | 5     | 5     | 5     | 5     | 5     |
| CAPC | 5   | 5     | 5     | 5     | 5     | 5     |
| CAPE | 5   | 5     | 5     | 5     | 5     | 5     |
| INDU | 5   | 5     | 5     | 5     | 5     | 5     |
| CRYS | 5   | 5     | 5     | 5     | 5     | 5     |
| OSCI | 5   | 5     | 5     | 5     | 5     | 5     |
| CONN | 15  | 15    | 15    | 15    | 15    | 5     |
| TRAN | 5   | 5     | 5     | 5     | 5     | 5     |
| DIOD | 5   | 5     | 5     | 5     | 5     | 5     |
| POWR | 5   | 5     | 5     | 5     | 5     | 5     |
| BOAD | 125 | 125   | 125   | 125   | 125   | 5     |
| MECH | 5   | 5     | 5     | 5     | 5     | 5     |

TEST ACCESS LIBRARY

Table 11 below depicts a sample menu for modifying the test access library. This library contains the number of test access points for each component. The test access information is obtained from the optional test access input file (if provided). If not provided, the test access input file is generated by the simulator of the present invention by initially assuming that all components provide access to all pins for test purposes. The number of test access points in each component is a function of how many testpads are on the board, and of how many components have implemented the IEEE 1149.1 boundary scan standard (K. P. Parker, "The Boundary-Scan Hnadbook", Kluwer Academic Publishers, ISBN 0-7293-9270-1 (1992)). The test access information is used by the test coverage and test isolation models to estimate the coverage and isolation of each test attribute.

TABLE 11

| PART NUM | REF DES | TST ACCESS | TOT PINS |
|----------|---------|------------|----------|
| 0160-6222 | refdes | 146 | 146 |
| 0160-7347 | refdes | 108 | 108 |
| 0180-3755 | refdes | 142 | 142 |
| 0180-4287 | refdes | 12  | 12  |
| 0361-1297 | refdes | 0   | 0   |
| 0361-1356 | refdes | 0   | 0   |
| 0361-1392 | refdes | 0   | 0   |
| 0361-1778 | refdes | 0   | 0   |
| 0535-0082 | refdes | 0   | 0   |
| 0699-1318 | refdes | 30  | 30  |

FUNCTIONAL COVERAGE LIBRARY

Table 12 below shows the "what-if" menu for the functional coverage simulation file. This file is originally created from the output of the VHDL coverage metric tool. Any component entry with the def label uses the estimate from the test coverage model of MTSIM. If component entries have an actual number, that figure is used for the functional test coverage.

TABLE 12

| PART NUM | REF DES | SLFT COV | SLFT ISO |
|----------|---------|----------|----------|
| 0160-6222 | refdes | 0.98 | def |
| 0160-7347 | refdes | def  | def |
| 0180-3755 | refdes | 0.98 | def |
| 0180-4287 | refdes | def  | def |
| 0361-1297 | refdes | def  | def |
| 0361-1356 | refdes | 0.95 | def |
| 0361-1392 | refdes | def  | def |
| 0361-1778 | refdes | def  | def |
| 0535-0082 | refdes | 0.95 | def |
| 0699-1318 | refdes | def  | def |

RELIABILITY DATA LIBRARY

The life test reliability model, discussed above, predicts the early life reliability failures based on data from a life test. The data from the life test is entered as shown on table 13 below.

TABLE 13

| Failure Number | Time to Fail hs |
|----------------|-----------------|
| 1 | 26 |
| 2 | 650 |
| 3 | 6000 |
| 4 | 7000 |
| 5 | 9000 |
| 6 | 11000 |
| 7 | 12000 |

The life test starts with a certain sample size of units. This sample size is entered in the right most cell of the menu in the above table, labeled "Test Size." As failures occur during the life test, they are numbered, and the number of hours into the test when the failure occurred are recorded. The failure numbers are entered in the first column labelled "Failure_Number", and the time into the test for each failure are recorded in the second column labelled "Time_to_Fail_hrs." The infant mortality model uses the data to predict the bathtub curve of the board and plot it out as described in the reliability modeling discussion above.

MTSIM PARETO ANALYSIS

The methods of the present invention provide pareto analysis capabilities to rank test results for analysis of optimum changes. Test results for all simulated test steps is available in pareto analysis methods of the present invention. The user can sort (ascending or descending) any of the fields by using the Data→Sort command.

There are three pareto analysis levels for simulated test result data: the component level pareto, the part number level pareto and the category level pareto. The pareto analysis data is presented to the user as a table of data. The rows of the component pareto table provides data for each component used in the board. The rows of the part number pareto table group the data for all components with the same part number, and the rows of the category pareto table group data for components of the same category as described below. For each test step simulated (test step x; x=1,7), the columns of the pareto tables are:

% Sold Tx FR in—Incoming solder fault probability in test step x (%)

% Work Tx FR in—Incoming workmanship fault probability in test step x (%)

% Func Tx FR in—Incoming functional fault probability in test step x (%)
% Assy Tx Tst Cov—Assembly faults test coverage for test step x (%)
% Func Tx Tst Cov—Functional faults test coverage for test step x (%)
min Assy Tx Iso Cov—Assembly faults test Isolation for test step x (min)
min Func Tx Iso Cov—Functional faults test Isolation for test step x (min)
min Assy Tx Iso time—Time needed to isolate Assembly faults for test step x (min)
$ Assy Tx Iso cost—Cost to isolate Assembly faults for test step x ($)
min Func Tx Iso time—Time needed to isolate Functional faults for test step x (min)
$ Func Tx Iso cost—Cost to isolate Functional faults for test step x ($)
min Assy Tx Rep time—Time needed to repair Assembly faults for test step x (min)
$ Assy Tx Rep cost—Cost to isolate repair faults for test step x ($)
min Func Tx Rep time—Time needed to repair Functional faults for test step x (min)
$ Func Tx Rep cost—Cost to repair Functional faults for test step x ($)
% Sold Tx FR out—Outgoing solder fault probability in test step x (%)
% Work Tx FR out—Outgoing workmanship fault probability in test step x (%)
% Func Tx FR out—Outgoing functional fault probability in test step x (%)

The tables below provides an examples of the category level pareto, the part number pareto, and the component level pareto respectively.

TABLE 14

| TEST STEP 1 Categ NAME | Count | % Sold T1 FR In | % Work T1 FR In | % Func T1 FR In | % Assy T1 Tst Cov | % Func T1 Tst Cov | min Assy T1 Tst Iso | min Func T1 Tst Iso | min Assy T1 Iso time | $ Assy T1 Iso cost | min Func T1 Iso time | $ Func T1 Iso cost | min Assy T1 Rep time | $ Assy T1 Rep cost | min Func T1 Rep time | $ Func T1 Rep cost | % Sold T1 FR out |
|---|---|---|---|---|---|---|---|---|---|---|---|---|---|---|---|---|---|
| SSIC | 66 | 7.578 | 0.658 | 1.311 | 5 | 0 | 0.7 | 0 | 0.03 | 0.04 | 0 | 0 | 0.247 | 0.16 | 0 | 0 | 3.861 |
| MSIC | 11 | 3.94 | 0.11 | 0.33 | 50 | 0 | 0.7 | 0 | 0.014 | 0.02 | 0 | 0 | 0.109 | 0.07 | 0 | 0 | 1.986 |
| LSIC | 1 | 0.499 | 0.01 | 0.05 | 50 | 0 | 0.7 | 0 | 0.002 | 0 | 0 | 0 | 0.013 | 0.01 | 0 | 0 | 0.249 |
| VLSI | 2 | 7.467 | 0.02 | 0.4 | 50 | 0 | 0.7 | 0 | 0.027 | 0.04 | 0 | 0 | 0.191 | 0.13 | 0 | 0 | 3.727 |
| RESC | 222 | 2.196 | 2.196 | 1.104 | 50 | 0 | 0.7 | 0 | 0.016 | 0.02 | 0 | 0 | 0.111 | 0.07 | 0 | 0 | 1.104 |
| RESP | 1 | 0.08 | 0.01 | 0.005 | 50 | 0 | 0.7 | 0 | 0 | 0 | 0 | 0 | 0.002 | 0 | 0 | 0 | 0.04 |
| CAPC | 127 | 1.262 | 1.262 | 0.633 | 50 | 0 | 0.7 | 0 | 0.009 | 0.01 | 0 | 0 | 0.063 | 0.04 | 0 | 0 | 0.633 |
| CAPE | 77 | 0.767 | 0.767 | 0.384 | 50 | 0 | 0.7 | 0 | 0.005 | 0.01 | 0 | 0 | 0.038 | 0.03 | 0 | 0 | 0.384 |
| INDU | 3 | 0.03 | 0.03 | 0.015 | 50 | 0 | 0.7 | 0 | 0 | 0 | 0 | 0 | 0.001 | 0 | 0 | 0 | 0.015 |
| OSCI | 1 | 0.04 | 0.01 | 0.05 | 50 | 0 | 0.7 | 0 | 0 | 0 | 0 | 0 | 0.001 | 0 | 0 | 0 | 0.02 |
| CONN | 13 | 15.937 | 0.13 | 0.065 | 50 | 0 | 0.7 | 0 | 0.061 | 0.08 | 0 | 0 | 0.441 | 0.29 | 0 | 0 | 8.261 |
| DIOD | 141 | 2.093 | 1.4 | 0.703 | 50 | 0 | 0.7 | 0 | 0.012 | 0.02 | 0 | 0 | 0.088 | 0.06 | 0 | 0 | 1.052 |
| POWR | 3 | 0.09 | 0.03 | 0.015 | 50 | 0 | 0.7 | 0 | 0 | 0 | 0 | 0 | 0.003 | 0 | 0 | 0 | 0.045 |
| BOAD | 2 | 0 | 0.02 | 0.01 | 0 | 0 | 0 | 0 | 0 | 0 | 0 | 0 | 0.012 | 0.01 | 0 | 0 | 0 |
| MECH | 25 | 0 | 0.25 | 0.125 | 50 | 0 | 0.7 | 0 | 0.01 | 0 | 0 | 0 | 0.006 | 0 | 0 | 0 | 0 |

TABLE 15

| TEST STEP 1 Part Num | Count | % Sold T1 FR In | % Work T1 FR In | % Func T1 FR In | % Assy T1 Tst Cov | % Func T1 Tst Cov | min Assy T1 Tst Iso | min Func T1 Tst Iso | min Assy T1 Iso time | $ Assy T1 Iso cost | min Func T1 Iso time | $ Func T1 Iso cost | min Assy T1 Rep time | $ Assy T1 Rep cost | min Func T1 Rep time | $ Func T1 Rep cost | % Sold T1 FR out |
|---|---|---|---|---|---|---|---|---|---|---|---|---|---|---|---|---|---|
| 0160-6222 | 73 | 0.727 | 0.727 | 0.364 | 50 | 0 | 0.7 | 0 | 0.005 | 0.01 | 0 | 0 | 0.036 | 0.02 | 0 | 0 | 0.364 |
| 0160-7347 | 54 | 0.539 | 0.539 | 0.27 | 50 | 0 | 0.7 | 0 | 0.004 | 0.01 | 0 | 0 | 0.027 | 0.02 | 0 | 0 | 0.27 |
| 0180-3755 | 71 | 0.708 | 0.708 | 0.354 | 50 | 0 | 0.7 | 0 | 0.005 | 0.01 | 0 | 0 | 0.035 | 0.02 | 0 | 0 | 0.354 |
| 0180-4287 | 6 | 0.06 | 0.06 | 0.03 | 50 | 0 | 0.7 | 0 | 0 | 0 | 0 | 0 | 0.003 | 0 | 0 | 0 | 0.03 |
| 0361-1297 | 4 | 0 | 0.04 | 0.02 | 50 | 0 | 0.7 | 0 | 0 | 0 | 0 | 0 | 0.001 | 0 | 0 | 0 | 0 |
| 0361-1356 | 1 | 0 | 0.01 | 0.005 | 50 | 0 | 0.7 | 0 | 0 | 0 | 0 | 0 | 0 | 0 | 0 | 0 | 0 |
| 0361-1392 | 2 | 0 | 0.02 | 0.01 | 50 | 0 | 0.7 | 0 | 0 | 0 | 0 | 0 | 0 | 0 | 0 | 0 | 0 |
| 0361-1778 | 1 | 0 | 0.01 | 0.005 | 50 | 0 | 0.7 | 0 | 0 | 0 | 0 | 0 | 0 | 0 | 0 | 0 | 0 |
| 0535-0082 | 2 | 0 | 0.02 | 0.01 | 50 | 0 | 0.7 | 0 | 0 | 0 | 0 | 0 | 0 | 0 | 0 | 0 | 0 |
| 0699-1318 | 15 | 0.15 | 0.15 | 0.075 | 50 | 0 | 0.7 | 0 | 0.001 | 0 | 0 | 0 | 0.007 | 0 | 0 | 0 | 0.075 |
| 0699-1344 | 5 | 0.05 | 0.05 | 0.025 | 50 | 0 | 0.7 | 0 | 0 | 0 | 0 | 0 | 0.002 | 0 | 0 | 0 | 0.025 |
| 0699-1348 | 8 | 0.08 | 0.08 | 0.04 | 50 | 0 | 0.7 | 0 | 0.001 | 0 | 0 | 0 | 0.004 | 0 | 0 | 0 | 0.04 |
| 0699-1361 | 16 | 0.16 | 0.16 | 0.08 | 50 | 0 | 0.7 | 0 | 0.001 | 0 | 0 | 0 | 0.008 | 0.01 | 0 | 0 | 0.08 |
| 0699-1366 | 4 | 0.04 | 0.04 | 0.02 | 50 | 0 | 0.7 | 0 | 0 | 0 | 0 | 0 | 0.002 | 0 | 0 | 0 | 0.02 |
| 0699-1369 | 1 | 0.01 | 0.01 | 0.005 | 50 | 0 | 0.7 | 0 | 0 | 0 | 0 | 0 | 0 | 0 | 0 | 0 | 0.005 |
| 0699-1415 | 13 | 0.13 | 0.13 | 0.065 | 50 | 0 | 0.7 | 0 | 0.001 | 0 | 0 | 0 | 0.006 | 0 | 0 | 0 | 0.065 |
| 0699-1417 | 4 | 0.04 | 0.04 | 0.02 | 50 | 0 | 0.7 | 0 | 0 | 0 | 0 | 0 | 0.002 | 0 | 0 | 0 | 0.02 |
| 0699-1951 | 2 | 0.02 | 0.02 | 0.01 | 50 | 0 | 0.7 | 0 | 0 | 0 | 0 | 0 | 0.001 | 0 | 0 | 0 | 0.01 |

TABLE 16

| TEST STEP 1 | | | % | % | % | % | % | min | min | min | $ | min | $ | min | $ | min | $ |
|---|---|---|---|---|---|---|---|---|---|---|---|---|---|---|---|---|---|
| Part Num | Refer Desig | Count | Sold T1 FR In | Work T1 FR In | Func T1 FR In | Assy T1 Tst Cov | Func T1 Tst Cov | Assy T1 Tst Iso | Func T1 Tst Iso | Assy T1 Iso time | Assy T1 Iso cost | Func T1 Iso time | Func T1 Iso cost | Assy T1 Rep time | Assy T1 Rep cost | Func T1 Rep time | Func T1 Rep cost |
| 0160-6222 | refdes | 73 | 0.01 | 0.01 | 0.005 | 50 | 0 | 0.7 | 0 | 0 | 0 | 0 | 0 | 0 | 0 | 0 | 0 |
| 0160-7347 | refdes | 54 | 0.01 | 0.01 | 0.005 | 50 | 0 | 0.7 | 0 | 0 | 0 | 0 | 0 | 0 | 0 | 0 | 0 |
| 0180-3755 | refdes | 71 | 0.01 | 0.01 | 0.005 | 50 | 0 | 0.7 | 0 | 0 | 0 | 0 | 0 | 0 | 0 | 0 | 0 |
| 0180-4287 | refdes | 6 | 0.01 | 0.01 | 0.005 | 50 | 0 | 0.7 | 0 | 0 | 0 | 0 | 0 | 0 | 0 | 0 | 0 |
| 0361-1297 | refdes | 4 | 0 | 0.01 | 0.005 | 50 | 0 | 0.7 | 0 | 0 | 0 | 0 | 0 | 0 | 0 | 0 | 0 |
| 0361-1356 | refdes | 1 | 0 | 0.01 | 0.005 | 50 | 0 | 0.7 | 0 | 0 | 0 | 0 | 0 | 0 | 0 | 0 | 0 |
| 0361-1392 | refdes | 2 | 0 | 0.01 | 0.005 | 50 | 0 | 0.7 | 0 | 0 | 0 | 0 | 0 | 0 | 0 | 0 | 0 |
| 0361-1778 | refdes | 1 | 0 | 0.01 | 0.005 | 50 | 0 | 0.7 | 0 | 0 | 0 | 0 | 0 | 0 | 0 | 0 | 0 |
| 0535-0082 | refdes | 2 | 0 | 0.01 | 0.005 | 50 | 0 | 0.7 | 0 | 0 | 0 | 0 | 0 | 0 | 0 | 0 | 0 |
| 0699-1318 | refdes | 15 | 0.01 | 0.01 | 0.005 | 50 | 0 | 0.7 | 0 | 0 | 0 | 0 | 0 | 0 | 0 | 0 | 0 |
| 0699-1344 | refdes | 5 | 0.01 | 0.01 | 0.005 | 50 | 0 | 0.7 | 0 | 0 | 0 | 0 | 0 | 0 | 0 | 0 | 0 |
| 0699-1348 | refdes | 8 | 0.01 | 0.01 | 0.005 | 50 | 0 | 0.7 | 0 | 0 | 0 | 0 | 0 | 0 | 0 | 0 | 0 |
| 0699-1361 | refdes | 16 | 0.01 | 0.01 | 0.005 | 50 | 0 | 0.7 | 0 | 0 | 0 | 0 | 0 | 0 | 0 | 0 | 0 |
| 0699-1366 | refdes | 4 | 0.01 | 0.01 | 0.005 | 50 | 0 | 0.7 | 0 | 0 | 0 | 0 | 0 | 0 | 0 | 0 | 0 |
| 0699-1369 | refdes | 1 | 0.01 | 0.01 | 0.005 | 50 | 0 | 0.7 | 0 | 0 | 0 | 0 | 0 | 0 | 0 | 0 | 0 |
| 0699-1415 | refdes | 13 | 0.01 | 0.01 | 0.005 | 50 | 0 | 0.7 | 0 | 0 | 0 | 0 | 0 | 0 | 0 | 0 | 0 |
| 0699-1417 | refdes | 4 | 0.01 | 0.01 | 0.005 | 50 | 0 | 0.7 | 0 | 0 | 0 | 0 | 0 | 0 | 0 | 0 | 0 |
| 0699-1951 | refdes | 2 | 0.01 | 0.01 | 0.005 | 50 | 0 | 0.7 | 0 | 0 | 0 | 0 | 0 | 0 | 0 | 0 | 0 |

In addition to pareto analysis of simulation data, MTSIM provides pareto analysis of test access. Table 17 below provides an example of the pareto menu for test access. In the test access pareto analysis, the user can investigate the results of the selective addition of test access points, either by adding testpads or boundary scan cells to components. This analysis is important, since SMT boards are very dense, and obtaining sufficient board space for test access in the design is difficult. This pareto analysis provides information on the test access profile of the board. The user can sort (ascending or descending) any of the fields by using the Data→Sort command. The rows of the table 17 below have the board components. The columns of the table 17 below contain the following information:

PART_NUM—Component part number
REF_DES—Component reference designator
TST_ACCESS—Number of test access points in this component
TOT_PINS—Total number of pins in this component
PERC_PIN_ACCESS—Percentage of test access in this component
PERC_BOARD_COV—Percentage of the number of pins of this component as compared with the whole board. This is a measure of the contribution of this component to the board assembly test coverage
CATEG—Component category

TABLE 17

| PART NUM | REF DES | TST AC-CESS | TOT PINS | PERC PIN ACCESS | PERC BOARD COV | CATEG |
|---|---|---|---|---|---|---|
| 0160-6222 | refdes | 146 | 146 | 100 | 2.18 | CAPC |
| 0160-7347 | refdes | 108 | 108 | 100 | 1.61 | CAPC |
| 0180-3755 | refdes | 142 | 142 | 100 | 2.12 | CAPE |
| 0180-4287 | refdes | 12 | 12 | 100 | 0.18 | CAPE |
| 0361-1297 | refdes | 0 | 0 | 0 | 0 | MECH |
| 0361-1356 | refdes | 0 | 0 | 0 | 0 | MECH |
| 0361-1392 | refdes | 0 | 0 | 0 | 0 | MECH |
| 0361-1778 | refdes | 0 | 0 | 0 | 0 | MECH |
| 0535-0082 | refdes | 0 | 0 | 0 | 0 | MECH |
| 0699-1318 | refdes | 30 | 30 | 100 | 0.45 | RESC |
| 0699-1344 | refdes | 10 | 10 | 100 | 0.15 | RESC |
| 0699-1348 | refdes | 16 | 16 | 100 | 0.24 | RESC |
| 0699-1361 | refdes | 32 | 32 | 100 | 0.48 | RESC |

MTSIM IMPLEMENTATION

In the preferred embodiment of the present invention, the simulator tools and methods are integrated with the Mentor Graphics design tools using the Falcon framework to provide standard tools for development of a common user interface with that of other design tools. Integrating the manufacturing test simulation with the circuit design tools is key to the present invention. Although the Mentor Graphics design system was selected in the preferred embodiment of the present invention, it will be readily recognized that other well known design tools could be used in place of the Mentor Graphics design tools. Most modern design toolsets for circuit designers provide the ability for additional test or design tools to be integrated with the basic functions of the circuit design package.

Due to the high level of integration with the data and user interface of the design tools, a board designer using the design tools with the integrated manufacturing test simulator can, at one sitting, layout a preliminary version of the circuit by placing the components. Having the preliminary placement, the designer invokes MTSIM and within minutes MTSIM provides a simulation of the manufacturing test and repair of the board. It is important to note that with MTSIM, the designer has the same "look and feel" as the design tools used to design the circuit. There is no need to learn significantly new tools and concepts to use the manufacturing test simulator of the present invention. Nor does the circuit designer need to learn the detailed information relating to manufacturing test procedures and parameters. The simulator of the present invention encodes the knowledge of manufacturing engineers in its library and model structures.

USER INTERFACE

The simulation libraries and results are incorporated in the design database, thus becoming part of the design. Multiple simulations can be run and can be updated as the design matures. The simulator displays output dynamically in the same order (left to right) as the physical test steps are invoked in the real manufacturing floor. If there are two test steps simulated, the output contains the two steps; if three test steps are simulated, the output will display three test results, etc. MTSIM supports up to 7 distinct test steps. Pareto listings of contributors to quality, coverage and cost are also provided. What-if analysis is menu driven and any of the input parameters are available for change.

The user interface provides a spreadsheet-like table appearance to simplify "what-if" analysis, provides both graphical and textual output of simulated test results, and provides the appearance (user interface "look and feel") of being seamlessly integrated with the design tools used by the designer.

Figure 12:
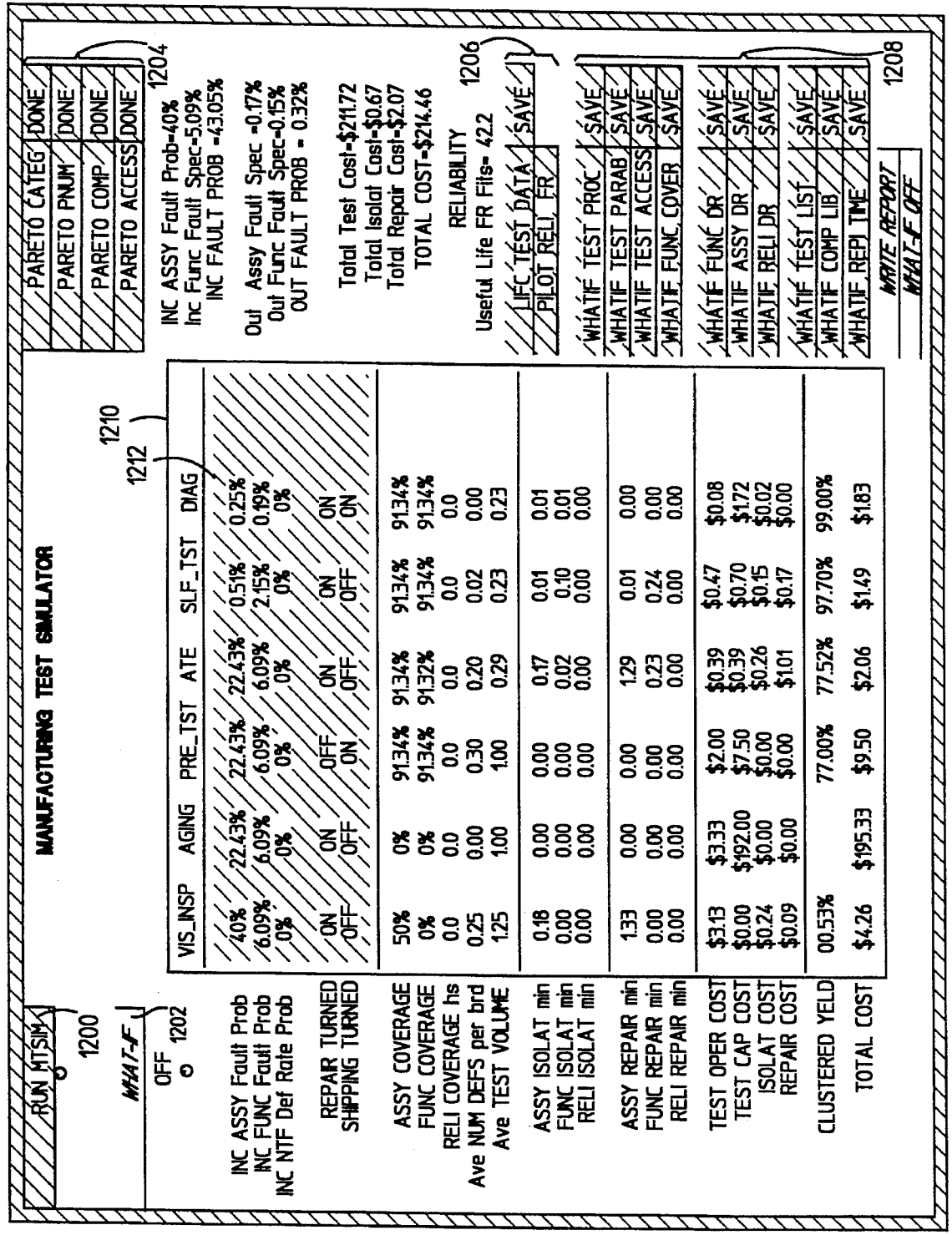
FIG. 12 is an image of a user display screen and menu which is used to control the operation of the simulator of the present invention and to display simulation results.

The Mentor Graphics DSS tool provides an environment to implement the user interface, and the AMPLE programming language (provided in Mentor Graphics) supports all of the needed software facilities to construct the user interface "menu." FIG. 12 shows an exemplary main menu window of the simulator of the present invention as it would be seen on the user interface display 108 of FIG. 1.

The boxed area 1210 in the middle of the menu of FIG. 12 displays the simulation inputs and results with each test step in a separate column. Only test steps which are enabled are displayed, and test steps are displayed in the order of their execution left to right. Each test step is shown as a column of the table in boxed area 1210. The portion of boxed area 1210 shaded in gray and labelled 1212 indicates the input settings for each test step column. The input settings in the gray shaded area 1212 are row entries in each column and are interpreted as follows:

INC ASSY FAULTS %—Incoming assembly fault probability
INC FUNC FAULTS %—Incoming Functional fault probability
INC NTF FAULTS %—Incoming No Trouble Found fault probability
REPAIR TURNED—REPL_ENABLE flag on/off
SHIPPING TURNED—SHIP_ENABLED flag on/off The remaining entries in the boxed area 1210 indicate the simulated results of the test step associated with the corresponding column. These row entries in each column are interpreted as follows:

ASSY COVERAGE %—Aggregate Assembly coverage for this step
FUNC COVERAGE %—Aggregate Functional coverage for this step
RELI COVERAGE hs—Reliability coverage for this step
AVG NUM DEFS—Average number of defects detected in this step
AVG TEST VOLUME—Average test volume in this step
ASSY ISOLAT min—Aggregate isolation time for assembly defects
FUNC ISOLAT min—Aggregate isolation time for functional defects
RELI ISOLAT min—Aggregate isolation time for reliability defects
ASSY REPAIR min—Aggregate repair time for assembly defects
FUNC REPAIR min—Aggregate repair time for functional defects
RELI REPAIR min—Aggregate repair time for reliability defects
TST OPER COST $—Test operator costs for this step
TST CAP COST $—Test equipment costs for this step
ISOLAT COST $—Isolation operator costs for this step
REPAIR COST $—Repair operator costs for this step
CLUSTERED YIELD %—Clustered yield for this step
TOTAL COST $—Total test and repair costs for this step The menu window shown in FIG. 12 has action buttons, which are engaged by pressing the left button of mouse 106 with the cursor of the display 108 positioned over the desired action button. Specifically, button 1200 is used to run (or re-run) the simulator with the current settings. Button 1202 toggles on or off the "what-if" analysis capability to iteratively rerun the simulator with changed parameters. The set of action buttons 1208, on the lower right hand side of the main menu in FIG. 12, invoke and save the "what-if" menus for each of the libraries. The action buttons 1204 on the upper right hand side control the invocation of the pareto analysis menus. Overall outputs for quality and cost, along with the action buttons for reliability analysis are found in the center on the right hand side as action buttons 1206.

OPERATING PROCEDURE

Figure 10:
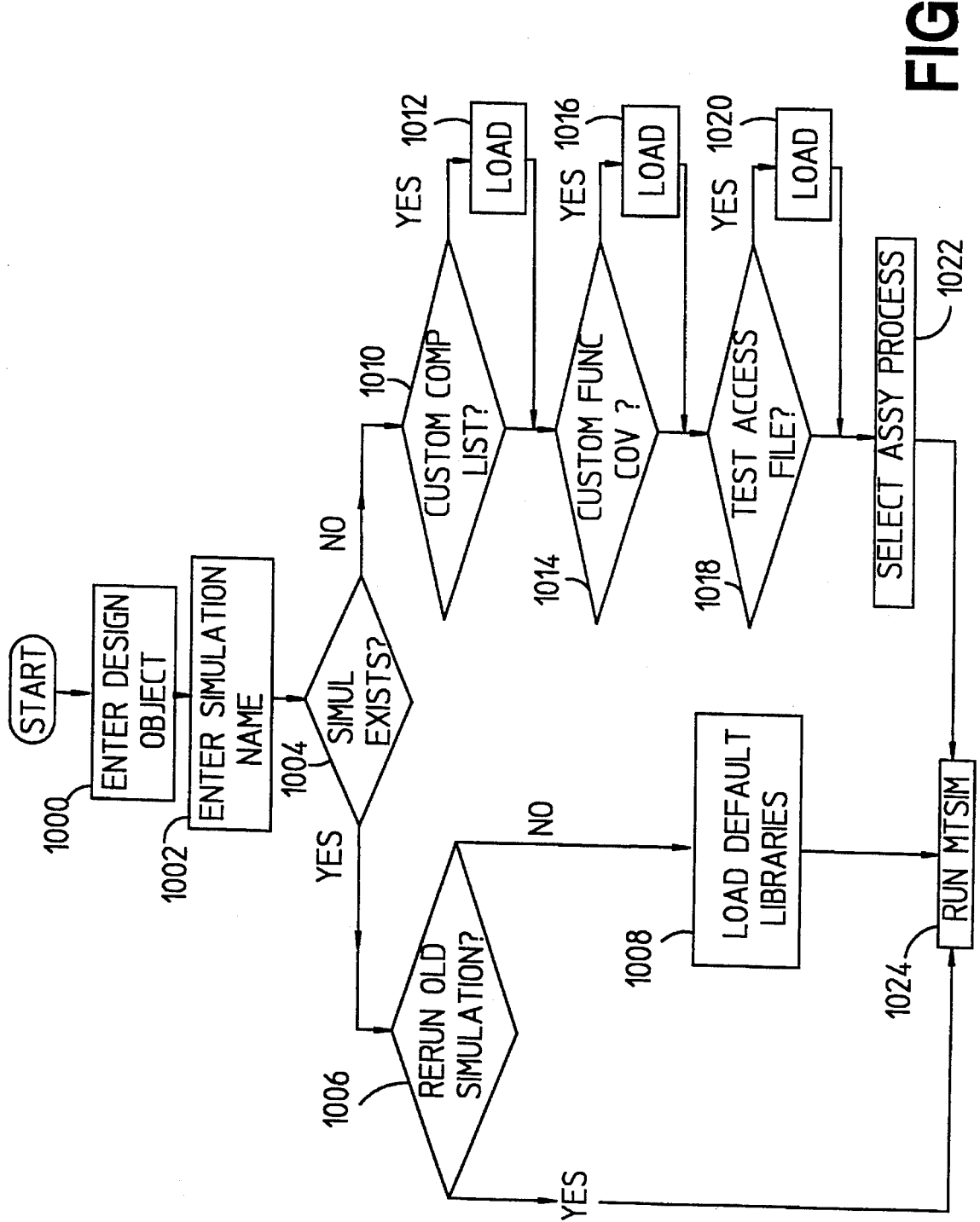
FIG. 10 is a flowchart showing additional detail the initialization of the simulation methods shown in FIG. 4.

FIG. 10 is a flowchart depicting the operation of the simulator of the present invention and its integration with the design tools. The first step at element 1000 is to enter the design object using the circuit design tools with which the simulator of the present invention is integrated. In the Mentor Graphics preferred environment, the design object is a directory which contains all of the design information. The simulator of the present invention creates a directory within the directory of the design object created by Mentor Graphics.

The user is next prompted by operation of element 1002 on display 108 of FIG. 1 to provide a simulation name by entering it through keyboard 106 of FIG. 1. The simulation name will be used to create a directory under the MTSIM directory to keep all the data for that simulation setup. Element 1004 is then operable to determine whether the files associated with the named simulation already exist. If the files associated with the named simulation already exist, the user is asked, by operation of element 1006 through display 108 and keyboard 106, whether to rerun the existing simulation using the existing simulation files or overwrite the existing files with default MTSIM library files to initiate a new simulation. Whenever a simulation is modified during "what-if" analysis, the changes made to any of the library files are kept in the simulation directory. If the user chooses to overwrite an existing simulation, element 1008 is invoked and the information from that previous simulation is lost and replaced by the default libraries to thereby initiate a new simulation run.

If the simulation files do not exist for the simulation name provided as determined by operation of element 1004, MTSIM sets up a new simulation with the default library setting used to initialize the files for the new simulation run. The user is first asked by operation of element 1010 if there is a custom component list file or if MTSIM should use the Mentor design information. If a custom component list is provided, element 1012 operates to load the contents of the custom components file. Next, elements 1014 and 1016 operate similarly to elements 1010 and 1012 to prompt for, and load if provided, a custom functional coverage file. Finally, elements 1018 and 1020 are operable like 1010 and 1012 to prompt for, and load if provided, a custom test access file. In the case of operation of element 1010, 1014, and 1018, if a custom file is not provided, the simulator loads default values from the simulator library files for the corresponding setup information.

MTSIM DATABASE

The data base is built with AMPLE multi-dimensional vectors as provided for by the Mentor Graphics Falcon Framework. These vectors are global and generated at the beginning of a simulation. They are reloaded for each what-if simulation. A description of the major data structures is given next. It will be readily recognized that although the preferred embodiment discussed herein refers to the Mentor Graphics design tools, the methods and associated structures described herein may be integrated with many common circuit design tools.

Data structures for components are two dimensional vector which contains data for each component per row. The columns index the different data fields for each component. There are 3 main data structures:

D_COMP_VECTOR—Contains data for all components by reference designator

D_PNUM_VECTOR—Contains data for all part numbers by part number

D_CATEG_VECTOR—Contains data for all component categories by category

D_COMP_VECTOR is a two dimensional vector which contains data for each component in each row. For a description of the data in this vector for each component (row), see the discussion of the indexes below. The data in D_COMP_VECTOR represents a single component regardless of the number of such components actually used in the circuit design. The actual component count, indicated by the I_COUNT entry in the vector, is relevant as a multiplier when the simulator calculates yields, total isolation times and total repair times.

D_PNUM_VECTOR is a two dimensional vector derived from D_COMP_VECTOR which contains data for groups of components with the same part number. For multiple uses of the same part number, the I_COUNT entry stores the actual count. For most entries D_PNUM_VECTOR will provide a total number for the group of like components. For example, for number of pins for each part number, the entry contains the number of pins for the component times the count of components with that part number. D_CATEG_VECTOR is similar to D_PNUM_VECTOR, except that it contains data for all components assigned the same category in the category field of the MTSIM library discussed below. D_PNUM_VECTOR and D_CATEG_VECTOR have the same column indexes as D_COMP_VECTOR, discussed below as indexes.

Figure 11:
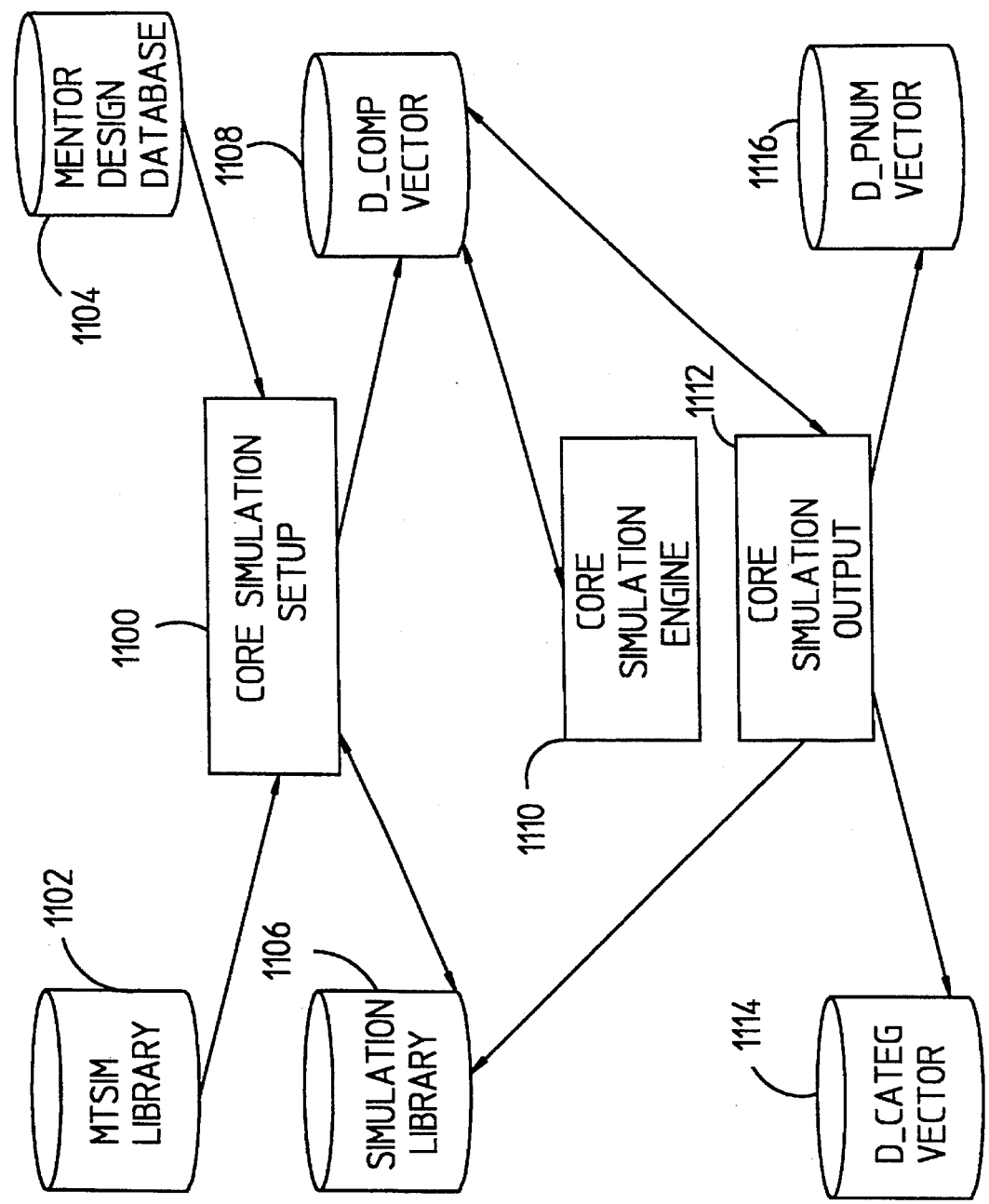
FIG. 11 is a block diagram indicating the relationships between elements of the simulators database and the simulation methods associated therewith.

FIG. 11 is a diagram for the database and its relationship with the simulating methods. The core simulation setup 1100 methods use information from the MTSIM library 1102, the Mentor design database 1104 (the product design data), and the named simulation library files 1106 to construct the D_COMP_VECTOR 1108 information for each component. The core simulation engine 1110 which actually runs the simulation after all setup is complete uses only the information setup in the D_COMP_VECTOR 1108 files. This is because the simulation operates on a per component basis in conjunction with all the manufacturing test models. Once the simulation is complete, the core simulation output methods 1112 retrieves per component information from the D_COMP_VECTOR 1108 and reports it for pareto and other analysis on either a per component basis D_COMP_VECTOR 1108, a per part number basis D_PNUM_VECTOR 1116, or a per category basis D_CATEG_VECTOR 1114.

VECTOR INDEXES

According to the Mentor standards, all AMPLE vector data structures are accessed via indexes. The column (col) indexes used are described below:

I_PNUM—col index field for PART NUMBER

I_REFD—col index field for REFERENCE DESIGNATOR

I_GEOM—col index field for MENTOR GEOMETRY

I_COUNT—col index for COUNT of comp in CATEGORIES or PART NUMBER

I_SLFT_COV—Selftest COVERAGE from functional coverage file

I_SLFT_ISO—Selftest ISOLATION from functional coverage file

I_PINS—col index field for PINS

I_PPINS—col index field for POWER PINS

I_TPINS—col index field for TOTAL #PINS

I_COST—col index field for PART COST

I_CATEG—col index field for PART CATEGORY

I_COMB—col index field for flag combining this part in D_CATEG_VECTOR

I_BSFLG—col index field for flag for BOUNDARY SCAN

I_BISTC—col index field for flag for BIST on CHIP

I_BISTB—col index field for flag for BIST on BOARD

I_STFLG—col index field for flag for SELF-TEST

I_DIAOF—col index field for flag for OFF-LINE DIAGNOSTICS

I_DIAON—col index field for flag for ON-LINE DIAGNOSTICS

I_FPPM—col index field Incoming functional PPM (if "def" default model is used)

I_RQUL—col index field Reliability Quality Factor

I_TSTPT—col index field for # of TEST POINTS

I_SFR_I—col index for INCOMING Solder Assembly failure rate

I_WFR_I—col index for INCOMING Workmanship Assembly failure rate

I_FFR_I—col index for INCOMING Functional failure rate

I_REL_I—col index for INCOMING Reliability failure rate

The rows in D_COMP_VECTOR represent the components, and the columns represent the various data for each component. For example, D_COMP_VECTOR[1][I_PNUM] gives the part number for the first component. In addition to the indexes already described, D_COMP_VECTOR stores the data for each test step being simulated. Information on the test process is stored in the TST_PROC vector discussed below. There is one set of the test process indexes for each test step used. The order which the vector is built and the simulation runs, is dictated by the order in TST_PROC[TST_ORDER]. The I_TPSTEP index is a link between the order of execution and the actual test process specified in TST_PROC[i]. The column (col) indexes that contain test data in D_COMP_VECTOR are:

I_ATC—col index Assembly COVERAGE at test step #
I_FTC—col index Functional COVERAGE at test step #
I_ATIS—col index Assembly ISOLATION at test step #
I_FTIS—col index Functional ISOLATION at test step #
I_SDEF—col index Solder DEFECTS DETECTED at test step #
I_WDEF—col index Workmanship DEFECTS DETECTED at test step #
I_FDEF—col index Functional DEFECTS DETECTED at test step #
I_AIST—col index ISOLATION TIME for Assy def caught in test step #
I_FIST—col index ISOLATION TIME for Func def caught in test step #
I_AREPT—col index REPAIR TIME for Assembly def caught in test step #
I_FREPT—col index REPAIR TIME for Funct def caught in test step #
I_SFRI—col index Assy Solder FAILURE RATE into test step #
I_WFRI—col index Assy Workmanship FAILURE RATE into test step #
I_FFRI—col index Functional FAILURE RATE into test step #
I_SFRO—col index Assy Solder FAILURE RATE out of test step #
I_WFRO - col index Assy Workmanship FAILURE RATE out of test step #
I_FFRO—col index Functional FAILURE RATE out of test step #
I_TPSTEP—col index link to TST_PROC vector.

The offsets below are used to access the test process entries of D_COMP_VECTOR. For test step two the assembly coverage for component i is:

D_COMP_VECTOR[i][I_ATC+D_TST_OFFSET_n]

where D_TST_OFFSET_n is:
D_TST_OFFSET_1 column location for the BEGINNING of the 1st Test step D_TST_OFFSET_2 column location for the BEGINNING of the 2nd Test step D_TST_OFFSET_3 column location for the BEGINNING of the 3rd Test step D_TST_OFFSET_4 column location for the BEGINNING of the 4th Test step D_TST_OFFSET_5 column location for the BEGINNING of the 5th Test step D_TST_OFFSET_6 column location for the BEGINNING of the 6th Test step D_TST_OFFSET_7 column location for the BEGINNING of the 7th Test step

COMPONENT CATEGORIES

The category label is used to describe the attributes of each component when the various simulator models are used. The categories are stored in the I_CATEG index of D_COMP_VECTOR. There are four portions in each category label. Each portion provides information regarding the defining characteristics of the associated category. An example of a category label is "_CAPC_050T_SMTM_DIGI_" where, CAPC is the type of the component (see TYPE.DEF below), 050T is the solder joint pitch of the component (see PITCH.DEF below), SMTM is the assembly mechanism of the component (see PROC.DEF below), and DIGI is the functionality of the component (see FUNC.DEF below).

The permissible values for each portion of the category label are:

TYPE.DEF—defines the type of the component as:
  SSIC Integrated Circuit 0–50 PINS
  MSIC Integrated Circuit 51–100 PINS
  LSIC Integrated Circuit 101–200 PINS
  VLSI Integrated Circuit 201—PINS
  RESC Chip resistor
  RESP Resistor Pack
  CAPC Ceramic Capacitor
  CAPE Electrolytic Capacitor
  INDU Inductors and chokes
  CRYS Crystals
  OSCI Oscillators
  CONN Connectors
  TRAN Transistors
  DIOD Diodes
  POWR Power components
  BOAD Blank board
  MECH Mechanical components
PITCH.DEF—defines the pitch of the component as:
  100T—Pitch of component in mils followed by side mounted on board
  100B—Pitch of component in mils followed by side mounted on board
  070T—Pitch of component in mils followed by side mounted on board
  070B—Pitch of component in mils followed by side mounted on board
  050T—Pitch of component in mils followed by side mounted on board
  050B—Pitch of component in mils followed by side mounted on board
  025T—Pitch of component in mils followed by side mounted on board
  025B—Pitch of component in mils followed by side mounted on board
  020T—Pitch of component in mils followed by side mounted on board
  020B—Pitch of component in mils followed by side mounted on board
  015T—Pitch of component in mils followed by side mounted on board
  015B—Pitch of component in mils followed by side mounted on board
PROC.DEF—defines the assembly process for the component as:
  SMTM Surface Mount Process process Machine assembly
  SMTH Surface Mount Process process Hand assembly
  THTM Through Hole process Machine assembly
  THTH Through Hole process Hand assembly
  MCMB MCM process with Bond wire
  MCMS MCM process with solder bump technology
FUNC.DEF—defines the functionality of the component as:
  DIGI Digital component in the board
  ANAL Analog component in the board
  RAMM RAM component in the board
  ROMM ROM component in the board
  GLUE Glue logic component in the board
  IOIO IO component in the board CPUC CPU component in the board
DSPC DSP component in the board
VIDE VIDEO component in the board Components of the same category are grouped for the category level pareto analysis. However, there are times when it is desirable not to combine a component for category pareto analysis. Instead, the user may wish to perform pareto analysis on a specific component separately, and compare it to the other component categories (an example may be a custom ASIC). For this purpose, the component library, described above, provides the COMB boolean flag.

TEST PROCESS DATA STRUCTURE

The AMPLE language vector TST_PROC contains information regarding the test process. Each TST_PROC vector is a vector with 8 entries, with entry number 0 not used. Each entry represents one of 7 possible test steps in the process. The characteristics of each test step are defined by the boolean switches for each of the vectors representing different kinds of test coverages. To determine, for example, whether test step #3 is used in a particular simulation, the simulator tests the used flag at:

TST_PROC[TST_USED][3]

Similarly, to determine whether, for example, test step #2 uses boundary scan, the simulator tests the boundary scan flag at:

TST_PROC[BOUND_SCAN][2]

The default values in the TST_PROC vector are contained in the library file S_TST_PROC_FILE which is initialized when a simulation run is initiated. Other functions invoked during initialization of a simulation run inspect TST_PROC [TST_USED] to determine the number of test steps actually defined for the simulation setup. The number of test steps so determined is set in the variable D_TST_COUNT for further reference. One use of the D_TST_COUNT value is to establish the width of D_COMP_VECTOR, D_PNUM_VECTOR, and D_CATEG_VECTOR. I_TST_ORDER determines the actual execution order of the test step in the manufacturing floor. The row indexes used in the TST_PROC vector are:

I_TST_NAME—test step Name
I_TST_USED—Is this test step used?
I_TST_ORDER—physical order of execution
I_ANALOG_UNP—yes/no flag for test attribute
I_ANALOG_INC—yes/no flag for test attribute
I_BOUND_SCAN—yes/no flag for test attribute
I_DIGITAL_INC—yes/no flag for test attribute
I_BIST_COMP—yes/no flag for test attribute
I_BIST_BOARD—yes/no flag for test attribute
I_FUNC_DIAG_OFL—yes/no flag for test attribute
I_FUNC_DIAG_ONL—yes/no flag for test attribute
I_SELF_TEST—yes/no flag for test attribute
I_STRESS_AGING—yes/no flag for test attribute
I_RUNIN_AGING—yes/no flag for test attribute
I_VISUAL_INSP—yes/no flag for test attribute
I_TST_OPE_TIME—Test time in min for this step
I_TST_CAP_TIME—Test time in min for this step
I_TST_OPE_COST—Test execution Cost $/hr
I_TST_CAP_COST—Test execution Cost $/hr
I_ISO_COST—Test Isolation Cost $/hr
I_REPL_COST—Component replacement Cost $/hr
I_REPL_ENABLE—Is repair enabled in this step?
I_SHIP_ENABLE—Are boards that pass this test The NTF rates for pins and for components are declared next. They assume that the equivalent of 100% coverage affects them. The NTF pins defects are added to the assembly isolation time in MT_sim_iso_time, accounting for NTF due to pin contact failures. The ntf comps defects are added to the functional isolation time in MT_sim_iso_ time, accounting for NTF in the test itself. Both NTF rates are entered in the test process description.

I_TST_PIN_NTF—Per pin NTF rate
I_TST_COMP_NTF—Per comp NTF rate

TEST PARAMETER DATA STRUCTURE

The TST_PARA data structure stores the values from the test parameter library. The row indexes for the TST_PARA data structure are the same as the TST_PROC data structure. TST_PARA contains parameters for each test attribute in terms of test coverage and isolation. The columns of the TST_PARA data structure indicate the test attributes defined as follows:

I_PARA_ACOV—Col Assembly Coverage parameter
I_PARA_AISO—Col Assembly Isolation parameter
I_PARA_FCOV—Col Functional Coverage parameter
I_PARA_FISO—Col Functional Isolation parameter
I_PARA_RACT—Col Reliability Activation parameter The following parameters are stored in TST_PARA data structure below the text process indexes:

I_PIN_SHORTS—Derating factor for coverage of shorts in unpowered test
I_PIN_COV_CAP—Derating factor for coverage of capacitors in parallel
I_PIN_FCINC—Derating factor for funct cov of in-circuit for ssi, msi, Isi
I_PIN_FCINC_VLSI—Derating factor for functional coverage of in-circuit for vlsi

EXAMPLE OPERATION

The following description shows exemplary information output from the simulation of a test process as shown in FIG. 6 discussed above. The test process of FIG. 6 shows has six test steps defined, namely VIS INSP (element 600—visual inspection), AGING (element 604), PRE-TEST (element 606—initial screening), ATE (element 612—automatic test equipment), SLF-TEST (element 616—a selftest operation of the circuit), and DIAG (element 620—a diagnostic procedure). Test step elements 600, 612, 616, and 620 in this exemplary process have a repair option enabled. Test step element 606 has the repair option disabled, and test step element 604 never fails and therefore the repair option is irrelevant. Only test step element 606 has the ship option enabled to terminate further testing if the PRE-TEST step passes the circuit.

---

MTSIM Output Generated on [1994, 6, 16, 5] at [15, 18, 42]
Simulation name=simO_1
Number of Components=594
Number of Pins=4328
INCOMING FAULT SPECTRUM:
    SMT Assembly %=28.86
    Functional %=4.79
OUTGOING FAULT SPECTRUM:
    SMT Assembly %=0.15
    Functional %=0.09
USEFUL LIFE RELIABILITY:
    MILITARY STD RELIABILITY FITS=30.6732
TOTAL MANUFACTURING TEST AND REPAIR COSTS:
    Test Execution Cost $=110.07

Fault Isolation Cost $=0.91
Component Repair Cost $=1.56
Total Test/Repair Cost $=112.54
TEST STEP=VISUAL INSPECTION Repair is=ON Shipping is=OFF
VISUAL INSPECTION CLUSTERED YIELD %=85.8
VISUAL INSPECTION INCOMING ASSEMBLY FAULTS %=28.86
VISUAL INSPECTION INCOMING FUNCTIONAL FAULTS %=4.79
VISUAL INSPECTION INCOMING NTF FAULTS %=0
VISUAL INSPECTION ASSEMBLY COVERAGE %=50
VISUAL INSPECTION FUNCTIONAL COVERAGE %=0
VISUAL INSPECTION RELIABILITY COVERAGE hs=0
VISUAL INSPECTION AVERAGE NUMBER OF DEFECTS=0.1697
VISUAL INSPECTION OUTGOING ASSEMBLY FAULTS %=15.61
VISUAL INSPECTION OUTGOING FUNCTIONAL FAULTS %=4.79
VISUAL INSPECTION ASSEMBLY ISOLATION min=0.119
VISUAL INSPECTION FUNCTIONAL ISOLATION min=0
VISUAL INSPECTION ISOLATION TIME min=0.119
VISUAL INSPECTION ASSEMBLY REPAIR min=0.885
VISUAL INSPECTION FUNCTIONAL REPAIR min=0
VISUAL INSPECTION REPAIR TIME min=0.885
VISUAL INSPECTION TEST OPERATOR COST $=2.92
VISUAL INSPECTION TEST CAPITAL COST $=0
VISUAL INSPECTION ISOLATION COST $=0.16
VISUAL INSPECTION REPAIR COST $=0.59
VISUAL INSPECTION TOTAL COST $=3.67
TEST STEP=AGING Repair is=ON Shipping is=OFF
AGING INCOMING ASSEMBLY FAULTS %=15.61
AGING INCOMING FUNCTIONAL FAULTS %=4.79
AGING INCOMING NTF FAULTS %=0
AGING ASSEMBLY COVERAGE %=0
AGING FUNCTIONAL COVERAGE %=0
AGING RELIABILITY COVERAGE hs=48
AGING AVERAGE NUMBER OF DEFECTS=0
AGING OUTGOING ASSEMBLY FAULTS %=15.61
AGING OUTGOING FUNCTIONAL FAULTS %=4.79
AGING ASSEMBLY ISOLATION min=0
AGING FUNCTIONAL ISOLATION min=0
AGING ISOLATION TIME min=0
AGING ASSEMBLY REPAIR min=0
AGING FUNCTIONAL REPAIR min=0
AGING REPAIR TIME min=0
AGING TEST OPERATOR COST $=3.33
AGING TEST CAPITAL COST $=96
AGING ISOLATION COST $=0
AGING REPAIR COST $=0
AGING TOTAL COST $=99.33
TEST STEP=PRE_TEST Repair is=OFF Shipping is=ON
PRE_TEST CLUSTERED YIELD %=82.74
PRE_TEST INCOMING ASSEMBLY FAULTS %=15.61
PRE_TEST INCOMING FUNCTIONAL FAULTS %=4.79
PRE_TEST INCOMING NTF FAULTS %=0
PRE_TEST ASSEMBLY COVERAGE %=97.39
PRE_TEST FUNCTIONAL COVERAGE %=87.65
PRE_TEST RELIABILITY COVERAGE hs=0
PRE_TEST AVERAGE NUMBER OF DEFECTS=0.2054
PRE_TEST OUTGOING ASSEMBLY FAULTS %=15.61
PRE_TEST OUTGOING FUNCTIONAL FAULTS %=4.79
PRE_TEST ASSEMBLY ISOLATION min=0
PRE_TEST FUNCTIONAL ISOLATION min=0
PRE_TEST ISOLATION TIME min=0
PRE_TEST ASSEMBLY REPAIR min=0
PRE_TEST FUNCTIONAL REPAIR min=0
PRE_TEST REPAIR TIME min=0
PRE_TEST TEST OPERATOR COST $=2
PRE_TEST TEST CAPITAL COST $=3
PRE_TEST ISOLATION COST $=0
PRE_TEST REPAIR COST $=0
PRE_TEST TOTAL COST $=5
TEST STEP=ATE Repair is=ON Shipping is=OFF
ATE CLUSTERED YIELD %=87.92
ATE INCOMING ASSEMBLY FAULTS %=15.61
ATE INCOMING FUNCTIONAL FAULTS %=4.79
ATE INCOMING NTF FAULTS %=0
ATE ASSEMBLY COVERAGE %=72.12
ATE FUNCTIONAL COVERAGE %=39.86
ATE RELIABILITY COVERAGE hs=0
ATE AVERAGE NUMBER OF DEFECTS=0.1365
ATE OUTGOING ASSEMBLY FAULTS %=5.44
ATE OUTGOING FUNCTIONAL FAULTS %=2.58
ATE ASSEMBLY ISOLATION min=0.079
ATE FUNCTIONAL ISOLATION min=0.016
ATE ISOLATION TIME min=0.096
ATE ASSEMBLY REPAIR min=0.595
ATE FUNCTIONAL REPAIR min=0.193
ATE REPAIR TIME min=0.788
ATE TEST OPERATOR COST $=0.26
ATE TEST CAPITAL COST $=0.26
ATE ISOLATION COST $=0.13
ATE REPAIR COST $=0.53
ATE TOTAL COST $=1.18
TEST STEP=SELFTEST Repair is=ON Shipping is=OFF
SELFTEST CLUSTERED YIELD $=93.18
SELFTEST INCOMING ASSEMBLY FAULTS $=5.44
SELFTEST INCOMING FUNCTIONAL FAULTS $=2.58
SELFTEST INCOMING NTF FAULTS $=0
SELFTEST ASSEMBLY COVERAGE $=97.39
SELFTEST FUNCTIONAL COVERAGE $=87.65
SELFTEST RELIABILITY COVERAGE hs=0
SELFTEST AVERAGE NUMBER OF DEFECTS=0.0724
SELFTEST OUTGOING ASSEMBLY FAULTS %=0.48
SELFTEST OUTGOING FUNCTIONAL FAULTS %=0.48
SELFTEST ASSEMBLY ISOLATION min=0.255
SELFTEST FUNCTIONAL ISOLATION min=0.107
SELFTEST ISOLATION TIME min=0.362
SELFTEST ASSEMBLY REPAIR min=0.265
SELFTEST FUNCTIONAL REPAIR min=0.336
SELFTEST REPAIR TIME min=0.6
SELFTEST TEST OPERATOR COST $=0.37
SELFTEST TEST CAPITAL COST $=0.56
SELFTEST ISOLATION COST $=0.48
SELFTEST REPAIR COST $=0.4
SELFTEST TOTAL COST $=1.81
TEST STEP=DIAGNOSTICS Repair is=ON Shipping is=ON
DIAGNOSTICS CLUSTERED YIELD %=99.28
DIAGNOSTICS INCOMING ASSEMBLY FAULTS %=0.48
DIAGNOSTICS INCOMING FUNCTIONAL FAULTS %=0.48
DIAGNOSTICS INCOMING NTF FAULTS %=0
DIAGNOSTICS ASSEMBLY COVERAGE %=97.39
DIAGNOSTICS FUNCTIONAL COVERAGE %=97.39
DIAGNOSTICS RELIABILITY COVERAGE hs=0
DIAGNOSTICS AVERAGE NUMBER OF DEFECTS=0.0072
DIAGNOSTICS OUTGOING ASSEMBLY FAULTS %=0.15
DIAGNOSTICS OUTGOING FUNCTIONAL FAULTS %=0.09
DIAGNOSTICS ASSEMBLY ISOLATION min=0.05
DIAGNOSTICS FUNCTIONAL ISOLATION min=0.058
DIAGNOSTICS ISOLATION TIME min=0.108
DIAGNOSTICS ASSEMBLY REPAIR min=0.017
DIAGNOSTICS FUNCTIONAL REPAIR min=0.045
DIAGNOSTICS REPAIR TIME min=0.062
DIAGNOSTICS TEST OPERATOR COST $=0.06
DIAGNOSTICS TEST CAPITAL COST $=1.3
DIAGNOSTICS ISOLATION COST $=0.14
DIAGNOSTICS REPAIR COST $=0.04
DIAGNOSTICS TOTAL COST $=1.55

There has been described a novel manufacturing test simulator which provides methods to simulate manufacturing test and quality measures in a manner integrated with an electronic circuit design environment. It is evident that, now that the invention has been fully disclosed, those skilled in the art may now make numerous uses and modifications of the specific embodiment described, without departing from the inventive concepts. For example, the structure of files, libraries, and models used by the simulator methods may be modified to restructure the information in many equivalent ways. The computer system and disks used to operate the methods and store the information may be modified in many ways to store and manipulate the information differently.

The user interface may be altered to provide a different appearance or to provide more or less information from the test simulation. A greater or lesser number of test steps may be simulated. A greater or lesser number of fault models may be utilized to accurately estimate the fault probability and yields. Consequently, the invention is to be construed as embracing each and every novel feature and novel combination of features present in and/or possessed by the manufacturing test simulator described herein.

What is claimed is:

1. A method, operable on a computer, for estimating manufacturing test and quality attributes of an electronic assembly concurrent with the design of said electronic assembly comprising the steps of:

providing a description of the design of said electronic assembly;

providing pre-determined test and quality information relating to each component in said electronic assembly;

providing a description of a manufacturing test process; and simulating said manufacturing test process, responsive to the description of the design of said electronic assembly and to the predetermined test and quality information, to estimate said manufacturing test and quality attributes.

2. The method of claim 1 wherein the step of simulating further comprises the steps of:

estimating an incoming fault probability value for said each component in said electronic assembly by applying said pre-determined test and quality information corresponding to said each component; and simulating application of said manufacturing test process to said incoming fault probability value to estimate said manufacturing test and quality attributes.

3. The method of claim 2 wherein said manufacturing test and quality attributes comprise at least one attribute selected from the group consisting of: manufacturing test coverage, manufacturing test isolation, manufacturing test costs, assembly reliability, assembly repair costs, and assembly yield.

4. The method of claim 2 wherein the step of simulating application of said manufacturing test process further comprises the steps of:

estimating the average number of defects (Do) in said electronic assembly as:

$$Do = \sum_{j=1}^{N} Pfi_j * TC_j$$

where:

$Pfi_j$ is the incoming fault probability value corresponding to the j'th said component in said electronic assembly, $TC_j$ is a test coverage value corresponding to the j'th said component in said electronic assembly, and N is the number of components in said electronic assembly; and estimating the yield of said electronic assembly in response to the application of said manufacturing process and in response to the estimation of said average number of defects (Do).

5. The method of claim 4 wherein the incoming fault probability value (Pfi) of said j'th component is determined as:

$$Pfi = 1 - (1 - fp)^n$$

where:

n is the number of trials for a fault type in a component and is derived from said pre-determined test and quality information, fp is the fault probability and is derived from said pre-determined test and quality information.

6. The method of claim 4 wherein yield (Y) is determined as:

$$Y = Ycl + Yncl$$

where:

Ycl is a yield determined from clustered solder defects, and

Yncl is a yield determined from non-clustered assembly defects and functional defects.

7. The method of claim 6 wherein said Ycl is determined as:

$$Ycl = \left[ 1 + \frac{Do}{\alpha} \right]^{-\alpha}$$

where:

$\alpha$ is the clustering factor.

8. The method of claim 7 further comprising the step of:

providing information relating to the assembly process used for said electronic assembly;

estimating the clustering factor ($\alpha$) as:

$$\alpha = \frac{\mu^2}{\sigma^2 - \mu}$$

where:

$\mu$ is the mean number of defects for said assembly process, and $\sigma$ is the standard deviation of said number of defects for said assembly process.

9. The method of claim 6 wherein said Yncl is determined as:

$$Yncl = e^{-Do}$$

10. The method of claim 4:

wherein said manufacturing test process comprises at least one test attribute applicable to each of said components of said electronic assembly, said at least one test attribute selected from the group consisting of: in-circuit, boundary scan, self test, functional test, stress test, and inspection; and wherein said test coverage value (TC) of said j'th component is determined as the largest test coverage value of all test attributes applicable to the j'th component of said electronic assembly.

11. The method of claim 1 further comprising the steps of:

performing pareto analysis ranking of said electronic assembly with respect to said manufacturing test and quality attributes of said electronic assembly, wherein said pareto analysis ranks each component used in said electronic assembly with respect a contribution of each component to said manufacturing test and quality attributes.

12. The method of claim 1 further comprising the steps of:

performing pareto analysis ranking of said electronic assembly with respect to said manufacturing test and quality attributes of said electronic assembly, wherein said pareto analysis ranks each unique part number of all components used in said electronic assembly with respect to a contribution of each unique part number to said manufacturing test and quality attributes.

13. The method of claim 1 further comprising the steps of:
performing pareto analysis ranking of said electronic assembly with respect to said manufacturing test and quality attributes of said electronic assembly, wherein said pareto analysis ranks each category of components used in said electronic assembly with respect to a contribution of each category of components to said manufacturing test and quality attributes.

14. A method, operable on a computer, for estimating manufacturing test and quality attributes of an electronic assembly concurrent with the design of said electronic assembly comprising the steps of:
(a) providing a description of the design of said electronic assembly;
(b) providing pre-determined test and quality information relating to each component in said electronic assembly;
(c) providing a description of a manufacturing test process wherein said manufacturing test process comprises a plurality of sequential test steps;
(d) estimating an incoming fault probability value for said each component in said electronic assembly by applying said pre-determined test and quality information corresponding to said each component, wherein said incoming fault probability corresponds to a first of said sequential test steps;
(e) assigning the first of said sequential test steps as the current test step;
(f) simulating application of the current test step to said incoming fault probability value to estimate said manufacturing test and quality attributes;
(g) determining an outgoing fault probability corresponding to the fault probability for each component in said electronic assembly following application of said next test step, wherein said outgoing fault probability is usable as an incoming fault probability value in subsequent invocations of step (f);
(h) assigning the next of said sequential test steps as the current test step; and
(h) repeating steps (f) and (g) and (h) for each of said plurality of test steps of said manufacturing test process.

15. The method of claim 14 wherein said manufacturing test and quality attributes comprise at least one attribute selected from the group consisting of: manufacturing test coverage, manufacturing test isolation, manufacturing test costs, assembly reliability, assembly repair costs, and assembly yield.

16. The method of claim 14 wherein the step of simulating application of said manufacturing test process further comprises the steps of:
estimating the average number of defects (Do) in said electronic assembly as:

$$Do = \sum_{j=1}^{N} Pfi_j * TC_j$$

where:
$Pfi_j$ is the incoming fault probability value corresponding to the j'th said component in said electronic assembly,
$TC_j$ is a test coverage value corresponding to the j'th said component in said electronic assembly, and
N is the number of components in said electronic assembly; and estimating the yield of said electronic assembly in response to the application of said manufacturing process and in response to the estimation of said average number of defects (Do).

17. The method of claim 16 wherein the incoming fault probability value (Pfi) of said j'th component is determined as:

$$Pfi=1-(1-fp)^n$$

where:
n is the number of trials for the a fault type of a component and is derived from said pre-determined test and quality information,
fp is the fault probability and is derived from said pre-determined test and quality information.

18. The method of claim 16 wherein a yield (Y) is determined as:

$$Y=Ycl+Yncl$$

where:
Ycl is a yield determined from clustered solder defects, and
Yncl is a yield determined from non-clustered assembly defects and functional defects.

19. The method of claim 18 wherein said Ycl is determined as:

$$Ycl = \left[ 1 + \frac{Do}{\alpha} \right]^{-\alpha}$$

where:
$\alpha$ is the clustering factor.

20. The method of claim 19 further comprising the step of:
providing information relating to the assembly process used for said electronic assembly;
estimating the clustering factor ($\alpha$) as:

$$\alpha = \frac{\mu^2}{\sigma^2 - \mu}$$

where:
$\mu$ is the mean number of defects for said assembly process, and
$\sigma$ is the standard deviation of said number of defects for said assembly process.

21. The method of claim 18 wherein said Yncl is determined as:

$$Yncl = e^{-Do}$$

22. The method of claim 16:
wherein each test step of said manufacturing test process comprises at least one test attribute applicable to each of said components of said electronic assembly, said at least one test attribute selected from the group consisting of: in-circuit, boundary scan, self test, functional test, stress test, and inspection; and
wherein said test coverage value (TC) of said j'th component is determined as the largest test coverage value of all test attributes applicable to the j'th component of said electronic assembly of said current test step.

23. The method of claim 14 wherein the outgoing fault probability value (Pfo) of said j'th component is determined as:

$$Pfo=1-(1-Pfi)^{1-TC}$$

24. The method of claim 14 further comprising the steps of:

performing pareto analysis ranking of said electronic assembly with respect to said manufacturing test and quality attributes of said electronic assembly, wherein said pareto analysis ranks each component used in said electronic assembly with respect to a contribution of each component to said manufacturing test and quality attributes.

25. The method of claim 14 further comprising the steps of:

performing pareto analysis ranking of said electronic assembly with respect to said manufacturing test and quality attributes of said electronic assembly, wherein said pareto analysis ranks each unique part number of all components used in said electronic assembly with respect to a contribution of each unique part number to said manufacturing test and quality attributes.

26. The method of claim 14 further comprising the steps of:

performing pareto analysis ranking of said electronic assembly with respect to said manufacturing test and quality attributes of said electronic assembly, wherein said pareto analysis ranks each category of components used in said electronic assembly with respect to a contribution of each category of components to said manufacturing test and quality attributes.

27. A method, operable on a computer, for estimating manufacturing test and quality attributes of an electronic assembly attributable to a predetermined manufacturing test process, said method comprising the steps of:

providing a description of the design of said electronic assembly;

providing pre-determined test and quality information relating to each component in said electronic assembly; and simulating said manufacturing test process, responsive to the description of the design of said electronic assembly and to the predetermined test and quality information, to estimate said manufacturing test and quality attributes attributable to said pre-determined manufacturing test process.

28. The method of claim 27 wherein the step of simulating further comprises the steps of:

estimating an incoming fault probability value for said each component in said electronic assembly by applying said pre-determined test and quality information corresponding to said each component; and simulating application of said manufacturing test process to said incoming fault probability value to estimate said manufacturing test and quality attributes.

29. The method of claim 28 wherein said manufacturing test and quality attributes comprise at least one attribute selected from the group consisting of: manufacturing test coverage, manufacturing test isolation, manufacturing test costs, assembly reliability, assembly repair costs, and assembly yield.

30. The method of claim 28 wherein the step of simulating application of said manufacturing test process further comprises the steps of:

estimating the average number of defects (Do) in said electronic assembly as:

$$Do = \sum_{j=1}^{N} Pfi_j * TC_j$$

where:

$Pfi_j$ is the incoming fault probability value corresponding to the j'th said component in said electronic assembly, $TC_j$ is a test coverage value corresponding to the j'th said component in said electronic assembly, and N is the number of components in said electronic assembly; and estimating the yield of said electronic assembly in response to the application of said manufacturing process and in response to the estimation of said average number of defects (Do).

31. The method of claim 30 wherein the incoming fault probability value (Pfi) of said j'th component is determined as:

$$Pfi = 1 - (1 - fp)^n$$

where:

n is the number of trials for a fault type of a component and is derived from said pre-determined test and quality information, fp is the fault probability and is derived from said pre-determined test and quality information.

32. The method of claim 30 wherein a yield (Y) is determined as:

$$Y = Ycl + Yncl$$

where:

Ycl is a yield determined from clustered solder defects, and

Yncl is a yield determined from non-clustered assembly defects and functional defects.

33. The method of claim 32 wherein said Ycl is determined as:

$$Ycl = \left[ 1 + \frac{Do}{\alpha} \right]^{-\alpha}$$

where:

α is the clustering factor.

34. The method of claim 33 further comprising the step of:

providing information relating to the assembly process used for said electronic assembly;

estimating the clustering factor (α) as:

$$\alpha = \frac{\mu^2}{\sigma^2 - \mu}$$

where:

μ is the mean number of defects for said assembly process, and

σ is the standard deviation of said number of defects for said assembly process.

35. The method of claim 32 wherein said Yncl is determined as:

$$Yncl = e^{-Do}$$

36. The method of claim 30:

wherein said manufacturing test process comprises at least one test attribute applicable to each of said components of said electronic assembly, said at least one test attribute selected from the group consisting of: in-circuit, boundary scan, self test, functional test, stress test, and inspection; and wherein said test coverage value (TC) of said j'th component is determined as the largest test coverage value of all test attributes applicable to the j'th component of said electronic assembly.

37. The method of claim 27 further comprising the steps of:

performing pareto analysis ranking of said electronic assembly with respect to said manufacturing test and quality attributes of said electronic assembly, wherein said pareto analysis ranks each component used in said electronic assembly with respect to a contribution of each component to said manufacturing test and quality attributes.

38. The method of claim 27 further comprising the steps of:

performing pareto analysis ranking of said electronic assembly with respect to said manufacturing test and quality attributes of said electronic assembly, wherein said pareto analysis ranks each unique part number of all components used in said electronic assembly with respect to a contribution of each unique part number to said manufacturing test and quality attributes.

39. The method of claim 27 further comprising the steps of:

performing pareto analysis ranking of said electronic assembly with respect to said manufacturing test and quality attributes of said electronic assembly, wherein said pareto analysis ranks each category of components used in said electronic assembly with respect to a contribution of each category of components to said manufacturing test and quality attributes.

40. A method, operable on a computer, for estimating manufacturing test and quality attributes of an electronic assembly attributable to a predetermined manufacturing assembly process, said method comprising the steps of:

providing a description of the design of said electronic assembly;

providing pre-determined test and quality information relating to each component in said electronic assembly;

providing a description of a manufacturing test process; and simulating said manufacturing test process, responsive to the description of the design of said electronic assembly and to the predetermined test and quality information, to estimate said manufacturing test and quality attributes attributable to said pre-determined manufacturing assembly process.

41. The method of claim 40 wherein the step of simulating further comprises the steps of:

estimating an incoming fault probability value for said each component in said electronic assembly by applying said pre-determined test and quality information corresponding to said each component; and simulating application of said manufacturing test process to said incoming fault probability value to estimate said manufacturing test and quality attributes.

42. The method of claim 41 wherein said manufacturing test and quality attributes comprise at least one attribute selected from the group consisting of: manufacturing test coverage, manufacturing test isolation, manufacturing test costs, assembly reliability, assembly repair costs, and assembly yield.

43. The method of claim 41 wherein the step of simulating application of said manufacturing test process further comprises the steps of:

estimating the average number of defects (Do) in said electronic assembly as:

$$Do = \sum_{j=1}^{N} Pfi_j * TC_j$$

where:

$Pfi_j$ is the incoming fault probability value corresponding to the j'th said component in said electronic assembly, $TC_j$ is a test coverage value corresponding to the j'th said component in said electronic assembly, and N is the number of components in said electronic assembly; and estimating the yield of said electronic assembly in response to the application of said manufacturing process and in response to the estimation of said average number of defects (Do).

44. The method of claim 43 wherein the incoming fault probability value (Pfi) of said j'th component is determined as:

$$Pfi = 1 - (1 - fp)^n$$

where:

n is the number of trials for a fault type of a component and is derived from said pre-determined test and quality information, fp is the fault probability and is derived from said pre-determined test and quality information.

45. The method of claim 43 wherein a yield (Y) is determined as:

$$Y = Ycl + Yncl$$

where:

Ycl is a yield determined from clustered solder defects, and

Yncl is a yield determined from non-clustered assembly defects and functional defects.

46. The method of claim 45 wherein said Ycl is determined as:

$$Ycl = \left[ 1 + \frac{Do}{\alpha} \right]^{-\alpha}$$

where:

$\alpha$ is the clustering factor.

47. The method of claim 46 further comprising the step of:

providing information relating to the assembly process used for said electronic assembly;

estimating the clustering factor ($\alpha$) as:

$$\alpha = \frac{\mu^2}{\sigma^2 - \mu}$$

where:

$\mu$ is the mean number of defects for said assembly process, and $\sigma$ is the standard deviation of said number of defects for said assembly process.

48. The method of claim 45 wherein said Yncl is determined as:

$$Yncl = e^{-Do}$$

49. The method of claim 43:

wherein said manufacturing test process comprises at least one test attribute applicable to each of said components of said electronic assembly, said at least one test attribute selected from the group consisting of: in-circuit, boundary scan, self test, functional test, stress test, and inspection; and wherein said test coverage value (TC) of said j'th component is determined as the largest test coverage value of all test attributes applicable to the j'th component of said electronic assembly.

50. The method of claim 40 further comprising the steps of:

performing pareto analysis ranking of said electronic assembly with respect to said manufacturing test and quality attributes of said electronic assembly, wherein said pareto analysis ranks each component used in said electronic assembly with respect to a contribution of each component to said manufacturing test and quality attributes.

51. The method of claim 40 further comprising the steps of:

performing pareto analysis ranking of said electronic assembly with respect to said manufacturing test and quality attributes of said electronic assembly, wherein said pareto analysis ranks each unique part number of all components used in said electronic assembly with respect to a contribution of each unique part number to said manufacturing test and quality attributes.

52. The method of claim 40 further comprising the steps of:

performing pareto analysis ranking of said electronic assembly with respect to said manufacturing test and quality attributes of said electronic assembly, wherein said pareto analysis ranks each category of components used in said electronic assembly with respect to a contribution of each category of components to said manufacturing test and quality attributes.

53. A system, operable on a computer, for estimating manufacturing test and quality attributes of an electronic assembly concurrent with the design of said electronic assembly, comprising:

means for providing information on the design of said electronic assembly;

means for providing pre-determined test and quality information relating to each component in said electronic assembly;

means for providing information on a manufacturing test process; and means for simulating said manufacturing test process, responsive to the information on the design of said electronic assembly and to the pre-determined test and quality information, to estimate said manufacturing test and quality attributes.

54. A system, operable on a computer, for estimating manufacturing test and quality attributes of an electronic assembly concurrent with the design of said electronic assembly, comprising:

(a) means for providing information on the design of said electronic assembly;

(b) means for providing pre-determined test and quality information relating to each component in said electronic assembly;

(c) means for providing information on a manufacturing test process wherein said manufacturing test process comprises a plurality of sequential test steps;

(d) means for estimating an incoming fault probability value for said each component in said electronic assembly by applying said pre-determined test and quality information corresponding to said each component, wherein said incoming fault probability corresponds to a first of said sequential test steps;

(e) means for assigning the first of said sequential test steps as the current test step;

(f) means for simulating application of the current test step to said incoming fault probability value to estimate said manufacturing test and quality attributes;

(g) means for determining an outgoing fault probability corresponding to the fault probability for each component in said electronic assembly following application of said next test step, wherein said outgoing fault probability is usable as an incoming fault probability value in subsequent invocations of said stimulating means;

(h) means for assigning the next of said sequential test steps as the current test step; and (i) means for activating said simulating means, said determining means, and said second assigning means for each of said plurality of test steps of said manufacturing test process.

55. A system, operable on a computer, for estimating manufacturing test and quality attributes of an electronic assembly attributable to a pre-determined manufacturing test process, said system comprising:

means for providing information on the design of said electronic assembly;

means for providing pre-determined test and quality information relating to each component in said electronic assembly; and means for simulating said manufacturing test process, responsive to the information on the design of said electronic assembly and to the pre-determined test and quality information, to estimate said manufacturing test and quality attributes attributable to said pre-determined manufacturing test process.

56. A system, operable on a computer, for estimating manufacturing test and quality attributes of an electronic assembly attributable to a pre-determined manufacturing assembly process, said system comprising:

means for providing information on the design of said electronic assembly;

means for providing pre-determined test and quality information relating to each component in said electronic assembly;

means for providing information on a manufacturing test process; and means for simulating said manufacturing test process, responsive to the information on the design of said electronic assembly and the pre-determined test and quality information, to estimate said manufacturing test and quality attributes attributable to said pre-determined manufacturing assembly process.

* * * * *